United States Patent [19]
Dutton et al.

[11] Patent Number: 6,161,208
[45] Date of Patent: Dec. 12, 2000

[54] STORAGE SUBSYSTEM INCLUDING AN ERROR CORRECTING CACHE AND MEANS FOR PERFORMING MEMORY TO MEMORY TRANSFERS

[75] Inventors: Patrick Francis Dutton, Apalachin; Steven Lee Gregor; Hehching Harry Li, both of Endicott, all of N.Y.

[73] Assignee: International Business Machines Corporation, Armonk, N.Y.

[21] Appl. No.: 09/291,820

[22] Filed: Apr. 14, 1999

Related U.S. Application Data

[62] Division of application No. 08/239,332, May 6, 1994.

[51] Int. Cl.[7] .................................................. G11C 11/00
[52] U.S. Cl. ........................ 714/764; 714/800; 714/805; 711/118
[58] Field of Search ............................. 711/118; 714/764, 714/800, 805

[56] References Cited

U.S. PATENT DOCUMENTS

| | | |
|---|---|---|
| 4,084,236 | 4/1978 | Chelberg et al. . |
| 4,428,064 | 1/1984 | Hempy et al. . |
| 4,445,174 | 4/1984 | Fletcher . |
| 4,545,014 | 10/1985 | Oguchi . |
| 4,881,163 | 11/1989 | Thomas et al. . |
| 4,888,699 | 12/1989 | Knoll et al. . |
| 4,926,317 | 5/1990 | Wallach et al. . |
| 4,942,518 | 7/1990 | Weatherford et al. . |
| 4,970,643 | 11/1990 | Cramm . |
| 5,428,632 | 6/1995 | Rastegar ................................... 714/805 |
| 5,668,967 | 9/1997 | Olson et al. ............................... 710/22 |
| 5,774,482 | 6/1998 | Grewal ..................................... 714/764 |

OTHER PUBLICATIONS

IBM Technical Disclosure Bulletin, vol. 15, No. 2, Jul. 1972, p. 503, New York, U.S.; K. Helwig et al, "Error Correction Without Use of Error–Correction Code".

Thirty–Second IEEE Computer Society International Conference, San Francisco, CA, 23rd–247th Feb., 1987, pp. 106–109, IEEE, New York, US: S. G. Tucker, "The IBM 3090 System Design with Emphasis on the Vector Facility".

*Primary Examiner*—Jack A. Lane
*Attorney, Agent, or Firm*—Arthur J. Samodovitz

[57] ABSTRACT

A storage subsystem for use in a data processing system having real and extended storage, a vector processor and a store-in cache buffer. Transfers between real and extended storage are performed with a store buffer external to the cache, but comparable in size to the line size of the cache directly associated with the real storage. Hard data errors in the cache are corrected with hardware invert-retry mechanism which operates in response to a machine check and does the correction as a part of the instruction retry. Vector processor storage operations bypass the cache and transfer data directly from storage to the vector processor.

2 Claims, 9 Drawing Sheets

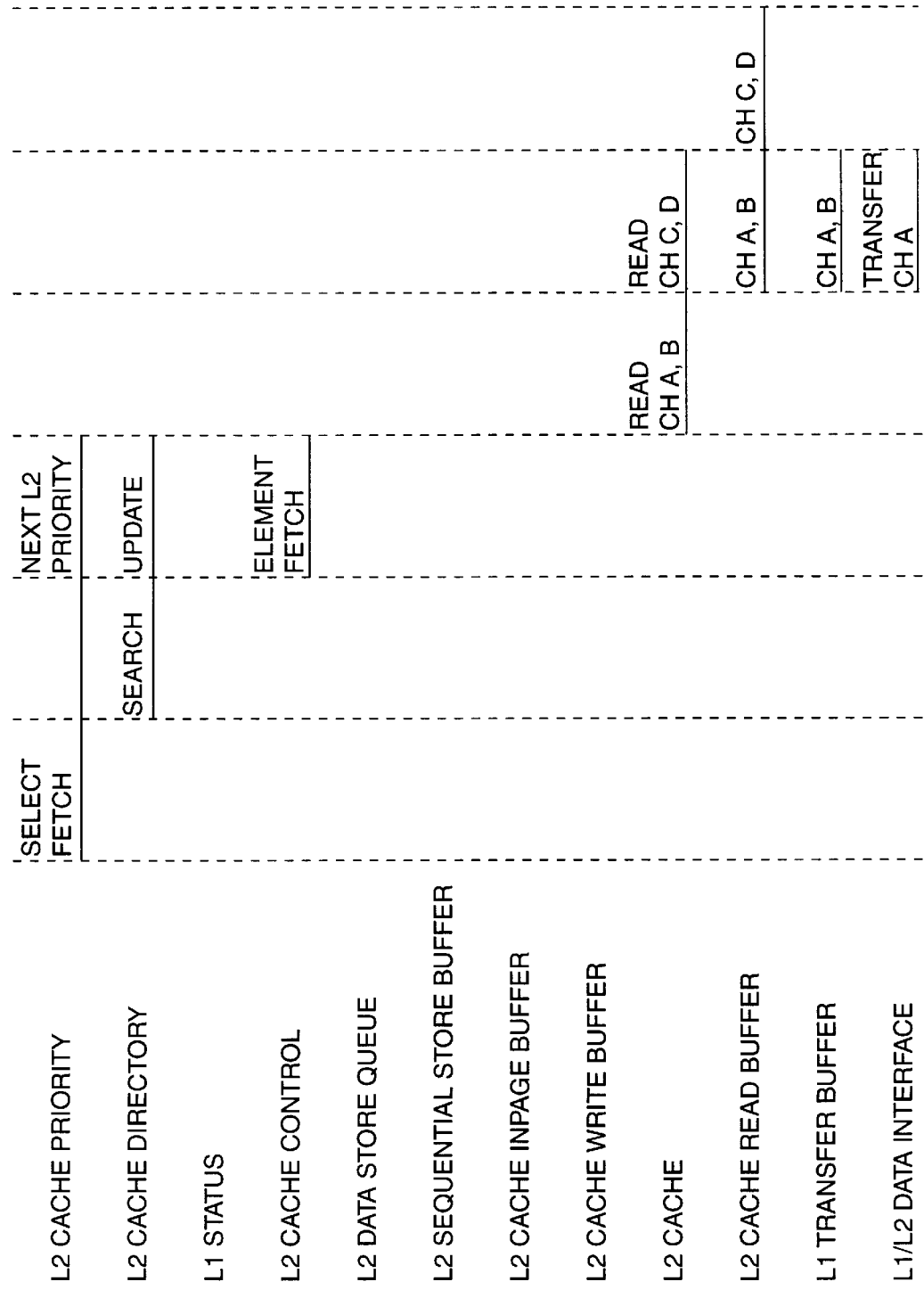

STORAGE SUBSYSTEM INCLUDING AN ERROR CORRECTING CACHE AND MEANS FOR PERFORMING MEMORY TO MEMORY TRANSFERS

This application is a division of Ser. No. 08/239,332, filed on May 6, 1994.

TECHNICAL FIELD

This invention is directed to a storage subsystem for use in a data processing system, which includes a vector processor, having two-level cache system interfacing with a main storage system with real and extended storage. The invention relates particularly to the means for performing transfers between real and extended storage, the technique for correcting hard errors in the cache system and for transferring data between storage and a vector processor.

The storage requirements for a vector processor are markedly different than the requirements for a more conventional processor. Systems which incorporate conventional processors and vector processors are quite common. In such systems, the storage operations are usually tailored to the requirements of the conventional processor, causing the performance of the vector processor to suffer.

The need for a high degree of error detection and correction for a store-in buffer cache is well recognized. Conventional methods utilize error correcting codes which require the use of checking blocks containing multiple bytes of information to reduce the cost of the check bits. This approach invariable requires additional cycles to allow for the conversion of check bits to data parity bits during fetch operations and also requires read-modify-write operations to accommodate stores of data not having integral checking blocks.

In such systems, there is often an extension of main storage, called extended storage, which is managed by system software in much the same fashion as a semiconductor paging device. While such a system provides storage capacity beyond what would normally be provided to the system, the transfers between main storage and extended storage become cumbersome when caches are used, and overall system performance may be substantially degraded.

CROSS REFERENCES TO RELATED APPLICATIONS

A storage subsystem which may be used in the practice of this invention is described and claimed in the co-pending patent application Ser. No. 07/212,561, filed Jun. 28, 1988, entitled "Design of a Two-Level Cache Including Apparatus for Maintaining Storage Consistency" (IBM Docket EN988004), now abandoned in flavor of Ser. No. 07/750,430 now U.S. Pat. No. 5,276,848 which patent application is incorporated herein by reference and made a part of this patent application.

An instruction retry system which may be used in the practice of this invention is described and claimed in the co-pending patent application Serial No. 07/213,535, filed Jun. 30, 1988, entitled "Central Processing Unit Checkpoint Retry for Store-In and Store-Through Cache Systems" (IBM Docket EN988006), now abandoned in flavor of Ser. No. 07/592,624 on Oct. 4, 1990, now U.S. Pat. No. 5,418,916 which patent application is incorporated herein by reference and made a part of this patent application.

BACKGROUND ART

The addition of a two level cache storage system, while substantially improving system performance for general data processing purposes, does not provide the same improvement in a vector processing operation. Further, the central processor, or main processor, is normally dominant in a data processing system which includes both. This requires that data fetched for use in the subservient vector processor must share storage access with the main processor, and this limits the vector processor's performance.

While cache systems have been effective to improve the mismatch caused by the disparate speeds of main storage and central processing units, the sensitivity of such units to error has required that the data passed through the cache be carefully checked for errors and, if possible, the error corrected. Conventional error checking and correction would burden the already tight timing characteristics of the cache organization, add cycles to the fetch access to accommodate the error checking and correction paths, or, even more complex, require a mechanism to interrupt the processor pipeline if an error is detected after the transfer of data.

An analysis of the technological characteristics of static random access memory used for cache storage revealed that soft failures such as those due to alpha particle contamination, are almost non-existent. This being the case, an effective error correction technique need consider only those hard bit failures, that is, those in which circuit failure has occurred. The ability to ignore conventional error checking and correction techniques means that additional machine cycles or substantial additional circuitry is not required. An additional complexity is also eliminated since the single byte handling of errors means that direct stores to cache, which may be from one byte to an entire line, can be handled the same way. Conventional error handling techniques do not lend themselves to single byte use, since they require a read-modify-write operation, thereby reducing the performance of the processor.

The invert-retry technique of this invention does not affect performance of the system unless an error occurs. Thus, normal operation of the system is completely unaffected and there is no time penalty. The invention nevertheless provides the capability of recovering from a hard bit error, allowing data to be recovered with minimal hardware needed to execute a short recover algorithm.

Storage transfers, that is, transfers of data from extended storage of real storage, have been handled by having the processor perform a fetch from one area of storage and then simply turn it around and store it in another location in storage. Such techniques suffer from several disabilities. First, there is the problem of the burden on the processor for performing a rather mundane task. Such excess processor time is either not available or, if available, is much better put to use elsewhere. In addition, the usual fetch instruction is not particularly well suited to the sort of transfer required for moving data between real and extended memory. While cache systems have been successfully used to improve the performance of storage systems by matching processor speeds to the fetching and storage of data, the housekeeping which accompanies such cache systems is not required in memory to memory transfers and slow down the transfer or utilize unnecessary hardware or, in some instances, both. Since extended storage is, by definition, not directly addressable by the processor, some method must be used to relocate data in the extended storage area before it can be used by the application programs being run on the system. The burden of transferring the data from extended storage to real storage degrades system performance, and, as a result, the full benefits of extended storage have not been realized.

DISCLOSURE OF THE INVENTION

It is therefore an object of this invention to provide an improved, cache oriented, storage subsystem particularly suited to use in a data processing system having a vector processing unit.

It is another object of this invention to provide a storage subsystem having a cache with error correction capability.

It is still another object of the invention to provide an improved means for storage to storage transfers of data in a cache system.

These and other objects are provided by a storage subsystem in which memory to memory transfers, that is, transfers of data between real and extended storage, involve the use of a store buffer which is external to the cache system, but matches the size of the L2 cache. Hard data errors in the cache system are detected with standard parity techniques. The instruction retry system performs a series of operations on the data, utilizing the cache, to correct the error. Vector processor operations involving the transfer of data from storage are performed by transferring the data directly from storage, by passing the cache and the central processing unit.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limited of the present invention, and wherein:

FIG. 9 is a timing diagram of the vector processor fetch operation.

DESCRIPTION OF THE INVENTION

Figure 1:
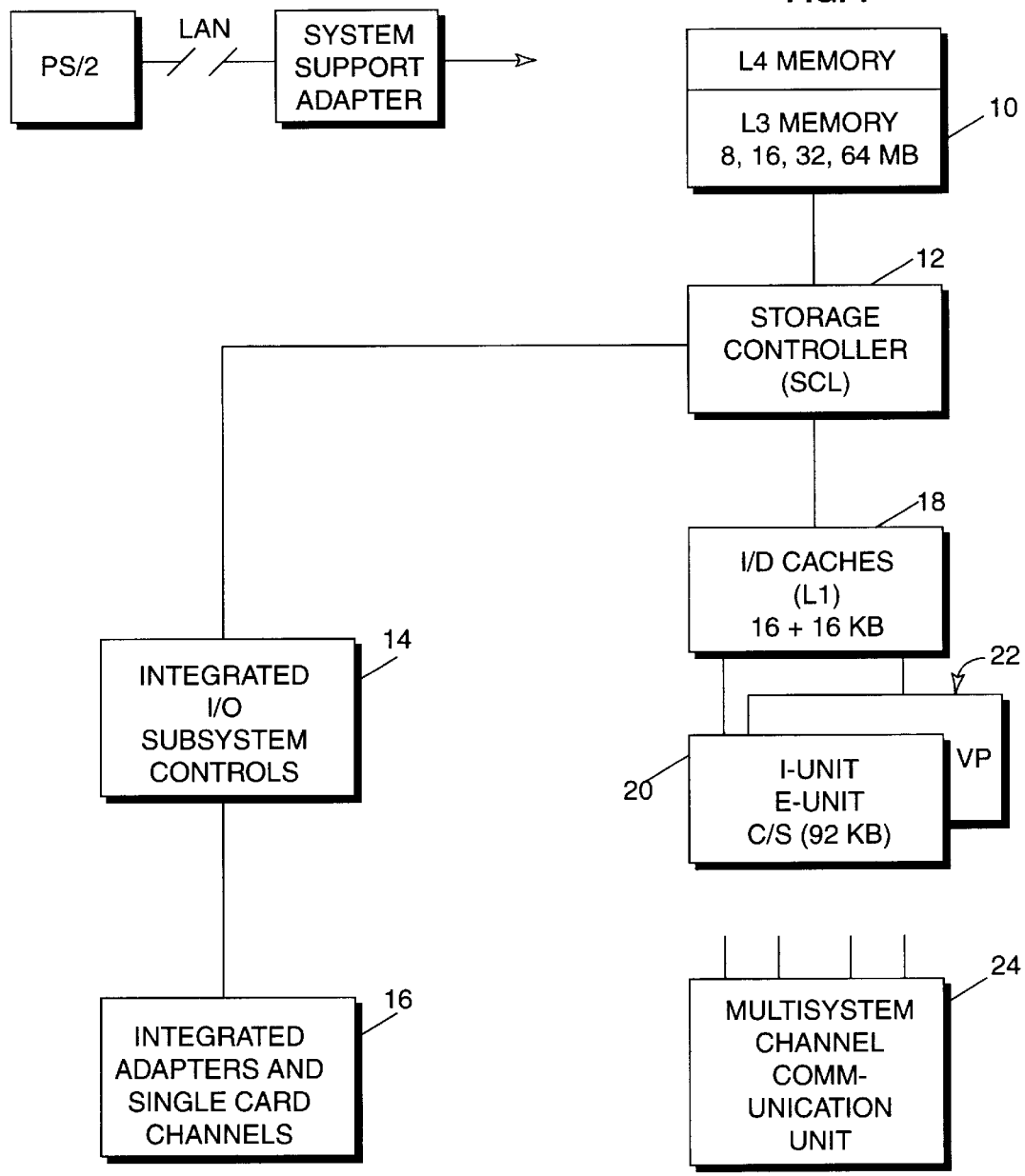
FIG. 1 illustrates a uniprocessor computer system.

Referring to FIG. 1, a uniprocessor computer system of the present invention is illustrated.

In FIG. 1, the uniprocessor system comprises an L3 memory 10 connected to a storage controller (SCL) 12. On one end, the storage controller 12 is connected to an integrated I/O subsystem controls 14, the controls 14 being connected to integrated adapters and single card channels 16. On the other end, the storage controller 12 is connected to I/D caches (L1) 18, which comprise an instruction cache, and a data cache, collectively termed the "L1" cache. The I/D caches 18 are connected to an instruction unit (I-unit), Execution unit (E-unit), control store 20 and to a vector processor (VP) 22. The vector processor 22 is described in pending patent application Ser. No. 530,842, filed Sep. 9, 1983, entitled "High Performance Parallel Vector Processor", the disclosure of which is incorporated by reference into the specification of this application. The uniprocessor system of FIG. 1 also comprises the multisystem channel communication unit 24.

The L3 memory 10 comprises 2 "intelligent" memory cards. The cards are "intelligent" due to the existence of certain specific features: error checking and correction, extended error checking and correction (ECC) refresh address registers and counters, and bit spare capability. The interface to the L3 memory 10 is 8-bytes wide. Memory sizes are 8, 16, 32, and 64 megabytes. The L3 memory is connected to a storage controller (SCL) 12.

The storage controller 12 comprises three bus arbiters arbitrating for access to the L3 memory 10, to the I/O subsystem controls 14, and to the I/D caches 18. The storage controller further includes a directory which is responsible for searching the instruction and data caches 18, otherwise termed the L1 cache, for data. If the data is located in the L1 caches 18, but the data is obsolete, the storage controller 12 invalidates the obsolete data in the L1 caches 18 thereby allowing the I/O subsystem controls 14 to update the data in the L3 memory 10. Thereafter, instruction and execution units 20 must obtain the updated data from the L3 memory 10. The storage controller 12 further includes a plurality of buffers for buffering data being input to L3 memory 10 from the I/O subsystem controls 14 and for buffering data being input to L3 memory 10 from instruction/execution units 20. The buffer associated with the instruction/execution units 20 is a 256 byte line buffer which allows the building of entries 8 bytes at a time for certain types of instructions, such as sequential operations. This line buffer, when full, will cause a block transfer of data to L3 memory to occur. Therefore, memory operations are reduced from a number of individual store operations to a much smaller number of line transfers.

The instruction cache/data cache 18 are each 16K byte caches. The interface to the storage controller 12 is 8 bytes wide; thus, an inpage operation from the storage controller 12 takes 8 data transfer cycles. The data cache 18 is a "store through" cache, which means that data from the instruction/execution units 20 are stored in L3 memory and, if the corresponding obsolete data is not present in the L1 caches 18, the data is not brought into and stored in the L1 caches. To assist this operation, a "store buffer" is present with the L1 data cache 18 which is capable of buffering up to 8 store operations.

The vector processor 22 is connected to the data cache 18. It shares the data flow of the instruction/execution unit 20 into the storage controller 12, but the vector processor 22 will not, while it is operating, permit the instruction/execution unit 20 to make accesses into the storage controller 12 for the fetching of data.

The integrated I/O subsystem 14 is connected to the storage controller 12 via an 8-byte bus. The subsystem 14 comprises three 64-byte buffers used to synchronize data coming from the integrated I/O subsystem 14 with the storage controller 12. That is, the instruction/execution unit 20 and the I/O subsystem 14 operate on different clocks, the synchronization of the two clocks being achieved by the three 64-byte buffer structure.

The multisystem channel communication unit 24 is a 4-port channel to channel adapter, packaged externally to the system.

Figure 2:
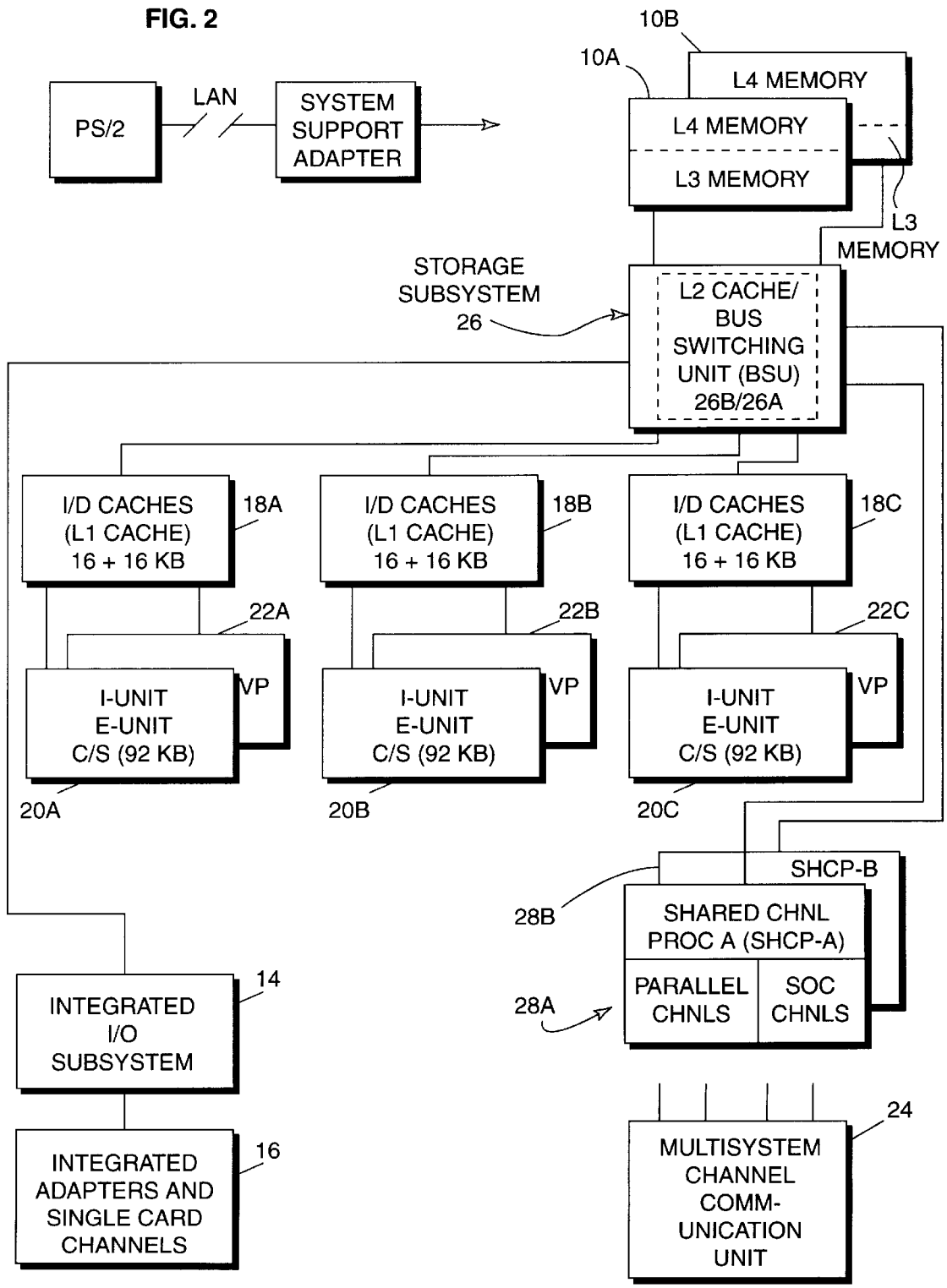
FIG. 2 illustrates a triadic computer system.

Referring to FIG. 2, a triadic (multiprocessor) system is illustrated.

In FIG. 2, a Storage Subsystem 10 comprises pair of L3 memories 10a/10b and a bus switching unit (BSU) 26, the BSU including an L2 cache 26a. The Storage Subsystem 10 will be set forth in more detail in FIG. 5. The BSU 26 is connected to the integrated I/O subsystem 14, to shared channel processor A (SHCP-A) 28a, to shared channel processor B (SHCP-B) 28*b*, and to three processors: a first processor including instruction/data caches 18*a* and instruction/execution units/control store 20*a*, a second processor including instruction/data caches 18*b* and instruction/ execution units/control store 20*b*, and a third processor including instruction/data caches 18*c* and instruction/ execution units/control store 20*c*. Each of the instruction/ data caches 18*a*, 18*b*, 18*c* are termed "L1" caches. The cache in the BSU 26 is termed the L2 cache 26*a*, and the main memory 10*a*/10*b* is termed the L3 memory.

The BSU 26 connects the three processors 18*a*/20*a*, 18*b*/20*b*, and 18*c*/20*c*, two L3 memory ports 10*a*/10*b*, two shared channel processors 28, and an integrated I/O subsystem 14. The BSU 26 comprise circuits which decide the priority for requests to be handled, such as requests from each of the three processors to L3 memory, or requests from the I/O subsystem 14 or shared channel processors, circuits which operate the interfaces, and circuits to access the L2 cache 26*a*. The L2 cache 26*a* is a "store in" cache, meaning that operations which access the L2 cache, to modify data, must also modify data resident in the L2 cache (the only exception to this rule is that, if the operation originates from the I/O subsystem 14, and if the data is resident only in L3 memory 10*a*/10*b* and not in L2 cache 26*a*, the data is modified only in L3 memory, not in L2 cache).

The interface between the BSU 26 and L3 memories 10*a*/10*b* comprises two 16-byte lines/ports in lieu of the single 8-byte port in FIG. 1. However, the memory 10 of FIG. 1 is identical to the memory cards 10*a*/10*b* of FIG. 2. The two memory cards 10*a*/10*b* of FIG. 2 are accesses in parallel.

The shared channel processor 28 is connected to the BSU 26 via two ports, each port being an 8-byte interface. The shared channel processor 28 is operated at a frequency which is independent of the BSU 26, the clocks within the BSU being synchronized with the clocks in the shared channel processor 28 in a manner which is similar to the clock synchronization between the storage controller 12 and the integrated I/O subsystem 14 of FIG. 1.

A functional description of the operation of the uniprocessor computer system of FIG. 1 will be set forth in the following paragraphs with reference to FIG. 1.

Normally, instructions are resident in the instruction cache (L1 cache) 18, waiting to be executed. The instruction/ execution unit 20 searches a directory disposed within the L1 cache 18 to determine if the typical instruction is stored therein. If the instruction is not stored in the L1 cache 18, the instruction/execution unit 20 will generate a storage request to the storage controller 12. The address of the instruction, or the cache line containing the instruction will be provided to the storage controller 12. The storage controller 12 will arbitrate for access to the bus connected to the L3 memory 10. Eventually, the request from the instruction/execution unit 20 will be passed to the L3 memory 10, the request comprising a command indicating a line in L3 memory is to be fetched for transfer to the instruction/execution unit 20. The L3 memory will latch the request, decode it, select the location in the memory card wherein the instruction is stored, and, after a few cycles of delay, the instruction will be delivered to the storage controller 12 from the L3 memory in 8-byte increments. The instruction is then transmitted from the storage controller 12 to the instruction cache (L1 cache) 18, wherein it is temporarily stored. The instruction is re-transmitted from the instruction cache 18 to the instruction buffer within the instruction/execution unit 20. The instruction is decoded via a decoder within the instruction unit 20. Quite often, an operand is needed in order to execute the instruction, the operand being resident in memory 10. The instruction/execution unit 20 searches the directory in the data cache 18; if the operand is not found in the directory of the data cache 18, another storage access is issued by the instruction/execution unit 20 to access the L3 memory 10, exactly in the manner described above with respect to the instruction cache miss. The operand is stored in the data cache, the instruction/execution unit 20 searching the data cache 18 for the operand. If the instruction requires the use of microcode, the instruction/execution unit 20 makes use of the microcode resident on the instruction execution unit 20 card. If an input/output (I/O) operation need be performed, the instruction/execution unit 20 decodes an I/O instruction, resident in the instruction cache 18. Information is stored in an auxiliary portion of L3 memory 10, which is sectioned off from instruction execution. At that point, the instruction/execution unit 20 informs the integrated I/O subsystem 14 that such information is stored in L3 memory, the subsystem 14 processors accessing the L3 memory 10 to fetch the information.

A functional description of the operation of the multiprocessor computer system of FIG. 2 will be set forth in the following paragraphs with reference to FIG. 2.

In FIG. 2, assume that a particular instruction/execution unit, one of 20*a*, 20*b*, or 20*c*, requires an instruction and searches its own L1 cache, one of 18*a*, 18*b*, or 18*c* for the desired instruction. Assume further that the desired instruction is not resident in the L1 cache. The particular instruction execution unit will then request access to the BSU 26 in order to search the L2 cache disposed therein. The BSU 26 contains an arbiter which receives requests from each of the instruction/execution units 20*a*, 20*b*, 20*c* and from the shared channel processor 28 and from the integrated I/O subsystem 14, the arbiter granting access to one of these units at a time. When the particular instruction/execution unit (one of 20*a*–20*c*) is granted access to the BSU to search the L2 cache 26*a*, the particular instruction/execution unit searches the directory of the L2 cache 26*a* disposed within the BSU 26 for the desired instruction. Assume that the desired instruction is found in the L2 cache. In that case, the desired instruction is returned to the particular instruction/ execution unit. If the desired instruction is not located within the L2 cache, as indicated by its directory, a request is made to the L3 memory, one of 10*a* or 10*b*, for the desired instruction. If the desired instruction is located in the L3 memory, it is immediately transmitted to the BSU 26, 16 bytes at a time, and is bypassed to the particular instruction/ execution unit (one of 20*a*–20*c*) while simultaneously being stored in the L2 cache 26*a* in the BSU 26. Additional functions resident within the BSU relate to rules for storage consistency in a multiprocessor system. For example, when a particular instruction/execution unit 20*c* (otherwise termed "processor" 20*c*) modifies data, that data must be made visible to all other instruction/execution units, or "processors", 20*a*, 20*b* in the complex. If processor 20*c* modifies data presently stored in its L1 cache 18*c*, a search for that particular data is made in the L2 cache directory 26*a* of the BSU 26. If found, the particular data is modified to reflect the modification in the L1 cache 18*c*. Furthermore, the other processors 20*a* and 20*b* are permitted to see the modified, correct data now resident in the L2 cache 26*a* in order to permit such other processors to modify their corresponding data resident in their L1 caches 18*a* and 18*b*. The subject processor 20*c* cannot re-access the particular data until the other processors 20*a* and 20*b* have had a chance to modify their corresponding data accordingly.

Figure 3:
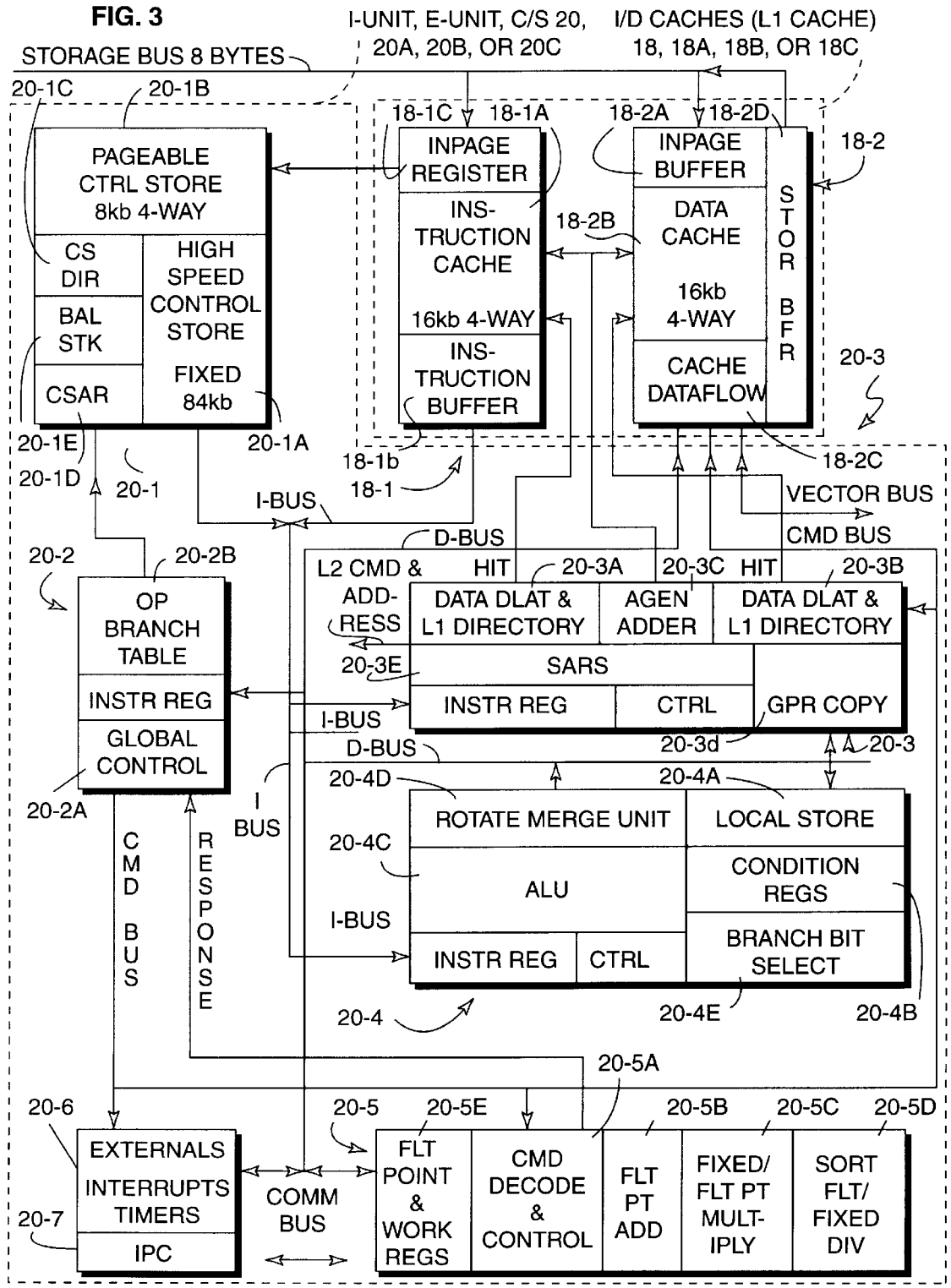
FIG. 3 illustrates a detailed construction of the I/D Caches (L1), the I-unit, E-unit, and Control Store (C/S) illustrated in FIGS. 1 and 2.

Referring to FIG. 3, a detailed construction of each instruction/execution unit (20 in FIG. 1 or one of 20a–20c in FIG. 2) and its corresponding L1 cache (18 in FIG. 1 or one of 18a–18c in FIG. 2) is illustrated.

In FIG. 1, and in FIG. 2, the instruction/execution unit 20, 20a, 20b, and 20c is disposed in a block labelled "I-unit E-unit C/S (92KB)". This block may be termed the "processor", the "instruction processing unit", or, as indicated above, the "instruction/execution unit". For the sake of simplicity in the description provided below, the block 20, 20a–20c will be called the "processor". In addition, the "I/D caches (L1)" will be called the "L1 cache". FIG. 3 provides a detailed construction for the processor (20, 20a, 20b, or 20c) and for the L1 cache (18, 18a, 18b, or 18c).

In FIG. 3, the processor (one of 20, 20a–20c) comprises the following elements. A control store subsystem 20-1 comprises a high speed fixed control store 20-1a of 84k bytes, a pagable area (8k byte, 2k word, 4-way associative pagable area) 20-1b, a directory 20-1c for the pagable control store 20-1b, a control store address register (CSAR) 20-1d, and an 8-element branch and link (BAL STK) facility 20-1e. Machine state controls 20-2 include the global controls 20-2a for the processor, an op branch table 20-2b connected to the CSAR via the control store origin address bus and used to generate the initial address for microcoded instructions. An address generation unit 20-3 comprises 3 chips, a first being an instruction cache DLAT and directory 20-3a, a second being a data cache DLAT and directory 20-3b, and a third being an address generation chip 20-3c connected to the L1 cache 18, 18a–18c via the address bus. The instruction DLAT and directory 20-3a is connected to the instruction cache portion of the L1 cache via four "hit" lines which indicate that the requested instruction will be found in the instruction cache portion 18-1a of the L1 cache. Likewise, four "hit" lines connect the data DLAT and directory 20-3b indicating that the requested data will be found in the data cache 18-2b portion of the L1 cache. The address generation unit 20-3 contains copies of the 16 general purpose registers used to generate addresses (see the GPR COPY 20-3d) and includes three storage address registers (SARS) 20-3e, used to provide addresses to the microcode for instruction execution. A fixed point instruction execution unit 20-4 is connected to the data cache 18-2 via the data bus (D-bus) and contains a local store stack (local store) 20-4a which contains the 16 general purpose registers mentioned above and a number of working registers used exclusively by the microcode; condition registers 20-4b which contain the results of a number of arithmetic and shift type operations and contain the results of a 370 condition code; a four-byte arithmetic logic unit (ALU) 20-4c; an 8-byte rotate merge unit 20-4d; a branch bit select hardware 20-4e which allow the selection of bits from various registers which determine the direction of a branch operation, the bits being selected from general purpose registers, working registers, and the condition registers. A floating point processor 20-5 includes floating point registers and four microcode working registers 20-5e, a command decode and control function 20-5a, a floating point adder 20-5b, a fixed point and floating point multiply array 20-5c, and a square-root and divide facility 20-5d. The floating point processor 20-5 is disclosed in pending patent application Ser. No. 102,985, corresponding to attorney docket number EN987043, entitled "Dynamic Multiple Instruction Stream Multiple Data Multiple Pipeline Apparatus for Floating Point Single Instruction Stream Single Data Architectures", filed on Sep. 30, 1987, the disclosure of which is incorporated by reference into the specification of this application. The ALU 20-4c contains an adder, the adder being disclosed in pending patent application Ser. No. 066,580, filed Jun. 26, 1987, entitled "A High Performance Parallel Binary Byte Adder", the disclosure of which is incorporated by reference into the specification of this application. An externals chip 20-6 includes timers and interrupt structure, the interrupts being provided from the I/O subsystem 14, and others. An interprocessor communication facility (IPC) 20-7 is connected to the storage subsystem via a communication bus, thereby allowing the processors to pass messages to each other and providing access to the time of day clock.

In FIG. 3, the L1 cache (one of 18, 18a, 18b, or 18c) comprises the following elements. An instruction cache 18-1 comprises a 16k byte/4-way cache 18-1a, a 16-byte instruction buffer 18-1b at the output thereof, and an 8-byte inpage register 18-1c at the input from storage. The storage bus, connected to the instruction cache 18-1 is eight bytes wide, being connected to the inpage register 18-1c. The inpage register 18-1c is connected to the control store subsystem 20-1 and provides data to the subsystem in the event of a pagable control store miss and new data must be brought into the control store. A data cache 18-2 comprises an inpage buffer 18-2a also connected to the storage bus; a data cache 18-2b which is a 16k byte/4-way cache; a cache data flow 18-2c which comprises a series of input and output registers and connected to the processor via an 8-byte data bus (D-bus) and to the vector processor (22a–22c) via an 8-byte "vector bus"; an 8-element store buffer (STOR BFR) 18-2d.

A description of the functional operation of a processor and L1 cache shown in FIG. 3 will be provided in the following paragraphs with reference to FIG. 3 of the drawings.

Assume that an instruction to be executed is located in the instruction cache 18-1a. The instruction is fetched from the instruction cache 18-1a and is stored in the instruction buffer 18-1b (every attempt is made to keep the instruction buffer full at all times). The instruction is fetched from the instruction buffer 18-1b and is stored in the instruction registers of the address generation chip 20-3, the fixed point execution unit 20-4, and the machine state controls 20-2, at which point, the instruction decoding begins. Operands are fetched from the GPR COPY 20-3d in the address generation unit 20-3 if an operand is required (normally, GPR COPY is accessed if operands are required for the base and index registers for an RX instruction). In the next cycle, the address generation process begins. The base and index register contents are added to a displacement field from the instruction, and the effective address is generated and sent to the data cache 18-2 and/or the instruction cache 18-1. In this example, an operand is sought. Therefore, the effective address will be sent to the data cache 18-2. The address is also sent to the data DLAT and directory chip 20-3b (since, in this example, an operand is sought). Access to the cache and the directories will begin in the third cycle. The DLAT 20-3b will determine if the address is translatable from an effective address to an absolute address. Assuming that this translation has been previously performed, we will have recorded the translation. The translated address is compared with the output of the cache directory 20-3b. Assuming that the data has previously been fetched into the cache 18-2b, the directory output and the DLAT output are compared; if they compare equal, one of the four "hit" lines are generated from the data DLAT and directory 20-3b. The hit lines are connected to the data cache 18-2b; a generated "hit" line will indicate which of the four associativity classes contains the data that we wish to retrieve. On the next cycle, the data cache 18-2b output is gated through a fetch alignment shifter, in the cache data flow 18-2c, is shifted appropriately, is transmitted along the D-BUS to the fixed point execution unit 20-4, and is latched into the ALU 20-4c. This will be the access of operand 2 of an RX type of instruction. In parallel with this shifting process, operand 1 is access from the general purpose registers in local store 20-4a. As a result, two operands are latched in the input of the ALU 20-4c, if necessary. In the fifth cycle, the ALU 20-4c will process (add, subtract, divide, etc) the two operands accordingly, as dictated by the instruction opcode. The output of the ALU 20-4c is latched and the condition registers 20-4b are latched, at the end of the fifth cycle, to indicate an overflow or zero condition. In the sixth cycle, the output of the ALU 20-4c is written back into the local store 20-4a and into the GPR copy 20-3d of the address generation unit 20-3 in order to keep the GPR copy 20-3d in sync with the content of the local store 20-4a. When the decode cycle of this instruction is complete, the decode cycle of the next instruction may begin, so that there will be up to six instructions in either decoding or execution at any one time. Certain instruction require the use of microcode to complete execution. Therefore, during the decode cycle, the op-branch table 20-2b is searched, using the opcode from the instruction as an address, the op-branch table providing the beginning address of the microcode routine needed to execute the instruction. These instructions, as well as others, require more than 1 cycle to execute. Therefore, instruction decoding is suspended while the op-branch table is being searched. In the case of microcode, the I-BUS is utilized to provide microinstructions to the decoding hardware. The instruction cache 18-1a is shut-off, the control store 20-1a is turned-on, and the microinstructions are passed over the I-BUS. For floating point instructions, decoding proceeds as previously described, except that, during the address generation cycle, a command is sent to the floating point unit 20-5 to indicate and identify the proper operation to perform. In an RX floating point instruction, for example, an operand is fetched from the data cache 18-2b, as described above, and the operand is transmitted to the floating point processor 20-5 in lieu of the fixed point processor 20-4. Execution of the floating point instruction is commenced. When complete, the results of the execution are returned to the fixed point execution unit 20-4, the "results" being condition code, and any interrupt conditions, such as overflow.

The following description represents an alternate functional description of the system set forth in FIG. 3 of the drawings.

In FIG. 3, the first stage of the pipeline is termed instruction decode. The instruction is decoded. In the case of an RX instruction, where one operand is in memory, the base and index register contents must be obtained from the GPR COPY 20-3d. A displacement field is added to the base and index registers. At the beginning of the next cycle, the addition of the base, index, and displacement fields is completed, to yield an effective address. The effective address is sent to the DLAT and Directory chips 20-3a/20-3b. The high order portion of the effective address must be translated, but the low order portion is not translated and is sent to the cache 18-1a/18-2b. In the third cycle, the cache begins an access operation, using the bits it has obtained. The DLAT directories are searched, using a virtual address to obtain an absolute address. This absolute address is compared with the absolute address kept in the cache directory. If this compare is successful, the "hit" line is generated and sent to the cache chip 18-1a/18-2b. Meanwhile, the cache chip has accessed all four associativity classes and latches an output accordingly. In the fourth cycle, one of the four "slots" or associativity classes are chosen, the data is aligned, and is sent across the data bus to the fixed or floating point processor 20-4, 20-5. Therefore, at the end of the fourth cycle, one operand is latched in the ALU 20-4c input. Meanwhile, in the processor, other instructions are being executed. The GPR COPY 20-3d and the local store 20-4a are accessed to obtain the other operand. At this point, both operands are latched at the input of the ALU 20-4c. One cycle is taken to do the computation, set the condition registers, and finally write the result in the general purpose registers in the CPR COPY 20-3d. The result may be needed, for example, for address computation purposes. Thus, the result would be input to the AGEN ADDER 20-3c. During the execution of certain instruction, no access to the caches 18-1a/18-2b is needed. Therefore, when instruction decode is complete, the results are passed directly to the execution unit without further delay (in terms of access to the caches). Therefore, as soon as an instruction is decoded and passed to the address generation chip 20-3, another instruction is decoded.

Figure 4:
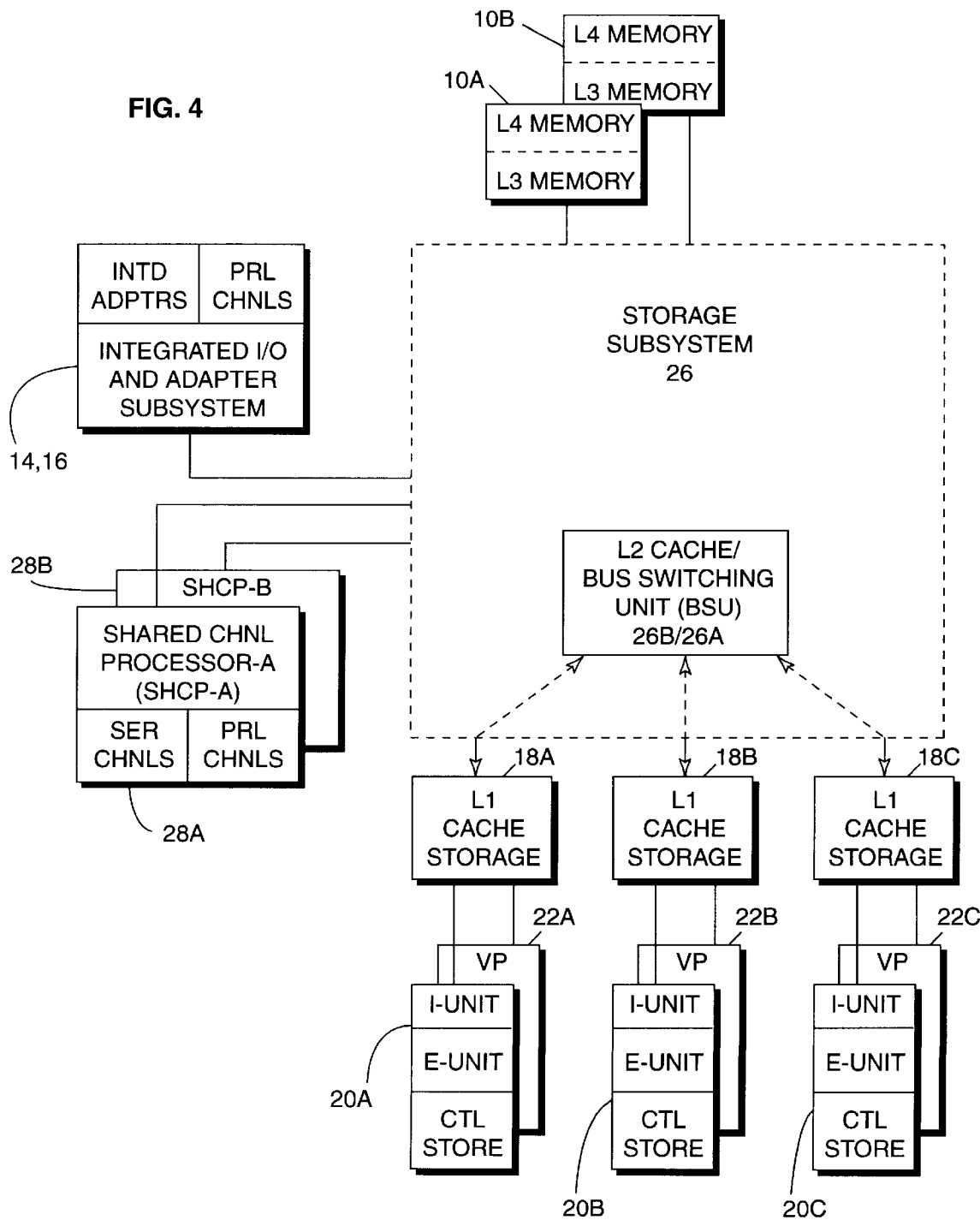
FIG. 4 represents another diagram of the triadic computer system of FIG. 2.

Referring to FIG. 4, another diagram of the data processing system of FIG. 2 is illustrated.

In FIG. 4, the data processing system is a multiprocessor system and includes a storage subsystem 10; a first L1 cache storage 18a, a second L1 cache storage 18b; a third L1 cache storage 18c; a first processing unit 20a, including an instruction unit, an execution unit, and a control store, connected to the first L1 cache storage 18a; a first vector processing unit 22a connected to the first L1 cache storage 18a; a second processing unit 20b, including a instruction unit, an execution unit, a control store, connected to the second L1 cache storage 18b; a second vector processing unit 22b connected to the second L1 cache storage 18b; a third processing unit 20c, including an instruction unit, an execution unit, a control store, connected to the third L1 cache storage 18c; and a third vector processing unit 22c connected to the third L1 cache storage 18c. A shared channel processor A 28a and a shared channel processor B 28b are jointly connected to the storage subsystem 10, and an integrated adapter subsystem 14,16 is also connected to the storage subsystem 10.

Figure 5:
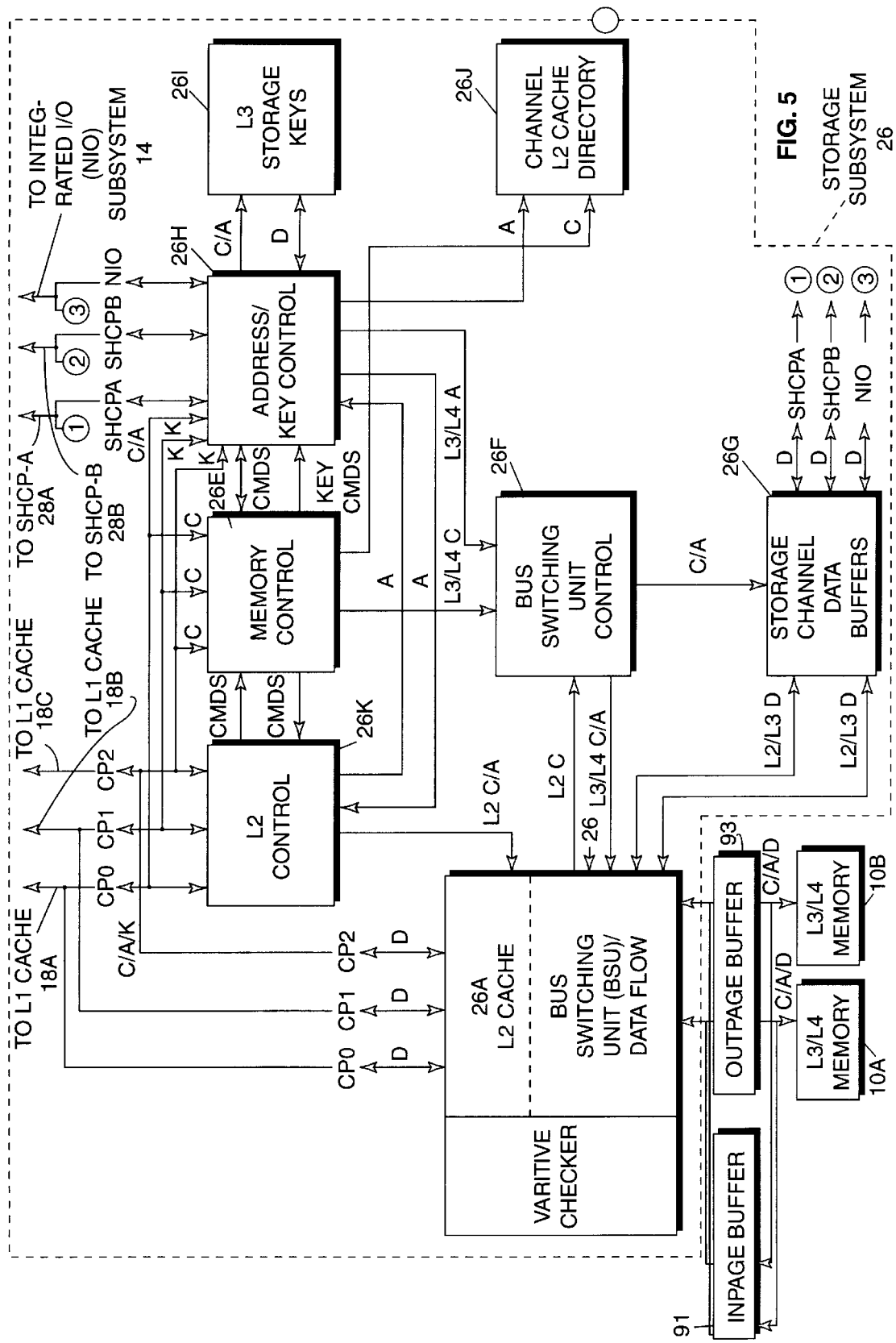
FIG. 5 illustrates a detailed construction of the storage subsystem of FIG. 4.

Referring to FIG. 5, the storage subsystem 10 of FIGS. 2 and 4 is illustrated.

In FIG. 5, the storage subsystem 10 includes an L2 control 10k, an L2 cache/bus switching unit 26a/26, an L3/L4 port 0 10c and an L3/L4 port 1 10d connected to the L2 cache/bus switching unit 26a/26, a memory control 10e connected to the L2 control 10k, a bus switching unit control of connected to the L2 cache/bus switching unit 26a/26 and to the memory control 10e, storage channel data buffers 10g connected to the bus switching unit control 10f and to the L2 cache/bus switching unit 26a/26, an address/key control 10h connected to the memory control 10e and to the L2 control 10k, L3 storage keys 10i connected to the address/key control 10h, and a channel L2 cache directory 10j connected to the memory control 10e and to the address key control 10h.

In FIG. 5, the L2 cache/bus switching unit 26a/26 generates three output signals: cp0, cp1, and cp2. The L2 control 10k also generates three output signals: cp0, cp1, and cp2. The cp0 output signal of the L2 cache/bus switching unit 26a/26 and the cp0 output signal of the L2 control 10k jointly comprise the output signal from storage subsystem 10 of FIG. 1 energizing the first L1 cache storage 18a. Similarly, the cp1 output signals from L2 cache/bus switching unit 26a/26 and L2 control 10k jointly comprise the output signal from storage subsystem 10 of FIG. 1 energizing the second L1 cache storage 18b and the cp2 output signals from the unit 26a/26 and control 10k jointly comprise the output signal from storage subsystem 10 of FIG. 1 energizing the third L1 cache storage 18c.

In FIG. 5, the storage channel data buffers 10g generate three output signals: shcpa, shcpb, and nio, where shcpa refers to shared channel processor A 28a, shcpb refers to shared channel processor B 28b, and nio refers to integrated adapter system 14/16. Similarly, the address/key control 10h generates the three output signals shcpa, shcpb, and nio. The shcpa output signal from the storage channel data buffers 10g in conjunction with the shcpa output signal from the address/key control 10h jointly comprise the output signal generated from the storage subsystem 10 of FIG. 1 to the shared channel processor A 28Pa. The shcpb output signal from the storage channel data buffers 10g in conjunction with the shcpb output signal from the address/key control 10h jointly comprise the output signal generated from the storage subsystem 10 of FIG. 1 to the shared channel processor B 28b. The nio output signal from the storage channel data buffers 10g in conjunction with the nio output signal from the address/key control 10h jointly comprise the output signal generated from the storage subsystem 10 of FIG. 1 to the integrated adapter subsystem 14/16.

A functional description of the storage subsystem 10 of the present invention will be set forth in the following paragraphs with reference to FIGS. 1 through 5 of the drawings, and, in particular, FIG. 5 which specifically defines the construction of the storage subsystem 10 of the present invention.

The functional description of the storage subsystem 10 set forth below is divided into sections, each section describing a particular operation within the functional description. Before beginning the functional description, it would be helpful to provide a table of contents, whereby each particular operation may be cross-referenced to its particular section. This table of contents is set forth below.

TABLE OF CONTENTS

| Operation Title | Section |
|---|---|
| Storage Operations | 1 |
| Processor Storage Architecture Requirements | 1.1 |
| Queued Store Accesses | 1.1.1 |
| Single Image Storage | 1.1.2 |
| Single access requirement | 1.1.3 |
| Operand Overlap | 1.1.4 |
| Interlocked Update Rules | 1.1.5 |
| Operand Store Compare | 1.1.6 |
| Program Store Compare | 1.1.7 |
| Hierarchical Processor Storage System | 1.2 |
| Level 1 Cache Storage (L1) | 1.2.1 |
| Level 2 Cache Storage (L2) | 1.2.2 |
| Level 3 Processor Storage (L3) | 1.2.3 |
| Level 3 Processor Storage Keys | 1.2.4 |
| Reference Bit Implicit Update Rules | 1.2.4.1 |
| Change Bit Implicit Update Rules | 1.2.4.2 |
| Level 4 Extended Storage (L4) | 1.2.5 |
| Hierarchical Cache Data Rules | 1.3 |
| Intraprocessor L1 Cache Data Rules | 1.3.1 |
| Operand Store Compare | 1.3.1.1 |
| Program Store Compare | 1.3.1.2 |
| L1 Cache Inpage Buffer Compare | 1.3.1.3 |
| Interprocessor L1 Cache Data Rules | 1.3.2 |
| Fetch Accesses | 1.3.2.1 |
| Store Accesses | 1.3.2.2 |
| Storage Routines | 2 |

TABLE OF CONTENTS -continued

| Operation Title | Section |
|---|---|
| MP/3 Processor Storage Fetch Routines | 2.1 |
| Storage Fetch, TLB Miss | 2.1.1 |
| Storage Fetch, TLB Hit, Access Exception, L1 Cache Hit or Miss | 2.1.2 |
| Storage Fetch, TLB Hit, No Access Exceptions, L1 Cache Hit, No Pending Store Conflict | 2.1.3 |
| Storage Fetch, TLB Hit, No Access Exceptions, L1 Cache Miss, No Pending Store Conflict, L2 Cache Hit | 2.1.4 |
| Storage Fetch, TLB Hit, No Access Exceptions, L1 Cache Miss, No Pending Store Conflict, L2 Cache Miss | 2.1.5 |
| Storage Fetch and Lock, TLB Hit, No Access Exceptions, L1 Cache Hit or Miss, L2 Cache Hit | 2.1.6 |
| Storage Fetch and Lock, TLB Hit, No Access Exceptions, L1 Cache Miss, L2 Cache Miss | 2.1.7 |
| MP/3 Processor Storage Store Routines | 2.2 |
| Storage Store, TLB Miss | 2.2.1 |
| Storage Store, TLB Hit, Access Exception | 2.2.2 |
| Storage Store, Non-Sequential, TLB Hit, No Access Exceptions, Delayed Store Queue Transfer, L2 Cache Busy | 2.2.3 |
| Storage Store, Non-Sequential, TLB Hit, No Access Exceptions, L2 Cache Hit | 2.2.4 |
| Storage Store, Non-Sequential, TLB Hit, No Access Exceptions, L2 Cache Miss | 2.2.5 |
| Storage Store, Sequential, Initial L2 Line Access, TLB Hit, No Access Exceptions, L2 Catch Hit | 2.2.6 |
| MP/3 Processor Storage Request Combinations | 2.3 |
| Pending Store Conflict | 2.3.1 |
| Storage Consistency Example 1 | 2.3.2 |
| Storage Consistency Example 2 | 2.3.3 |
| Processor Storage Commands | 2.4 |
| Alter L2 Cache Request Priority | 2.4.1 |
| Alter Memory Control Request Priority | 2.4.2 |
| Enable Memory Error Correction Bypass | 2.4.3 |
| Flush Store Queue | 2.4.4 |
| Force L2 Cache Line Replacement Algorithm | 2.4.5 |
| Invalidate L1 Cache Line or Congruence | 2.4.6 |
| Invalidate L2 Cache Entry | 2.4.7 |
| Read Memory Internal Registers | 2.4.8 |
| Set Address-Limit Check | 2.4.9 |
| Invalidate and Flush L2 Cache Entry | 2.4.10 |
| Pad L3 Line | 2.4.11 |
| Reset Processor Storage Interface | 2.4.12 |
| Transfer L3 Line to Memory Buffer | 2.4.13 |
| Transfer L4 Line to Memory Buffer | 2.4.14 |
| Transfer Memory Buffer to L4 Line | 2.4.15 |
| Test and Set | 2.4.16 |
| Transfer Memory Buffer to L3 Line | 2.4.17 |
| Write Memory Check-bit, Redundant-bit, and Special Function Registers Application | 2.4.18 |
| Write Memory Redundant-bit Address Registers | 2.4.19 |
| Processor Storage Key Commands | 2.5 |
| Fetch Storage Key | 2.5.1 |
| Insert Storage Key | 2.5.2 |
| Reset Reference Bit | 2.5.3 |
| Set Storage Key | 2.5.4 |
| Storage Routines | 3 |
| Channel Storage Fetch Routines | 3.1 |
| Storage Fetch, 1:8 Quadwords, No Access Exceptions, L2M Directory Hit/L2 Cache Hit | 3.1.1 |
| Storage Fetch, 1:8 Quadwords, No Access Exceptions, L2M Directory Hit/L2 Cache Miss | 3.1.2 |
| Storage Fetch, 1:8 Quadwords, No Access Exceptions, L2M Directory Miss | 3.1.3 |
| Channel Storage Store Routines | 3.2 |
| Storage Store, 1:128 Bytes, No Access Exceptions, L2M Directory Hit/L2 Cache Hit | 3.2.1 |
| Storage Store, 1:128 Bytes, No Access | 3.2.2 |

-continued

TABLE OF CONTENTS

| Operation Title | Section |
|---|---|
| Exceptions, L2M Directory Hit/L2 Cache Miss | |
| Storage Store, 1:128 Bytes, No Access Exceptions, L2M Directory Miss | 3.2.3 |
| Channel Storage Commands | 3.3 |
| Transfer Storage Channel Data Buffer to L4 Line | 3.3.1 |
| Transfer L4 Line to Storage Channel Data Buffer | 3.3.2 |
| Test and Set | 3.3.3 |
| Vector Storage Fetch Routines | 3.4 |
| Storage Fetch, TLB Miss | 3.4.1 |
| Storage Fetch, TLB Hit, Access Exception | 3.4.2 |
| Storage Line Fetch, TLB Hit, No Access Exceptions, L2 Cache Hit | 3.4.3 |
| Storage Line Fetch, TLB Hit, No Access Exceptions, L2 Cache Miss | 3.4.4 |
| Storage Element Fetch, TLB Hit, No Access Exceptions, L2 Cache Hit | 3.4.5 |
| Storage Element Fetch, TLB Hit, No Access Exceptions, L2 Cache Miss | 3.4.6 |

1. Storage Operations 1.1 Processor Storage Architecture Requirements

Certain specific computer systems have specific requirements for the manner in which processor storage and storage keys are implemented within a machine organization. In the following paragraphs, specific items from these architectures are discussed in their relationship to the storage subsystem of the present invention. The architecture refers to a 'conceptual sequence' of instruction execution. This is an important concept to understand in any discussion of the architectural requirements of processor storage. The conceptual sequence is quite simple: First, the instruction is fetched from processor storage and decoded. Next, operands are fetched, either from the architected registers or from processor storage. The function, as specified by the instruction operation code, is performed on the operands. The results of the performed function are returned either to the registers or processor storage and the condition code may be set. The instruction address in the PSW is updated. This completes the execution of a single instruction. Finally, the next instruction to be executed is fetched from processor storage and the sequence repeats. From the conceptual sequence, the notion of 'conceptually completed stores' is derived. A 'conceptually completed store' is one which has been completed to processor storage from the viewpoint of the instruction which requested the store. In reality, the store may have only been placed into the store queue, but not yet been physically stored into cache or processor storage. The concept allows early completion of instructions which store results to memory and the overlapping of early stages of execution of succeeding instructions.

1.1.1 Queued Store Accesses

Changes to storage occur by means of processor store accesses. Within a processor these store accesses are required to occur in the conceptual sequence. Put simply, the stores are required to be executed in the sequence specified by the instructions had the instructions been executed serially. Beyond that, the store accesses made are allowed to be queued, pending actual storing to memory, indefinitely. Certain situations require the flushing of the queued stores to storage. Within a processor, if a fetch request finds a queued store request pending to the same location in storage, the store must complete before the fetch is allowed. This is part of the single-image storage requirement discussed below. At the time of processor serialization, all stores pending for the processor must also be completed to storage.

1.1.2 Single-image Storage

The storage subsystem 10 is designed to work in several configurations: in a uniprocessor (MP/1); in a dyadic multiprocessor (MP/2); and in a triadic multiprocessor (MP/3). In all cases the memory system must maintain a single image to all of the processors in a given configuration. This implies that when a processor within the configuration alters storage all processors in the configuration see the change simultaneously. The observance of the change does not necessarily apply to channel references. The L2 cache handles the single-image architectural requirement by maintaining a record of what data exists at the L1 cache level within each of the processors in the configuration. When a store access is made apparent to the requesting processor all other processors in the configuration see the storage change as well. A store access is made apparent to the requester when the data are actually stored into the L2 cache. Making the store apparent to the other processors is accomplished through cross-invalidation in the other L1 caches of the L1 cache line which is modified by the requester.

1.1.3 Single-access Requirement

The vast majority of storage references require a single-access to the storage location. This means that an operand request, fetch or store, is permitted to access a storage location only once for each operand and type of access for each byte within the storage field. The requirement affects the retry philosophy for machine checks detected during store accesses in the memory system. Instruction retry cannot re-execute the store if another processor stores to the location between the time the instruction originally stored the results into L2 cache and the time retry attempts to repeat the store access. Within an instruction, sequential store operations are handled by building the modified field in L2 cache write buffers and only updating the L2 cache at end-of-operation for the instruction. This minimizes the information needed to guarantee this single-access requirement while reducing actual L2 cache busy cycles.

1.1.4 Operand Overlap

Within the storage-to-storage instructions, where both operands exist in storage, it is possible for the operands to overlap. Detection of this condition is required on a logical address basis. The memory system hardware actually detects this overlap on an absolute address basis. The destination field in storage is actually being built in the L1 store queue, and L1 cache if L1 cache directory hit, and in the L2 cache write buffers, not in the L2 cache itself. When operand overlap occurs the L1 cache store queue data and the old L1 line data from L2 cache are merged on inpage to L1 cache. In the case of destructive overlap, it is architecturally stated that the fetches for the overlapped portion are not necessarily fetched from storage. Hence, the actual updating of L2 cache is postponed until end-of-operation for the instruction.

1.1.5 Interlocked Update Rules

Interlocked updates represent an atomic update to a storage location. Within the configuration, when a processor fetches a storage location for the purposes of performing an interlocked update, the requester is guaranteed to have the only copy of the data until the store (update) to the storage location is completed by the requester. From this strict definition the architecture relaxes these rules. All channel references to interlocked update locations are allowed as usual. Normal fetch references to these locations are permitted by the processors in the configuration. Fetch accesses for the purposes of interlocked updates and store accesses by other processors in the configuration are prohibited pending completion of the store access by the original processor using the storage location for an interlocked update. In the storage subsystem, interlocked updates are accomplished on a double-word address basis and limited to one active interlocked update per processor in the configuration. A processor performs the following sequence to accomplish an interlocked update: First, the processor flushes the store queue. Next, a fetch-and-lock request is made to the L2 cache. If the double-word is not currently locked by another processor in the MP/3, the lock is granted to the requester. The first store access by the requester is assumed to be the store-and-unlock access. When end-of-operation is received for the instruction, the store is processed in the L2 area. If the store address does not match the fetch-and-lock address, a machine check results.

1.1.6 Operand Store Compare

As required by the conceptual sequence within a processor, if an instruction stores a result to a location in storage and a subsequent instruction fetches an operand from that same location the operand fetch must see the updated contents of the storage location. The comparison is required on an absolute address basis. With the queuing of store requests, it is required that the operand fetch be delayed until the store is actually completed at the L2 cache and made apparent to all processors in the configuration. For the uniprocessor, the restriction that the store complete to L2 cache before allowing the fetch to continue is waived as there exists no other processor to be made cognizant of the change to storage. It is not required that channels be made aware of the processor stores in any prescribed sequence as channels execute asynchronously with the processor. In this case, enqueuing on the L1 store queue, and updating the L1 operand cache if the data exist there, is sufficient to mark completion of the store. However, if the data are not in L1 cache at the time of the store, the fetch request with operand store compare must wait for the store to complete to L2 cache before allowing the inpage to L1 cache to guarantee data consistency in all levels of the cache storage hierarchy.

1.1.7 Program Store Compare

Within a processor, two cases of program store compare exist: the first involves an operand store to memory followed by an instruction fetch from the same location (store-then-fetch); the second involves prefetching an instruction into the instruction buffers and subsequently storing into that memory location prior to execution of the prefetched instruction (fetch-then-store). As required by the conceptual sequence within a processor, if an instruction stores a result to a location in storage and a subsequent instruction fetch is made from that same location, the instruction fetch must see the updated contents of the storage location. The comparison is required on a logical address basis. With the queuing of store requests, it is required that the instruction fetch be delayed until the store is actually completed at the L2 cache and made apparent to all processors in the configuration. For the second case, the address of each operand store executed within a processor is compared against any prefetched instructions in the instruction stream and, if equal, the appropriate instructions are invalidated. The source of the prefetched instructions, the L1 instruction cache line, is not actually invalidated until the operand store occurs in L2 cache. At that time, L2 cache control requests invalidation of the L1 instruction cache line. There can be no relaxation of the rules for the uniprocessor as the program instructions reside in a physically separate L1 cache than the program operands, and stores are made to the L1 operand cache only. As such, the store-then-fetch case requires that the L2 cache contain the most recent data stored by the processor prior to the inpage to the L1 instruction cache.

1.2 Hierarchical Processor Storage System

The processor storage is implemented as a multiple level memory system. As a general rule, as one progresses from the highest level to the lowest level in the hierarchy the access time and the size of the memory increase. The first level of the storage system is the set of caches unique to each processor in the configuration. The next level of the hierarchy is the second level cache. This cache is a resource shared by all processors within the configuration. The third level of storage is the main storage, the processor storage referred to by the architecture. The final level of storage available to the processors is the extended storage. This area is intended to serve as a semiconductor paging device under exclusive control of the system control program.

1.2.1 Level 1 Cache Storage (L1)

Within each processor, three caches exist at the first level, referred to as the L1 level: the control store, instruction, and operand caches. Each L1 cache is responsible for maintaining data unique to particular hardware functions. The L1 control store cache (L1CS) represents the storage device for pagable microcode for the processor. As all of the processor microcode is unable to be maintained resident in the fixed control storage, selected microcode-controlled functions are made pagable. The microcode routines physically reside in hardware-controlled storage, part of main storage inaccessible to the system control program, and are paged into the L1CS on a demand basis. The contents of this cache are not monitored by the second level cache as 370-XA program data are not loaded into this cache and 370-XA programs do not have access to the pagable microcode in hardware-controlled storage. As such, there is no need to track the contents of the L1CS for architectural support. The L1 instruction cache (L1I) is used to hold 370-XA program instructions. All instruction fetches made due to program branches of any form, and all instruction prefetches for sequential instruction processing, are made to the L1I cache. The contents of this cache are tracked by the second level cache as the data in this cache represent architected program data. Operand stores do not modify the contents of this cache but invalidate the data if it exists in this cache when the store is executed by the processor. The organization of the L1I cache is 64 congruence classes by six-way set-associative. A set-associative read access yields 16 bytes per associativity or cache set; inpages can accommodate 16-byte writes into cache. The L1I cache line size is 64 bytes. These dimensions yield a 24KB instruction cache. The cache is divided into an L1 cache directory array which maintains the high-order L1 cache line absolute address bits and an L1 cache data array. The L1 operand cache (L1D) maintains the 370-XA program operands. All operand fetches and stores for instruction execution are made to this L1 cache. The L1D cache is a store-through cache, implying that operand fetches which miss the L1D cache require an inpage to the cache before the instruction is allowed to proceed, but that operand stores do not. When a processor operand fetch request misses L1D cache, the data must be inpaged from L2 cache or L3 storage. As the data are transferred to the L1D cache from lower levels of storage, the double-word which was originally requested is returned first, followed by the remainder of the L1 cache line. In this way, the processor can be released early to restart processing while overlapping the completion of the cache line inpage to the L1 operand cache. When an operand store request is made to the L1D cache, if the data exists in the L1D cache it is updated at the time of the store and placed on the store queue in parallel. If the data does not exist in the L1D cache at the time of the store, the address, data, and controls associated with the store are simply placed on the store queue. No inpage to the L1D cache is executed for L1 store misses. The contents of this cache are tracked by the second level cache as the data in this cache represent architected program operands. The organization of the L1D cache is 64 congruence classes by six-way set-associative. A set-associative read access yields 16 bytes per associativity or cache set; the writes are on an 8-byte basis with byte write control; inpages can accommodate 16-byte writes into cache. The L1D cache line size is 64 bytes. These dimensions yield a 24KB operand cache. The cache is divided into an L1 cache directory array which maintains the high-order L1 cache line absolute address bits and an L1 cache data array.

1.2.2 Level 2 Cache Storage (L2)

Within the triadic multiprocessor a second level cache storage exists. It is the function of this cache to provide a larger buffer storage for the three processors it supports in addition to enforcing the architectural requirements for processor storage in a multiprocessor environment. Both instructions and operands exist in this cache and are indistinguishable at this level. The L2 cache is a shared resource for the processors in the configuration. It is designed as a store-in cache, meaning that all processor references force the data to be copied to L2 cache prior to completion. An L1 cache fetch miss forces an inpage to the L1 cache from the L2 cache and if the data are not resident in L2 cache at that time, it is inpaged to L2 cache from processor storage in parallel with the transfer to L1 cache. Again, the data are inpaged in an order which permits the first data transfer to contain the double-word desired by the originating processor request. All processor store requests must be stored into the L2 cache. If the L2 cache line does not exist at the time the L2 cache attempts the store it is inpaged into L2 cache, but not L1 cache, prior to completion of the store request. The L2 cache tracks all data in the L1 caches, both L1I and L1D, for each processor in the MP/3. The L2 cache maintains storage consistency among the processors as stores are made to the L2 cache array through local-invalidation of L1 instruction cache copies within the requesting processor and cross-invalidation of alternate processor L1 cache copies. The organization of the L2 cache is 512 congruence classes by six-way set-associative. A set-associative read yields 32 bytes per associativity or cache set; a full line read can yield 128 bytes in two cache cycles; the write access is one to 128 bytes within an L2 cache line with byte write control; inpages from processor storage write into an inpage buffer and complete with a two-cycle 128-byte write access. The L2 cache line size is 128 bytes. These dimensions yield a 384KB cache in the MP/3. The cache is divided into an L2 cache directory array which maintains the high-order L2 cache line absolute address bits and an L2 cache data array. Additionally, to track the data which exist at the L1 cache level, the directory structure of the L1 cache arrays is duplicated. For each 64-byte L1 cache line the L2 L1 status array maintains the high-order L2 congruence, as a given L1 congruence can map into 16 L2 congruences, plus the L2 cache set. In this way the L2 cache records what exists at the L1 cache level for the processors in the MP/3.

1.2.3 Level 3 Processor Storage (L3)

Within the MP/3 up to 128MB of main storage exists. This memory is addressed with absolute addresses supplied in the processor storage requests, The memory controller has two physical ports available to L3. The ports are divided into even and odd 128-byte L3 lines. The L3 storage interface is a 16-byte bi-directional, multiplexed command/address and data buss. The memory controller can have two parallel operations active, one to each port. From the processor viewpoint, all accesses to L3 storage are for inpage and outpage requests using full 128-byte line operations. From the channel viewpoint, either partial (one to 128 bytes) or full line operations are available to L3 storage. Storage reconfiguration is supported in anticipation of the two-frame system. The support consists of arrays, called subincrement frame maps and memory maps, which allow another level of address translation. This address translation is from absolute to physical and is supported in subincrements of 2MB. The subincrement frame maps permit rapid identification of L3 memory ports while the memory maps accomplish full translation from absolute to physical addresses.

1.2.4 Level 3 Processor Storage Keys

A storage key is supported for each 4KB page in processor storage. The key consists of a 4-bit access-control field, a fetch-protection bit, a reference bit, and a change bit. The storage keys are maintained in arrays separate from processor storage and are accessed in a manner different than processor storage data. Several instructions exist in the architecture which explicitly manipulate the storage keys. In addition to these instructions, alterations to the reference and change bits are made implicitly during various storage requests executed within the storage hierarchy.

1.2.4.1 Reference Bit Implicit Update Rules

For each fetch request in the processors which yields an L1 cache fetch miss, the reference bit of the 4KB page containing the desired L1 line is set to '1'b as part of the inpage process. For each store request executed in the L2 cache the reference bit of the 4KB page containing the modified double-word or L2 cache write buffer is set to '1'b. For storage commands involving a storage field sourced directly from processor storage the command sets the associated reference bit accordingly. For channel requests, every time a fetch or store request to memory is made the reference bit of the containing 4KB page is set to '1'b whether the request finds data in L2* cache or processor storage.

1.2.4.2 Change Bit Implicit Update Rules

For each store request executed in the L2 cache the change bit of the 4KB page containing the modified double-word or L2 cache write buffer is set to '1'b. For storage commands involving a storage field modified directly in processor storage the command sets the associated change bit to '1'b. For channel requests, every time a store request to memory is made the change bit of the containing 4KB page is set to '1'b whether the request finds data in L2 cache or processor storage.

1.2.5 Level 4 Extended Storage (L4)

Within the MP/3 up to 256MB of extended storage exists. This memory is addressed with absolute addresses and is considered to be entirely under control of the system control program. The memory controller has one physical port available to L4. The size of the L4 lines is 128 bytes. The L4 storage interface is a 16-byte bi-directional, multiplexed command/address and data buss. The memory controller can have one operation utilizing L4 storage active at any given instant. All processor accesses to L4 storage use a shared memory data buffer and access full 128-byte lines addressed on 128-byte boundaries. All channel accesses to L4 storage use any one of the set of storage channel data buffers and access full 128-byte lines addressed on 128-byte boundaries.

1.3 Hierarchical Cache Data Rules

To maintain data consistency within a cache organization with two levels of data retention certain rules must be established. Some of the rules are necessary to meet architectural requirements and others are necessary due to the implementation of the hardware. The L1 caches themselves are responsible for handling storage consistency within a processor. The L2 cache is primarily responsible for handling the consistency of the L1 caches in the MP/3 between the processors in the configuration.

1.3.1 Intraprocessor L1 Cache Data Rules

Within a processor, an L1 cache line (64 bytes) can simultaneously exist in both the L1 instruction cache and L1 operand cache. This implies that instruction fetches and operand fetches can occur to the same line concurrently within a processor. However, as processor store requests are made to the L1D cache. only, such requests must invalidate any L1 instruction cache line containing the modified field. When the store is subsequently serviced by the L2 cache, the L2 cache checks its L1 status for the requester's L1 instruction cache. If a copy is found in the instruction cache, the L1 status for the instruction cache is cleared and a local-invalidation request is transferred to the requesting processor to invalidate the L1 instruction cache copy. No change to the L1 operand cache L1 status occurs when the store completes in L2 cache. The invalidation is guaranteed to take place in a specified number of cycles and the invalidation process does not affect the store operation into L2 cache in any other way, i.e., no delay is incurred in the L2 cache pipeline to accomplish the L1 cache copy local-invalidation. Note that stores within the store queue are serviced in the sequence they enter the queue. This implies that a pending store conflict, a store which must be completed to allow a fetch request, may be several entries away from the oldest store queue entry. The rules for operand store compare and program store compare must be obeyed within the processor.

1.3.1.1 Operand Store Compare

When an operand fetch request is presented to the L1 operand cache, the absolute address must be compared against the active entries in that processor's L1 store queue. An active entry is a conceptually completed store, one that has been placed onto the store queue for an instruction completed from the processor's viewpoint, but not written into the L2 cache. Two situations must be handled. To minimize the possibility of operand store compares, when the operand fetch request results in an L1 cache hit, the operand fetch absolute address is compared against the active L1 store queue entries to the eight-byte boundary. Should an equal compare result, the fetch is held pending the completion of the necessary store request(s) in the L2 cache. This is an architectural requirement for a single-image storage system in a multiprocessor configuration. In the case when the operand fetch results in an L1 cache miss, the operand fetch absolute address is compared against the active L1 store queue entries to the L1 cache line (64-byte) boundary. Should an equal compare result, the fetch is held pending the completion of the necessary store request(s) in the L2 cache. This is necessary to guarantee that all stores pending to the L1 cache line are complete in L2 cache prior to inpaging the L1 line to the L1 operand cache. This maintains data consistency within the cache storage hierarchy. As part of the inpage process the L2 updates its L1 status to reflect the presence of the L1 line in the appropriate L1 operand cache. The case of destructive operand overlap within storage-to-storage instructions must be considered. In this situation, an operand store compare condition exists within an instruction as the first byte of the first storage operand lies within the storage field of the second operand. Here the operand store compare is for the currently active instruction and the fetch request must be handled in a special way. When a fetch with L1 hit results, the data can be obtained from the L1 cache as it contains the modified storage field. If a fetch with L1 miss results, the inpage data from the L2 cache are merged with the L1 store queue data to form the most recent copy of the L1 line before delivering the requested data to the processor and updating the L1 cache and directory. The purpose of using the L1 line comparison for the L1 miss condition is to maintain data consistency between the L1 and L2 caches. An example is used to explain the situation. Label an L1 cache line 'A'. Label the double words 'A0' through 'A7' in line 'A'. A store instruction places data into 'A2' and the line does not currently exist in L1. Consequently, an entry is made only to the store queue. A subsequent fetch instruction requests 'A5'. No pending store conflict exists for the data stored, however an L1 cache miss occurs as the line is not in L1 cache. The L2 transfers the line to the L1 cache and the fetch is completed. The store for 'A2' completes in the L2 cache and the entry is removed from the queue. The data in L1 and L2 for 'A2' are no longer equal. The status of the replaced L1 cache line is considered. If the line is unmodified or if the line is modified but no pending stores for that line exist in the store queue, an identical copy also exists in the L2 cache. The L1 line is simply replaced by the incoming line for the fetch request. If the line is modified, but pending stores for that line exist in the store queue an exact copy does not exist at the L2 cache level. However, this does not present a problem. The pending stores will eventually be completed and the line to which they pertain will exist only at the L2 cache level unless a subsequent fetch request asks for data within that line. At that time the stores are forced to complete prior to the inpage due to pending store conflicts for the incoming L1 cache line. In all cases, the L1 line selected for replacement is simply overwritten by the incoming line for the fetch request.

1.3.1.2 Program Store Compare

When an instruction fetch or instruction prefetch request is presented to the L1 instruction cache, the logical address must be compared against the active entries in that processor's L1 store queue. An active entry is a conceptually completed store, one that has been placed onto the store queue for an instruction completed from the processor's viewpoint, but not written into the L2 cache. Again, two situations must be handled. In the case of store-then-fetch, the operand store request precedes the instruction fetch request. When the instruction fetch request results in an L1 cache hit, the instruction fetch logical address is compared against the active L1 store queue entries to the eight-byte boundary. Should an equal compare result, the fetch is held pending the completion of the necessary store request(s) in the L2 cache. This ultimately results in L2 cache requesting local-invalidation of the L1 instruction cache copy. Once the pending store conflict is removed, re-execution of the instruction fetch results in an L1 cache miss. When the instruction fetch request results in an L1 cache miss, the instruction fetch logical address is compared against the active L1 store queue entries to the L1 cache line (64-byte) boundary. Should an equal compare result, the fetch is held pending the completion of the necessary store request(s) in the L2 cache. This is necessary to guarantee that all stores pending to the L1 cache line are complete in L2 cache prior to inpaging the L1 line to the L1 instruction cache. This maintains data consistency within the cache storage hierarchy. As part of the inpage process the L2 updates its L1 status to reflect the presence of the L1 line in the appropriate L1 instruction cache. In the case of fetch-then-store, an instruction fetch request precedes the operand store request. In this case the data exist in the L1 instruction cache and possibly the instruction buffers. A match of the operand store address with a prefetched instruction address causes invalidation of the necessary instruction buffer contents at the time the operand store request is made to the L1 operand cache. The discarded instructions will then have to be refetched from storage after completion of the necessary stores to L2 cache. Once the pending store conflict is serviced in the L2 cache, the L2 clears the appropriate entry in the L1 status and requests local-invalidation of the L1 instruction cache copy. Refetching the instructions now results in an L1 cache miss and an inpage from L2 cache. The implementation of the L1 cache as separate instruction and operand caches results in a translation look-aside buffer (TLB) for each. As the contents of each TLB may be different, an operand store which results in an operand cache TLB hit may result in an instruction cache TLB miss. Under such circumstances, an L1 cache line coexisting in the L1 instruction and operand caches can not be immediately invalidated by the L1 instruction cache as the logical address does not successfully translate to an absolute address necessary to check the instruction cache directory. This can be overcome by two alternative methods to the one selected. First, a duplicate operand cache TLB within the instruction cache function can be maintained to guarantee address translation success. Second, the processor can be stopped to allow the instruction cache function to translate the address, either by retrieving the translated address from the operand cache TLB or through actual address translation. Neither of these alternatives is as efficient as the one selected.

1.3.1.3 L1 Cache Inpage Buffer Compare

The L1 operand cache contains an inpage buffer designed to hold an L1 cache line on inpage due to L1 cache miss. On an L1 fetch miss the inpage process transfers the desired double-word first, with the remainder of the L1 cache line following. Rather than load the inpage data directly into the L1 cache, sixteen bytes at a time, the data are loaded into the L1 cache inpage buffer. After the initial data transfer, the processor pipeline is restarted and processing is allowed to continue. Subsequent fetch and store requests can occur to the L1 cache while the previous inpage completes to the L1 cache inpage buffer. This facility complicates the cache data rules, however. After the initial data transfer and the restart of the processor pipeline, if a subsequent fetch request requires data from the same L1 cache line it must wait for the data to be transferred into the L1 cache inpage buffer before continuing. Although still considered an L1 fetch miss, the request is not transferred to L2 cache as the inpage of the L1 cache line is already in progress. After the initial data transfer and the restart of the processor pipeline, if a subsequent store request occurs to the same L1 cache line the store request is aborted and the processor pipeline is stopped until the L1 cache inpage buffer contents are loaded into L1 cache and the cache directory is updated. This is required to maintain data consistency between levels in the cache storage hierarchy and to avoid the possibility of the L1 status reflecting multiple occurrences of a given L1 cache line in a single L1 cache. Alternatively, the store request could cause invalidation of the L1 cache inpage buffer contents, allowing instruction processing to continue. This, however, may result in the L1 cache line appearing in more than one cache set to L2 control. Consider the following example. An L1 line is currently being inpaged into the L1 cache inpage buffer for a fetch miss. After the initial data transfer from L2 cache, the processor pipeline is restarted. The L1 status is updated in L2 control, but L1 activity prevents loading the inpage buffer contents into the L1 cache and the updating of the L1 directory. A store to the line in the inpage buffer occurs, causing invalidation of the inpage buffer contents. A subsequent fetch to the same line causes an inpage to the L1 cache, possibly to a different L1 cache set. As a result of the L1 fetch miss, the L2 L1 status array is updated. The L1 status now reflects the double presence of the line in L1 cache.

1.3.2 Interprocessor L1 Cache Data Rules

In the MP/3, a given L1 cache line can exist in multiple processors at the same time. This could result in up to six copies existing at the L1 cache level in the MP/3 when both instruction and operand caches in each processor contain a copy.

1.3.2.1 Fetch Accesses

For storage fetch accesses by the processor, barring any pending store conflicts within the processor, the access is never prohibited. A fetch with L1 cache hit continues without concern over the possible existence of the L1 line in the alternate processors. The situation of interest is a fetch L1 miss. When the request is serviced by the L2 cache, the L1 inpage request ignores any lock held by the alternate processors to a double-word within the requested L1 line, and the L1 status for the appropriate L1 cache is updated to reflect the presence of the new line in the L1 cache. For fetch-and-lock accesses by the processor the store queue of the processor would first have been flushed to L2 cache such that no pending store conflicts exist. The fetch access is only prohibited if another processor already contains a lock on the same double-word. Otherwise, the double-word lock is granted, and the fetch access is permitted, allowing a copy of the L1 line to exist in multiple processors. With this implementation it is possible for all processors within the MP/3 to hold a lock to a different double-word within the same L1 cache line.

1.3.2.2 Store Accesses

On a store access by a processor, in addition to the intraprocessor L1 cache data rules, cross-invalidation of the other processor L1 caches must take place. The invalidation of the other processor L1 cache copies is done at the time the store request is serviced at the L2 cache level and the L2 cache data arrays are updated. For sequential store operations no L1 cache copy check is made during the transfer of store queue data into the L2 cache write buffers, but only during the sequential store completion routine when the L2 cache is actually updated. The L2 L1 status arrays for the other processors' L1 caches are searched for the specified L1 cache line. If it is found, an invalidate request is simultaneously sent to both L1 caches in the alternate processors, as required, and the copy status for the invalidated L1 cache lines is cleared in the appropriate L1 status arrays. The invalidation is guaranteed to take place in a specified number of cycles and the invalidation process does not affect the store operation into L2 cache in any other way, i.e., no delay is incurred in the L2 cache pipeline to accomplish the L1 cache copy cross-invalidation. Instructions or operands prefetched from L1 cache within a processor, but not yet used in that processor, are not required to be invalidated due to cross-invalidation of L1 cache copies when a store access occurs in L2 cache due to another processor in the configuration. However, if an L1 cache line requested by cross-invalidation exists in part or in whole in the L1 cache inpage buffer it must be invalidated as if the line existed in the L1 cache. This is necessary to guarantee architectural compliance. Invalidation of interprocessor L1 cache copies is only done on store accesses at the L2 cache level. In reality, the invalidation for interlocked updates could be done on the fetch-and-lock access, but this would prevent fetch accesses or fetch-and-lock accesses to other data within the L1 cache line by the alternate processors. As interlocked updates require setting the lock register at the L2 cache level, and the lock is on a double-word in storage, it was decided to do the invalidation on the store-and-unlock access, allowing concurrent fetches to that L1 cache line. Consequently, fetch accesses never require L1 cache copy cross-invalidation.

2. Storage Routines 2.1 MP/3 Processor Storage Fetch Routines 2.1.1 Storage Fetch, TLB Miss The execution unit issues a processor storage fetch request to the L1 cache. The set-associative TLB search fails to yield an absolute address for the logical address presented by the request. A request for dynamic address translation is presented to the execution unit and the current storage operation is suspended pending its results. The TLB miss overrides the results of the L1 cache directory search due to the lack of a valid absolute address for comparison from the TLB. A set-associative read to the L1 cache is simultaneously accomplished. The data obtained are ignored. The request is not transferred to the L2 cache due to the TLB miss condition. The request is subsequently re-executed if the address translates successfully.

2.1.2 Storage Fetch, TLB Hit, Access Exception, L1 Cache Hit or Miss

The execution unit issues a processor storage fetch request to the L1 cache. The set-associative TLB search yields an absolute address for the logical address presented by the request. However, an access exception, either protection or addressing, is detected as a result of the TLB access. The execution unit is notified of the access exception and the current storage operation is nullified. The access exception overrides the results of the L1 cache directory search. A set-associative read to the L1 cache is simultaneously accomplished. The data obtained are ignored. The request is not transferred to the L2 cache due to the access exception.

2.1.3 Storage Fetch, TLB Hit, No Access Exceptions, L1 Cache Hit, No Pending Store Conflict The execution unit issues a processor storage fetch request to the L1 cache. The set-associative TLB search yields an absolute address, with no access exceptions, for the logical address presented by the request. The search of the L1 cache directory finds the data in cache, an L1 hit, through equal comparison with the absolute address from the TLB. A set-associative read to the L1 cache is simultaneously accomplished. As a result of the L1 cache hit, if L1 operand cache request, the fetch request absolute address is compared against the conceptually completed store queue entry absolute addresses to the eight-byte boundary for pending store conflicts; if L1 instruction cache request, the fetch request logical address is compared against the conceptually completed store queue entry logical addresses to the eight-byte boundary for pending store conflicts. Also, if this fetch request is part of the execution of a storage-to-storage instruction, the absolute addresses of the store queue entries for this instruction are compared for destructive operand overlap detection. No pending store conflicts exist. The set-associative cache directory search identifies the cache set by an equal compare with the absolute address from the TLB and the data selected are properly adjusted per the request and address for transfer to the requester. The request is not transferred to the L2 cache due to the L1 cache hit condition.

2.1.4 Storage Fetch, TLB Hit, No Access Exceptions, L1 Cache Miss, No Pending Store Conflict, L2 Cache Hit The execution unit issues a processor storage fetch request to the L1 cache. The set-associative TLB search yields an absolute address, with no access exceptions, for the logical address presented by the request. The set-associative search of the L1 cache directory reveals that the requested data are not in cache, an L1 miss, due to a miscompare with the address from the TLB. A set-associative read to the L1 cache is simultaneously accomplished. As a result of the L1 cache miss, if L1 operand cache request, the fetch request absolute address is compared against the conceptually completed store queue entry absolute addresses to the L1 line (64-byte) boundary for pending store conflicts; if L1 instruction cache request, the fetch request logical address is compared against the conceptually completed store queue entry logical addresses to the L1 line (64-byte) boundary for pending store conflicts. Also, if this fetch request is part of the execution of a storage-to-storage instruction, the absolute addresses of the store queue entries for this instruction are compared for destructive operand overlap detection. No pending store conflicts exist. L1 cache transfers the processor storage fetch request and absolute address bits 4:28 to L2 as an inpage to L1 cache is required. In the following cycle, the L1 cache set of the L1 line which is to be replaced is transferred to L2 along with the L1 cache identifier: control store, instruction, or operand cache. The selected replacement entry is invalidated in the L1 cache directory. If a pending store conflict exists, the L1 fetch miss request is not transferred to L2 cache until the processor store request yielding the pending store conflict is written into L2 cache and the condition is cleared in L1. The L2 cache priority selects this processor fetch request for service. L2 control transfers a processor L2 cache fetch command and L2 cache congruence to L2 cache control and a processor L2 cache fetch command to memory control. An inpage to the L1 cache of the requesting processor is required and is allowed regardless of any lock or line-hold which the requesting processor may possess or any lock or line-hold without uncorrectable storage error indicator active any alternate processor may possess. One of two conditions result from the L2 cache directory search which yield an L2 cache hit.

Case 1

The search of the L2 cache directory results in an L2 cache hit, but a freeze register with uncorrectable storage error indicator active or line-hold register with uncorrectable storage error indicator active is set for an alternate processor for the requested L2 cache line. L2 control suspends this fetch request pending release of the freeze or line-hold with uncorrectable storage error. Store queue requests for this processor can still be serviced by L2 control. No information is transferred to address/key. The L2 cache line status and cache set are transferred to L2 cache control, the cache set modifier is transferred to L2 cache, and the L2 cache line status is transferred to memory control. Locked status is forced due to the alternate processor freeze or line-hold with uncorrectable storage error conflict. The L1 status array update is blocked due to the freeze or line-hold with uncorrectable storage error conflict. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 hit and locked, blocks any data transfers to the requesting L1 cache and drops the command. Memory control receives the L2 command and L3 port identification. Upon receipt of the L2 cache line status, L2 hit and locked, the request is dropped.

Case 2

The search of the L2 cache directory results in an L2 cache hit. The absolute address is transferred to address/key with a set reference bit command. The L2 cache line status and cache set are transferred to L2 cache control, the cache set modifier is transferred to L2 cache, and the L2 cache line status is transferred to memory control. The L1 status array of the requesting processor's L1 cache is updated to reflect the presence of the L1 line in L1 cache. The L1 cache congruence is used to address the L1 status arrays and the L2 cache set and high-order congruence are used as the data placed into the entry selected by the L1 cache set and identification transferred with the processor fetch request. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 hit and not locked, uses the L2 cache set to select the proper 32 bytes on each read cycle and gate 8 bytes per transfer cycle to the requesting L1 cache, starting with the double-word initially requested. While the processing is restarted, the L1 cache inpage operation completes with the loading of the cache followed by the update of the L1 cache directory. Memory control receives the L2 command and L3 port identification. Upon receipt of the L2 cache line status, L2 hit and not locked, the request is dropped. Address/key receives the absolute address for reference bit updating. The reference bit for the 4KB page containing the L1 cache line requested by the processor fetch request is set to '1'b.

2.1.5 Storage Fetch, TLB Hit, No Access Exceptions, L1 Cache Miss, No Pending Store Conflict, L2 Cache Miss The execution unit issues a processor storage fetch request to the L1 cache. The set-associative TLB search yields an absolute address, with no access exceptions, for the logical address presented by the request. The set-associative search of the L1 cache directory reveals that the requested data are not in cache, an L1 miss, due to a miscompare with the address from the TLB. A set-associative read to the L1 cache is simultaneously accomplished. As a result of the L1 cache miss, if L1 operand cache request, the fetch request absolute address is compared against the conceptually completed store queue entry absolute addresses to the L1 line (64-byte) boundary for pending store conflicts; if L1 instruction cache request, the fetch request logical address is compared against the conceptually completed store queue entry logical addresses to the L1 line (64-byte) boundary for pending store conflicts. Also, if this fetch request is part of the execution of a storage-to-storage instruction, the absolute addresses of the store queue entries for this instruction are compared for destructive operand overlap detection. No pending store conflicts exist. L1 cache transfers the processor storage fetch request and absolute address bits 4:28 to L2 as an inpage to L1 cache is required. In the following cycle, the L1 cache set of the L1 line which is to be replaced is transferred to L2 along with the L1 cache identifier: control store, instruction, or operand cache. The selected replacement entry is invalidated in the L1 cache directory. If a pending store conflict exists, the L1 fetch miss request is not transferred to L2 cache until the processor store request yielding the pending store conflict is written into L2 cache and the condition is cleared in L1. The L2 cache priority selects this processor fetch request for service. L2 control transfers a processor L2 cache fetch command and L2 cache congruence to L2 cache control and a processor L2 cache fetch command to memory control. An inpage to the L1 cache of the requesting processor is required and is allowed regardless of any lock or line-hold which the requesting processor may possess or any lock or line-hold without uncorrectable storage error indicator active any alternate processor may possess. One of three conditions result from the L2 cache directory search which yield an L2 cache miss. The fetch request is suspended as a result of the L2 cache miss to allow other requests to be serviced in the L2 cache while the inpage for the requested L3 line occurs.

Case A

The search of the L2 cache directory results in an L2 cache miss, but a previous L2 cache inpage is pending for this processor. L2 control suspends this fetch request pending completion of the previous inpage request. No further requests can be serviced for this processor in L2 cache as both the command buffers and store queue are pending completion of an L2 cache inpage. No information is transferred to address/key. The L2 cache line status and cache set are transferred to L2 cache control, the cache set modifier is transferred to L2 cache, and the L2 cache line status is transferred to memory control. Locked status is forced due to the previous inpage request. The L1 status array update is blocked due to the L2 cache miss. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 miss and locked, blocks any data transfers to the requesting L1 cache and drops the command. Memory control receives the L2 command and L3 port identification. Upon receipt of the L2 cache line status, L2 miss and locked, the request is dropped.

Case B

The search of the L2 cache directory results in an L2 cache miss, but a previous L2 cache inpage is pending for an alternate processor to the same L2 cache line. L2 control suspends this fetch request pending completion of the previous inpage request. Store queue requests for this processor can still be serviced by L2 control. No information is transferred to address/key. The L2 cache line status and cache set are transferred to L2 cache control, the cache set modifier is transferred to L2 cache, and the L2 cache line status is transferred to memory control. Locked status is forced due to the previous inpage freeze conflict. The L1 status array update is blocked due to the L2 cache miss. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 miss and locked, blocks any data transfers to the requesting L1 cache and drops the command. Memory control receives the L2 command and L3 port identification. Upon receipt of the L2 cache line status, L2 miss and locked, the request is dropped.

Case C

The search of the L2 cache directory results in an L2 cache miss. L2 control suspends this fetch request and sets the processor inpage freeze register. Store queue requests for this processor can still be serviced by L2 control. The absolute address is transferred to address/key. The L2 cache line status and cache set are transferred to L2 cache control, the cache set modifier is transferred to L2 cache, and the L2 cache line status is transferred to memory control. The L1 status array update is blocked due to the L2 cache miss. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 miss and not locked, blocks any data transfers to the requesting L1 cache and drops the command. Memory control receives the L2 command and L3 port identification. Upon receipt of the L2 cache line status, L2 miss and not locked, the request enters priority for the required L3 memory port. When all resources are available, including an inpage/outpage buffer pair, a command is transferred to BSU control to start the L3 fetch access for the processor. Memory control instructs L2 control to set L2 directory status normally for the pending inpage. Address/key receives the absolute address. The reference bit for the 4KB page containing the requested L2 cache line is set to '1'b. The absolute address is converted to an L3 physical address. The physical address is transferred to BSU control as soon as the interface is available as a result of the L2 cache miss. BSU control, upon receipt of the memory control command and address/key L3 physical address, initiates the L3 memory port 128-byte fetch by transferring the command and address to processor storage and selecting the memory cards in the desired port. Data are transferred 16 bytes at a time across a multiplexed command/address and data interface with the L3 memory port. Eight transfers from L3 memory are required to obtain the 128-byte L2 cache line. The sequence of quadword transfers starts with the quadword containing the double-word requested by the fetch access. The next three transfers contain the remainder of the L1 cache line. The final four transfers contain the remainder of the L2 cache line. The data desired by the processor are transferred to L1 cache as they are received in the L2 cache and loaded into an L2 cache inpage buffer. While the processing is restarted, the L1 cache inpage operation completes with the loading of the cache followed by the update of the L1 cache directory. While the last data transfer completes to the L2 cache inpage buffer BSU control raises the appropriate processor inpage complete to L2 control. During the data transfers to L2 cache, address/key monitors the L3 uncorrectable error lines. Should an uncorrectable error be detected during the inpage process several functions are performed. With each double-word transfer to the L1 cache, an L3 uncorrectable error signal is transferred simultaneously to identify the status of the data. The status of the remaining quadwords in the containing L2 cache line is also reported to the requesting processor. At most, the processor receives one storage uncorrectable error indication for a given inpage request, the first one detected by address/key. The double-word address of the first storage uncorrectable error detected by address/key is recorded for the requesting processor. Should an uncorrectable storage error occur for any data in the L1 line requested by the processor, an indicator is set for storage uncorrectable error handling. Finally, should an uncorrectable error occur for any data transferred to the L2 cache inpage buffer, address/key sends a signal to L2 control to prevent the completion of the inpage to L2 cache. L2 cache priority selects the inpage complete for the processor for service. L2 control transfers a write inpage buffer command and L2 cache congruence to L2 cache control and an inpage complete status reply to memory control. One of three conditions result from the L2 cache directory search.

Case 1

An L3 storage uncorrectable error was detected on inpage to the L2 cache inpage buffer. L2 control, recognizing that bad data exist in the inpage buffer, blocks the update of the L2 cache directory. The freeze register established for this L2 cache miss inpage is cleared. The appropriate L1 cache indicator for the processor which requested the inpage is set for storage uncorrectable error reporting. No information is transferred to address/key. The L2 cache line status normally transferred to L2 cache control and memory control is forced to locked and not modified. The selected L2 cache set is transferred to L2 cache control and the cache set modifier is transferred to L2 cache. The L1 status arrays are not altered. L2 cache control receives the write inpage buffer command and prepares for an L2 line write to complete the L2 cache inpage, pending status from L2 control. L2 cache control receives the L2 cache set and line status, locked and not modified, and resets the controls associated with the L2 cache inpage buffer associated with this write inpage buffer command. The L2 cache update is canceled and BSU control transfers end-of-operation to memory control. Memory control receives the L2 cache line status, locked and not modified, and releases the resources held by the processor inpage request. The L2 mini directory is not updated.

Case 2

L2 control selects an L2 cache line for replacement. In this case, the status of the replaced line reveals that it is unmodified; no castout is required. The L2 directory is updated to reflect the presence of the new L2 cache line. The freeze register established for this L2 cache miss inpage is cleared. The selected L2 cache set is transferred to address/key and L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 cache is updated to reflect the presence of the L1 line in L1 cache. The L1 cache congruence is used to address the L1 status arrays and the L2 cache set and high-order congruence are used as the data placed into the entry selected by the L1 cache set and identification transferred with the processor fetch request. L2 cache control receives the write inpage buffer command and prepares for an L2 line write to complete the L2 cache inpage, pending status from L2 control. L2 cache control receives the L2 cache set and replaced line status. As the replaced line is unmodified, L2 cache control signals L2 cache that the inpage buffer is to be written to L2 cache. As this is a full line write and the cache sets are interleaved, the L2 cache set must be used to manipulate address bits 25 and 26 to permit the L2 cache line write. BSU control transfers end-of-operation to memory control. Address/key receives the L2 cache set from L2 control. The L2 mini directory update address register is set from the inpage address buffers and the L2 cache set received from L2 control. Memory control receives the status of the replaced line. As no castout is required, memory control releases the resources held by the inpage request. Memory control transfers a command to address/key to update the L2 mini directory using the L2 mini directory update address register associated with this processor. Memory control then marks the current operation completed and allows the requesting processor to enter memory resource priority again.

Case 3

L2 control selects an L2 cache line for replacement. In this case, the status of the replaced line reveals that it is modified; an L2 cache castout is required. The L2 directory is updated to reflect the presence of the new L2 cache line. The freeze register established for this L2 cache miss inpage is cleared. The address read from the directory, along with the selected L2 cache set, are transferred to address/key. The selected L2 cache set is transferred to L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 cache is updated to reflect the presence of the L1 line in L1 cache. The L1 cache congruence is used to address the L1 status arrays and the L2 cache set and high-order congruence are used as the data placed into the entry selected by the L1 cache set and identification transferred with the processor fetch request. L2 cache control receives the write inpage buffer command and prepares for an L2 line write to complete the L2 cache inpage, pending status from L2 control. L2 cache control receives the L2 cache set and replaced line status. As the replaced line is modified, L2 cache control signals L2 cache that a full line read is required to the outpage buffer paired with the inpage buffer 91 prior to writing the inpage buffer 91 data to L2 cache. As these are full line accesses and the cache sets are interleaved, the L2 cache set must be used to manipulate address bits 25 and 26 to permit the L2 cache line accesses. Address/key receives the outpage address from L2 control, converts it to a physical address, and holds it in the outpage address buffers along with the L2 cache set. The L2 mini directory update address register is set from the inpage address buffers and the L2 cache set received from L2 control. Address/key transfers the outpage physical address to BSU control in preparation for the L3 line write. Memory control receives the status of the replaced line. As a castout is required, memory control cannot release the L3 resources until the memory update has completed. Castouts are guaranteed to occur to the same memory port used for the inpage. Memory control transfers a command to address/key to update the L2 mini directory using the L2 mini directory update address register associated with this processor. Memory control then marks the current operation completed and allows the requesting processor to enter memory resource priority again. BSU control, recognizing that the replaced L2 cache line is modified, starts the castout sequence after receiving the outpage address from address/key by transferring a full line write command and address to the selected memory port through the L2 cache data flow. Data are transferred from the outpage buffer 93 to memory 16 bytes at a time. After the last quadword transfer to memory, BSU control transfers end-of-operation to memory control. Memory control, upon receipt of end-of-operation from BSU control, releases the L3 port to permit overlapped access to the memory port.

2.1.6 Storage Fetch and Lock, TLB Hit, No Access Exceptions, L1 Cache Hit or Miss, L2 Cache Hit The execution unit issues a processor storage fetch and lock request to the L1 operand cache. The set-associative TLB search yields an absolute address, with no access exceptions, for the logical address presented by the request. Interlocked updates are handled by L2 control. The double-word lock register exists at the L2 cache level and must be set prior to L1 cache returning the requested data to the execution unit. As such, L1 control always treats the fetch and lock request as an L1 cache miss, transferring the request to L2 control and expecting data from L2 cache. The return of the data is the signal to L1 control that the lock has been granted. If the search of the L1 cache directory finds the data in cache, an L1 hit, it is treated as an L1 miss to the processor, but that L1 cache set is the one transferred to L2 control as part of the L1 cache inpage request. If the directory search results in an L1 cache miss, the L1 cache line replacement algorithm selects the L1 cache set to receive the inpage data and this cache set is transferred to L2 control. A set-associative read to the L1 cache is simultaneously accomplished. As the store queue was flushed prior to issuing this storage request, no pending store conflicts can exist. The execution unit must wait until the data are available before continuing. L1 cache transfers the processor storage fetch and lock request and absolute address bits 4:28 to L2 as the lock register must be set and an inpage to L1 cache is required. In the following cycle, the L1 cache set of the L1 line which is to be replaced is transferred to L2 along with the L1 operand cache identifier. The selected replacement entry is invalidated in the L1 operand cache directory. The L2 cache priority selects this processor fetch and lock request for service. L2 control transfers a processor L2 cache fetch command and L2 cache congruence to L2 cache control and a processor L2 cache fetch and lock command to memory control. An inpage to the L1 cache of the requesting processor is required. One of three conditions result from the L2 cache directory search which yield an L2 cache hit.

Case 1

The search of the L2 cache directory results in an L2 cache hit, but a freeze register with uncorrectable storage error indicator active or line-hold register with uncorrectable storage error indicator active is set for an alternate processor for the requested L2 cache line. L2 control suspends this fetch and lock request pending release of the freeze or line-hold with uncorrectable storage error. No further requests for this processor can be serviced by L2 control as the store queue is empty and the fetch and lock is suspended in the command buffers. No information is transferred to address/key. The L2 cache line status and cache set are transferred to L2 cache control, the cache set modifier is transferred to L2 cache, and the L2 cache line status is transferred to memory control. Locked status is forced due to the alternate processor freeze or line-hold with uncorrectable storage error conflict. The L1 status array update is blocked due to the freeze or line-hold with uncorrectable storage error conflict. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 hit and locked, blocks any data transfers to the requesting L1 cache and drops the command. Memory control receives the L2 command and L3 port identification. Upon receipt of the L2 cache line status, L2 hit and locked, the request is dropped.

Case 2

The search of the L2 cache directory results in an L2 cache hit, but a lock register is set for an alternate processor for the requested double-word. L2 control suspends this fetch and lock request pending release of the lock. No further requests for this processor can be serviced by L2 control as the store queue is empty and the fetch and lock is suspended in the command buffers. No information is transferred to address/key. The L2 cache line status and cache set are transferred to L2 cache control, the cache set modifier is transferred to L2 cache, and the L2 cache line status is transferred to memory control. Locked status is forced due to the alternate processor lock conflict. The L1 status array update is blocked due to the lock conflict. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 hit and locked, blocks any data transfers to the requesting L1 cache and drops the command. Memory control receives the L2 command and L3 port identification. Upon receipt of the L2 cache line status, L2 hit and locked, the request is dropped.

Case 3

The search of the L2 cache directory results in an L2 cache hit. The absolute address is transferred to address/key with the set reference bit command. The L2 cache line status and cache set are transferred to L2 cache control, the cache set modifier is transferred to L2 cache, and the L2 cache line status is transferred to memory control. The processor's lock register, comprised of absolute address bits 4:28 and the L2 cache set, is established for this request. The L1 status array of the requesting processor's L1 operand cache is updated to reflect the presence of the L1 line in the L1 operand cache. The L1 cache congruence is used to address the L1 operand status arrays and the L2 cache set and high-order congruence are used as the data placed into the entry selected by the L1 operand cache set transferred with the processor fetch and lock request. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 hit and not locked, uses the L2 cache set to select the proper 32 bytes on each read cycle and gate 8 bytes per transfer cycle to the requesting L1 cache, starting with the double-word initially requested. While the processing is restarted, the L1 cache inpage operation completes with the loading of the cache followed by the update of the L1 cache directory. Memory control receives the L2 command and L3 port identification. Upon receipt of the L2 cache line status, L2 hit and not locked, the request is dropped. Address/key receives the absolute address for reference bit updating. The reference bit for the 4KB page containing the L1 cache line requested by the processor fetch and lock request is set to '1'b.

2.1.7 Storage Fetch and Lock, TLB Hit, No Access Exceptions, L1 Cache Miss, L2 Cache Miss The execution unit issues a processor storage fetch and lock request to the L1 operand cache. The set-associative TLB search yields an absolute address, with no access exceptions, for the logical address presented by the request. Interlocked updates are handled by L2 control. The double-word lock register exists at the L2 cache level and must be set prior to L1 cache returning the requested data to the execution unit. As such, L1 control always treats the fetch and lock request as an L1 cache miss, transferring the request to L2 control and expecting data from L2 cache. The return of the data is the signal to L1 control that the lock has been granted. The directory search results in an L1 cache miss, the L1 cache line replacement algorithm selects the L1 cache set to receive the inpage data, and this cache set is transferred to L2 control. A set-associative read to the L1 cache is simultaneously accomplished. As the store queue was flushed prior to issuing this storage request, no pending store conflicts can exist. The execution unit must wait until the data are available before continuing. L1 cache transfers the processor storage fetch and lock request and absolute address bits 4:28 to L2 as the lock register must be set and an inpage to L1 cache is required. In the following cycle, the L1 cache set of the L1 line which is to be replaced is transferred to L2 along with the L1 operand cache identifier. The selected replacement entry is invalidated in the L1 operand.cache directory. The L2 cache priority selects this processor fetch and lock request for service. L2 control transfers a processor L2 cache fetch command and L2 cache congruence to L2 cache control and a processor L2 cache fetch and lock command to memory control. An inpage to the L1 cache of the requesting processor is required. One of two conditions result from the L2 cache directory search which yield an L2 cache miss. The fetch and lock request is suspended as a result of the L2 cache miss to allow other requests to be serviced in the L2 cache while the inpage for the requested L3 line occurs.

Case A

The search of the L2 cache directory results in an L2 cache miss, but a previous L2 cache inpage is pending for an alternate processor to the same L2 cache line. L2 control suspends this fetch and lock request pending completion of the previous inpage request. No further requests for this processor can be serviced by L2 control as the store queue is empty and the fetch and lock is suspended in the command buffers. No information is transferred to address/key. The L2 cache line status and cache set are transferred to L2 cache control, the cache set modifier is transferred to L2 cache, and the L2 cache line status is transferred to memory control. Locked status is forced due to the previous inpage freeze conflict. The L1 status array update is blocked due to the L2 cache miss. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 miss and locked, blocks any data transfers to the requesting L1 cache and drops the command. Memory control receives the L2 command and L3 port identification. Upon receipt of the L2 cache line status, L2 miss and locked, the request is dropped.

Case B

The search of the L2 cache directory results in an L2 cache miss. L2 control suspends this fetch and lock request and sets the processor inpage freeze register. No further requests for this processor can be serviced by L2 control as the store queue is empty and the fetch and lock is suspended due to the L2 cache miss. The absolute address is transferred to address/key. The L2 cache line status and cache set are transferred to L2 cache control, the cache set modifier is transferred to L2 cache, and the L2 cache line status is transferred to memory control. The processor's lock register, comprised of absolute address bits 4:28 and the L2 cache set, is established for this request. The L1 status array update is blocked due to the L2 cache miss. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 miss and not locked, blocks any data transfers to the requesting L1 cache and drops the command. Memory control receives the L2 command and L3 port identification. Upon receipt of the L2 cache line status, L2 miss and not locked, the request enters priority for the required L3 memory port. When all resources are available, including an inpage/outpage buffer pair, a command is transferred to BSU control to start the L3 fetch access for the processor. Memory control instructs L2 control to set L2 directory status normally for the pending inpage. Address/key receives the absolute address. The reference bit for the 4KB page containing the requested L2 cache line is set to '1'b. The absolute address is converted to an L3 physical address. The physical address is transferred to BSU control as soon as the interface is available as a result of the L2 cache miss. BSU control, upon receipt of the memory control command and address/key L3 physical address, initiates the L3 memory port 128-byte fetch by transferring the command and address to processor storage and selecting the memory cards in the desired port. Data are transferred 16 bytes at a time across a multiplexed command/address and data interface with the L3 memory port. Eight transfers from L3 memory are required to obtain the 128-byte L2 cache line. The sequence of quadword transfers starts with the quadword containing the double-word requested by the fetch access. The next three transfers contain the remainder of the L1 cache line. The final four transfers contain the remainder of the L2 cache line. The data desired by the processor are transferred to L1 cache as they are received in the L2 cache and loaded into an L2 cache inpage buffer. While the processing is restarted, the L1 cache inpage operation completes with the loading of the cache followed by the update of the L1 cache directory. While the last data transfer completes to the L2 cache inpage buffer BSU control raises the appropriate processor inpage complete to L2 control. During the data transfers to L2 cache, address/key monitors the L3 uncorrectable error lines. Should an uncorrectable error be detected during the inpage process several functions are performed. With each double-word transfer to the L1 cache, an L3 uncorrectable error signal is transferred simultaneously to identify the status of the data. The status of the remaining quadwords in the containing L2 cache line is also reported to the requesting processor. At most, the processor receives one storage uncorrectable error indication for a given inpage request, the first one detected by address/key. The double-word address of the first storage uncorrectable error detected by address/key is recorded for the requesting processor. Should an uncorrectable storage error occur for any data in the L1 line requested by the processor, an indicator is set for storage uncorrectable error handling. Finally, should an uncorrectable error occur for any data transferred to the L2 cache inpage buffer, address/key sends a signal to L2 control to prevent the completion of the inpage to L2 cache. L2 cache priority selects the inpage complete for the processor for service. L2 control transfers a write inpage buffer command and L2 cache congruence to L2 cache control and an inpage complete status reply to memory control. One of three conditions result from the L2 cache directory search.

Case 1

An L3 storage uncorrectable error was detected on inpage to the L2 cache inpage buffer. L2 control, recognizing that bad data exist in the inpage buffer, blocks the update of the L2 cache directory. The freeze register established for this L2 cache miss inpage and the lock register associated with the requested double-word are cleared. The L1 operand cache indicator for the processor which requested the inpage is set for storage uncorrectable error reporting. No information is transferred to address/key. The L2 cache line status normally transferred to L2 cache control and memory control is forced to locked and not modified. The selected L2 cache set is transferred to L2 cache control and the cache set modifier is transferred to L2 cache. The L1 status arrays are not altered. L2 cache control receives the write inpage buffer command and prepares for an L2 line write to complete the L2 cache inpage, pending status from L2 control. L2 cache control receives the L2 cache set and line status, locked and not modified, and resets the controls associated with the L2 cache inpage buffer associated with this write inpage buffer command. The L2 cache update is canceled and BSU control transfers end-of-operation to memory control. .sk 1 Memory control receives the L2 cache line status, locked and not modified, and releases the resources held by the processor inpage request. The L2 mini directory is not updated.

Case 2

L2 control selects an L2 cache line for replacement. In this case, the status of the replaced line reveals that it is unmodified; no castout is required. The L2 directory is updated to reflect the presence of the new L2 cache line. The freeze register established for this L2 cache miss inpage is cleared. The selected L2 cache set is transferred to address/key and L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 operand cache is updated to reflect the presence of the L1 line in the L1 operand cache. The L1 cache congruence is used to address the L1 operand status arrays and the L2 cache set and high-order congruence are used as the data placed into the entry selected by the L1 operand cache set transferred with the processor fetch and lock request. L2 cache control receives the write inpage buffer command and prepares for an L2 line write to complete the L2 cache inpage, pending status from L2 control. L2 cache control receives the L2 cache set and replaced line status. As the replaced line is unmodified, L2 cache control signals L2 cache that the inpage buffer is to be written to L2 cache. As this is a full line write and the cache sets are interleaved, the L2 cache set must be used to manipulate address bits 25 and 26 to permit the L2 cache line write. BSU control transfers end-of-operation to memory control. Address/key receives the L2 cache set from L2 control. The L2 mini directory update address register is set from the inpage address buffers and the L2 cache set received from L2 control. Memory control receives the status of the replaced line. As no castout is required, memory control releases the resources held by the inpage request. Memory control transfers a command to address/key to update the L2 mini directory using the L2 mini directory update address register associated with this processor. Memory control then marks the current operation completed and allows the requesting processor to enter memory resource priority again.

Case 3

L2 control selects an L2 cache line for replacement. In this case, the status of the replaced line reveals that it is modified; an L2 cache castout is required. The L2 directory is updated to reflect the presence of the new L2 cache line. The freeze register established for this L2 cache miss inpage is cleared. The address read from the directory, along with the selected L2 cache set, are transferred to address/key. The selected L2 cache set is transferred to L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 operand cache is updated to reflect the presence of the L1 line in the L1 operand cache. The L1 cache congruence is used to address the L1 operand status arrays and the L2 cache set and high-order congruence are used as the data placed into the entry selected by the L1 operand cache set transferred with the processor fetch and lock request. L2 cache control receives the write inpage buffer command and prepares for an L2 line write to complete the L2 cache inpage, pending status from L2 control. L2 cache control receives the L2 cache set and replaced line status. As the replaced line is modified, L2 cache control signals L2 cache that a full line read is required to the outpage buffer paired with the inpage buffer prior to writing the inpage buffer data to L2 cache. As these are full line accesses and the cache sets are interleaved, the L2 cache set must be used to manipulate address bits 25 and 26 to permit the L2 cache line accesses. Address/key receives the outpage address from L2 control, converts it to a physical address, and holds it in the outpage address buffers along with the L2 cache set. The L2 mini directory update address register is set from the inpage address buffers and the L2 cache set received from L2 control. Address/key transfers the outpage physical address to BSU control in preparation for the L3 line write. Memory control receives the status of the replaced line. As a castout is required, memory control cannot release the L3 resources until the memory update has completed. Castouts are guaranteed to occur to the same memory port used for the inpage. Memory control transfers a command to address/key to update the L2 mini directory using the L2 mini directory update address register associated with this processor. Memory control then marks the current operation completed and allows the requesting processor to enter memory resource priority again. BSU control, recognizing that the replaced L2 cache line is modified, starts the castout sequence after receiving the outpage address from address/key by transferring a full line write command and address to the selected memory port through the L2 cache data flow. Data are transferred from the outpage buffer to memory 16 bytes at a time. After the last quadword transfer to memory, BSU control transfers end-of-operation to memory control. Memory control, upon receipt of end-of-operation from BSU control, releases the L3 port to permit overlapped access to the memory port.

2.2 MP/3 Processor Storage Store Routines 2.2.1 Storage Store, TLB Miss

The execution unit issues a processor storage store request to the L1 operand cache. The set-associative TLB search fails to yield an absolute address for the logical address presented by the request. A request for dynamic address translation is presented to the execution unit and the current storage operation is nullified. The TLB miss overrides the results of the L1 cache directory search due to the lack of a valid absolute address for comparison from the TLB. The write to the L1 cache is canceled. The L1 store queue does not enqueue the request due to the TLB miss. Any prefetched instructions which succeed the current instruction are checked for modification by the store request through logical address comparison. As a TLB miss has occurred for the L1 operand cache, no valid absolute address exists to complete the store request. The program store compare checks are blocked. The store request is not transferred to L2 cache due to the TLB miss. For a hardware-executed instruction, program execution is restarted at this instruction address if the address translation is successful. For a microinstruction store request, the microinstruction is re-executed if address translation is successful. For either case, L1 control avoids enquiring any repeated store requests to avoid transferring duplicate store requests to the L2 store queue and commences L1 store queue enqueues with the first new store request.

2.2.2 Storage Store, TLB Hit, Access Exception

The execution unit issues a processor storage store request to the L1 operand cache. The set-associative TLB search yields an absolute address for the logical address presented by the request. However, an access exception, either protection or addressing, is detected as a result of the TLB access. The execution unit is notified of the access exception and the current storage operation is nullified. The access exception overrides the results of the L1 cache directory search. The write to the L1 cache is canceled. The L1 store queue does not enqueue the request due to the access exception. Any prefetched instructions which succeed the current instruction are checked for modification by the store request through logical address comparison. As an access exception has occurred, no valid absolute address exists to complete the store request. The program store compare checks are blocked. The store request is not transferred to the L2 store queue as the current program will abnormally end. Eventually the processor L2 interface will be reset by microcode as part of the processor recovery routine to purge any enqueued stores associated with this instruction.

2.2.3 Storage Store, Non-sequential, TLB Hit, No Access Exceptions, Delayed Store Queue Transfer, L2 Cache Busy The execution unit issues a non-sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the double-word. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). The transfer of the processor store request to the L2 cache store queue is delayed. Any combination of three situations can delay the transfer. First, store requests must be serviced in the sequence they enter the store queue. If the L1 store queue enqueue pointer is greater than the L1 transfer pointer, due to some previous L1/L2 interface busy condition, this request cannot be transferred to L2 cache until all preceding entries are first transferred. Second, the L1 cache store queue enqueue pointer equals the L1 transfer pointer, but the L1/L2 interface is busy with data transfers to another L1 cache or a request for L1 cache line invalidation from L2. Third, the L2 store queue is currently full and unable to accept another store request from the L1 store queue. Fourth, an asynchronous execution unit operation is in progress, perhaps in the floating-point unit, which affects the checkpoint handling. The store request occurs during the execution of this operation but is within another checkpoint interval. As checkpoint intervals are completed in sequence, the store request is not transferred to L2 cache until the previous checkpoint is finished. Any prefetched instructions which succeed the current instruction are checked for modification by the store request through logical address comparison. If an equal match occurs, the instruction buffers are invalidated. Eventually, the processor store request is transferred to the L2 cache. If the L2 store queue associated with this processor is empty at the time the request is received and end-of-operation is indicated with the store request, this request can be serviced immediately if selected by L2 cache priority. In any case, an entry is made on the L2 store queue for the requesting processor. The L2 cache store queue is physically divided into two portions: control and data. The absolute address and store request type are maintained in the L2 control function. The associated data and store byte flags are enqueued in the L2 cache data flow function. The L2 cache priority does not select this processor store request for service.

2.2.4 Storage Store, Non-sequential, TLB Hit, No Access Exceptions, L2 Cache Hit The execution unit issues a non-sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the double-word. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). If the store queue is empty prior to this request or the L1 store queue enqueue pointer equals the transfer pointer, and the L1/L2 interface is available, the store request is transferred to L2 immediately. Otherwise, the transfer is delayed until the L1 store queue transfer pointer selects this entry while the L1/L2 interface is available. Any prefetched instructions which succeed the current instruction are checked for modification by the store request through logical address comparison. If an equal match occurs, the instruction buffers are invalidated. L2 control receives the store request. If the L2 store queue is empty and end-of-operation is indicated with the store request, this request can be serviced immediately if selected by L2 cache priority. If the store queue is empty, but no end-of-operation is associated with the store request, it must wait on the store queue until end-of-operation is received before being allowed to enter L2 cache priority. If the L2 store queue for this processor is not empty, then this request must wait on the store queue until all preceding stores for this processor have completed to L2 cache. In any case, an entry is made on the L2 store queue for the requesting processor. The L2 cache store queue is physically divided into two portions: control and data. The absolute address and store request type are maintained in the L2 control function. The associated data and store byte flags are enqueued in the L2 cache data flow function. The L2 cache priority selects this processor store request for service. L2 control transfers a processor L2 cache store command and L2 cache congruence to L2 cache control and a processor L2 cache store command to memory control. As the L1 operand cache is a store-thru cache, an inpage to L1 cache is not required regardless of the original store request L1 cache hit/miss status. L2 control dequeues the store request from the control portion of the L2 cache store queue for this processor. One of four conditions result from the L2 cache directory search which yield an L2 cache hit.

Case 1

The search of the L2 cache directory results in an L2 cache hit, but a freeze register with uncorrectable storage error indicator active or line-hold register with uncorrectable storage error indicator active is set for an alternate processor for the requested L2 cache line. L2 control suspends this store request pending release of the freeze or line-hold with uncorrectable storage error. The store request is restored onto the control portion of the L2 cache store queue for this processor. Command buffer requests for this processor can still be serviced by L2 control. No information is transferred to address/key. The L2 line status and cache set are transferred to L2 cache control, the cache set modifier is transferred to L2 cache, and the L2 cache line status is transferred to memory control. Locked status is forced due to the alternate processor freeze or line-hold with uncorrectable storage error conflict. The L1 status array compares are blocked due to the freeze or line-hold with uncorrectable storage error conflict. L2 control blocks the transfer of instruction complete to the requesting processor's L1 cache due to the freeze or line-hold with uncorrectable storage error conflict. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 hit and locked, L2 cache control cancels the dequeue of the data store queue entry and the write of the L2 cache. Memory control receives the L2 command and L3 port identification. Upon receipt of the L2 cache line status, L2 hit and locked, the request is dropped.

Case 2

The search of the L2 cache directory results in an L2 cache hit, but a lock register is set for an alternate processor for the requested double-word. L2 control suspends this store request pending release of the lock. The store request is restored onto the control portion of the L2 cache store queue for this processor. Command buffer requests for this processor can still be serviced by L2 control. No information is transferred to address/key. The L2 cache line status and cache set are transferred to L2 cache control, the cache set modifier is transferred to L2 cache, and the L2 cache line status is transferred to memory control. Locked status is forced due to the alternate processor lock conflict. The L1 status array compares are blocked due to the lock conflict. L2 control blocks the transfer of instruction complete to the requesting processor's L1 cache due to the lock conflict. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 hit and locked, L2 cache control cancels the dequeue of the data store queue entry and the write of the L2 cache. Memory control receives the L2 command and L3 port identification. Upon receipt of the L2 cache line status, L2 hit and locked, the request is dropped.

Case 3

The search of the L2 cache directory results in an L2 cache hit, but an inpage freeze register with uncorrectable storage error indication is active for this processor. This situation occurs for a processor after an uncorrectable storage error has been reported for an L2 cache inpage due to a store request. The L2 cache line is marked invalid. The absolute address is transferred to address/key with a set reference and change bits command. The L2 cache line status and cache set are transferred to L2 cache control, the cache set modifier is transferred to L2 cache, and the L2 cache line status is transferred to memory control. L2 control clears the command buffer request block latch, the freeze register, and the uncorrectable storage error indication associated with the freeze register as a result of the store request. All L1 status arrays, excluding the requesting processor's L1 operand cache status, are searched for copies of the modified L1 cache line. The low-order L2 cache congruence is used to address the L1 status arrays and the L2 cache set and high-order congruence are used as the comparand with the L1 status array outputs. If an equal match is found in the requesting processor's L1 instruction cache status array, the entry is cleared, and the L1 cache congruence and L1 cache set are transferred to the requesting processor for local-invalidation of the L1 cache copy after the request for the address buss has been granted by the L1. If any of the alternate processors' L1 status arrays yield a match the necessary entries are cleared in L1 status, and the L1 cache congruence and L1 cache sets, one for the L1 operand cache and one for the L1 instruction cache, are simultaneously transferred to the required alternate processors for cross-invalidation of the L1 cache copies after the request for the address buss has been granted by that L1. The L2 store access is not affected by the request for local-invalidation or cross-invalidation as L1 guarantees the granting of the required address interface in a fixed number of cycles. Note that no L1 copies should be found for this case as the store is taking place after an L2 cache miss inpage was serviced for the store request and an uncorrectable storage error was detected in the L3 line. If end-of-operation is associated with this store request, L2 control transfers an instruction complete signal to the requesting processor's L1 cache to remove all L1 store queue entries associated with this instruction; the stores have completed into L2 cache. The dequeue from the L1 store queue occurs simultaneously with the last, or only, update to L2 cache. The dequeue from the L2 store queue occurs as each non-sequential store completes to L2 cache. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 hit and not locked, L2 cache control uses the L2 cache set to control the store into L2 cache and the write occurs under control of the store byte flags in what would be the second cycle of the processor L2 cache read sequence. Memory control receives the L2 command and L3 port identification. Upon receipt of the L2 cache line status, L2 hit and not locked, the request is dropped. Address/key receives the absolute address for reference and change bits updating. The reference and change bits for the 4KB page containing the L2 cache line updated by the store request are set to '1'b.

Case 4

The search of the L2 cache directory results in an L2 cache hit. The L2 cache line is marked modified. The absolute address is transferred to address/key with the set reference and change bits command. The L2 cache line status and cache set are transferred to L2 cache control, the cache set modifier is transferred to L2 cache, and the L2 cache line status is transferred to memory control. If the requesting processor holds a lock, the lock address is compared with the store request address. If a compare results, the lock is cleared; if a miscompare results, a machine check is set. All L1 status arrays, excluding the requesting processor's L1 operand cache status, are searched for copies of the modified L1 cache line. The low-order L2 cache congruence is used to address the L1 status arrays and the L2 cache set and high-order congruence are used as the comparand with the L1 status array outputs. If an equal match is found in the requesting processor's L1 instruction cache status array, the entry is cleared, and the L1 cache congruence and L1 cache set are transferred to the requesting processor for local-invalidation of the L1 cache copy after the request for the address buss has been granted by the L1. If any of the alternate processors' L1 status arrays yield a match the necessary entries are cleared in L1 status, and the L1 cache congruence and L1 cache sets, one for the L1 operand cache and one for the L1 instruction cache, are simultaneously transferred to the required alternate processors for cross-invalidation of the L1 cache copies after the request for the address buss has been granted by that L1. The L2 store access is not affected by the request for local-invalidation or cross-invalidation as L1 guarantees the granting of the required address interface in a fixed number of cycles. If end-of-operation is associated with this store request, L2 control transfers an instruction complete signal to the requesting processor's L1 cache to remove all L1 store queue entries associated with this instruction; the stores have completed into L2 cache. The dequeue from the L1 store queue occurs simultaneously with the last, or only, update to L2 cache. The dequeue from the L2 store queue occurs as each non-sequential store completes to L2 cache. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 hit and not locked, L2 cache control uses the L2 cache set to control the store into L2 cache and the write occurs under control of the store byte flags in what would be the second cycle of the processor L2 cache read sequence. Memory control receives the L2 command and L3 port identification. Upon receipt of the L2 cache line status, L2 hit and not locked, the request is dropped. Address/key receives the absolute address for reference and change bits updating. The reference and change bits for the 4KB page containing the L2 cache line updated by the store request are set to '1'b.

2.2.5 Storage Store, Non-sequential, TLB Hit, No Access Exceptions, L2 Cache Miss The execution unit issues a non-sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the double-word. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). If the store queue is empty prior to this request or the L1 store queue enqueue pointer equals the transfer pointer, and the L1/L2 interface is available, the store request is transferred to L2 immediately. Otherwise, the transfer is delayed until the L1 store queue transfer pointer selects this entry while the L1/L2 interface is available. Any prefetched instructions which succeed the current instruction are checked for modification by the store request through logical address comparison. If an equal match occurs, the instruction buffers are invalidated. L2 control receives the store request. If the L2 store queue is empty and end-of-operation is indicated with the store request, this request can be serviced immediately if selected by L2 cache priority. If the store queue is empty, but no end-of-operation is associated with the store request, it must wait on the store queue until end-of-operation is received before being allowed to enter L2 cache priority. If the L2 store queue for this processor is not empty, then this request must wait on the store queue until all preceding stores for this processor have completed to L2 cache. In any case, an entry is made on the L2 store queue for the requesting processor. The L2 cache store queue is physically divided into two portions: control and data. The absolute address and store request type are maintained in the L2 control function. The associated data and store byte flags are enqueued in the L2 cache data flow function. The L2 cache priority selects this processor store request for service. L2 control transfers a processor L2 cache store command and L2 cache congruence to L2 cache control and a processor L2 cache store command to memory control. As the L1 operand cache is a store-thru cache, an inpage to L1 cache is not required regardless of the original store request L1 cache hit/miss status. L2 control dequeues the store request from the control portion of the L2 cache store queue for this processor. One of three conditions result from the L2 cache directory search which yield an L2 cache miss. As the L2 cache is a store-in cache, the L2 cache line must be inpaged from L3 processor storage prior to completion of the store request. The store request is suspended as a result of the L2 cache miss to allow other requests to be serviced in the L2 cache while the inpage for the requested L3 line occurs.

Case A

The search of the L2 cache directory results in an L2 cache miss, but a previous L2 cache inpage is pending for this processor. L2 control suspends this store request pending completion of the previous inpage request. The store request is restored onto the control portion of the L2 cache store queue for this processor. No further requests can be serviced for this processor in L2 cache as both the command buffers and store queue are pending completion of an L2 cache inpage. No information is transferred to address/key. The L2 cache line status and cache set are transferred to L2 cache control, the cache set modifier is transferred to L2 cache, and the L2 cache line status is transferred to memory control. Locked status is forced due to the previous inpage request. The L1 status array compares are blocked due to the L2 cache miss. L2 control blocks the transfer of instruction complete to the requesting processor's L1 cache due to the L2 cache miss. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 miss and locked, L2 cache control cancels the dequeue of the store queue entry and the write of the L2 cache. Memory control receives the L2 command and L3 port identification. Upon receipt of the L2 cache line status, L2 miss and locked, the request is dropped.

Case B

The search of the L2 cache directory results in an L2 cache miss, but a previous L2 cache inpage is pending for an alternate processor to the same L2 cache line. L2 control suspends this store request pending completion of the previous inpage request. The store request is restored onto the control portion of the L2 cache store queue for this processor. Command buffer requests for this processor can still be serviced by L2 control. No information is transferred to address/key. The L2 cache line status and cache set are transferred to L2 cache control, the cache set modifier is transferred to L2 cache, and the L2 cache line status is transferred to memory control. Locked status is forced due to the previous inpage freeze conflict. The L1 status array compares are blocked due to the L2 cache miss. L2 control blocks the transfer of instruction complete to the requesting processor's L1 cache due to the L2 cache miss. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 miss and locked, L2 cache control cancels the dequeue of the store queue entry and the write of the L2 cache. Memory control receives the L2 command and L3 port identification. Upon receipt of the L2 cache line status, L2 miss and locked, the request is dropped.

Case C

The search of the L2 cache directory results in an L2 cache miss. L2 control suspends this store request and sets the processor inpage freeze register. The store request is restored onto the control portion of the L2 cache store queue for this processor. Command buffer requests for this processor can still be serviced by L2 control. The absolute address is transferred to address/key. The L2 cache line status and cache set are transferred to L2 cache control, the cache set modifier is transferred to L2 cache, and the L2 cache line status is transferred to memory control. The L1 status array compares are blocked due to the L2 cache miss. L2 control blocks the transfer of instruction complete to the requesting processor's L1 cache due to the L2 cache miss. L2 cache control receives the processor L2 cache store command and L2 cache congruence and starts the access to L2 cache. L2 cache control transfers the command to L2 data flow to dequeue the oldest entry from the L2 store queue and write through the L2 write buffer into L2 cache. Upon receipt of the L2 cache line status, L2 miss and not locked, L2 cache control cancels the dequeue of the store queue entry and the write of the L2 cache. Memory control receives the L2 command and L3 port identification. Upon receipt of the L2 cache line status, L2 miss and not locked, the request enters priority for the required L3 memory port. When all resources are available, including an inpage/outpage buffer pair, a command is transferred to BSU control to start the L3 fetch access for the processor. Memory control instructs L2 control to set L2 directory status normally for the pending inpage. Address/key receives the absolute address. The reference bit for the 4KB page containing the requested L2 cache line is set to '1'b. The associated change bit is not altered as only an L2 cache inpage is in progress; the store access will be re-executed after the inpage completes. The absolute address is converted to an L3 physical address. The physical address is transferred to BSU control as soon as the interface is available as a result of the L2 cache miss. BSU control, upon receipt of the memory control command and address/key L3 physical address, initiates the L3 memory port 128-byte fetch by transferring the command and address to processor storage and selecting the memory cards in the desired port. Data are transferred 16 bytes at a time across a multiplexed command/address and data interface with the L3 memory port. Eight transfers from L3 memory are required to obtain the 128-byte L2 cache line. The sequence of quadword transfers starts with the quadword containing the doubleword requested by the store access. The next three transfers contain the remainder of the L1 cache line. The final four transfers contain the remainder of the L2 cache line. While the last data transfer completes to the L2 cache inpage buffer BSU control raises the appropriate processor inpage complete to L2 control. During the data transfers to L2 cache, address/key monitors the L3 uncorrectable error lines. Should an uncorrectable error be detected during the inpage process several functions are performed. With each quadword transfer to the L2 cache, an L3 uncorrectable error signal is transferred to the processor originally requesting the store access. At most, the processor receives one storage uncorrectable error indication for a given L2 cache inpage request, the first one detected by address/key. The doubleword address of the first storage uncorrectable error detected by address/key is recorded for the requesting processor. Should an uncorrectable storage error occur for any data in the L1 line accessed by the processor, an indicator is set for storage uncorrectable error handling. Finally, should an uncorrectable error occur for any data transferred to the L2 cache inpage buffer, address/key sends a signal to L2 control to alter the handling of the L2 cache inpage and subsequent store request. L2 cache priority selects the inpage complete for the processor for service. L2 control transfers a write inpage buffer command and L2 cache congruence to L2 cache control and an inpage complete status reply to memory control. One of two conditions result from the L2 cache directory search.

Case 1

L2 control selects an L2 cache line for replacement. In this case, the status of the replaced line reveals that it is unmodified; no castout is required. The L2 directory is updated to reflect the presence of the new L2 cache line. If no L3 storage uncorrectable error was detected on inpage to the L2 cache inpage buffer, the freeze register established for this L2 cache miss inpage is cleared. If an L3 storage uncorrectable error was detected on inpage to the L2 cache inpage buffer, the freeze register established for this L2 cache miss inpage is left active and the storage uncorrectable error indication associated with the freeze register is set; the command buffers for the processor which requested the inpage are blocked from entering L2 cache priority; all L1 cache indicators for this processor are set for storage uncorrectable error reporting. The selected L2 cache set is transferred to address/key and L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. L2 cache control receives the write inpage buffer command and prepares for an L2 line write to complete the L2 cache inpage, pending status from L2 control. L2 cache control receives the L2 cache set and replaced line status. As the replaced line is unmodified, L2 cache control signals L2 cache that the inpage buffer is to;be written to L2 cache. As this is a full line write and the cache sets are interleaved, the L2 cache set must be used to manipulate address bits 25 and 26 to permit the L2 cache line write. BSU control transfers end-of-operation to memory control. Address/key receives the L2 cache set from L2 control. The L2 mini directory update address register is set from the inpage address buffers and the L2 cache set received from L2 control. Memory control receives the status of the replaced line. As no castout is required, memory control releases the resources held by the inpage request. Memory control transfers a command to address/key to update the L2 mini directory using the L2 mini directory update address register associated with this processor. Memory control then marks the current operation completed and allows the requesting processor to enter memory resource priority again. The original L2 store queue request now reenters the L2 cache service priority circuitry. The store access is attempted again, once selected for L2 cache service, and executed as if this is the first attempt to service the request within L2 control.

Case 2

L2 control selects an L2 cache line for replacement. In this case, the status of the replaced line reveals that it is modified; an L2 cache castout is required. The L2 directory is updated to reflect the presence of the new L2 cache line. If no L3 storage uncorrectable error was detected on inpage to the L2 cache inpage buffer, the freeze register established for this L2 cache miss inpage is cleared. If an L3 storage uncorrectable error was detected on inpage to the L2 cache inpage buffer, the freeze register established for this L2 cache miss inpage is left active and the storage uncorrectable error indication associated with the freeze register is set; the command buffers for the processor which requested the inpage are blocked from entering L2 cache priority; all L1 cache indicators for this processor are set for storage uncorrectable error reporting. The address read from the directory, along with the selected L2 cache set, are transferred to address/key. The selected L2 cache set is transferred to L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. L2 cache control receives the write inpage buffer command and prepares for an L2 line write to complete the L2 cache inpage, pending status from L2 control. L2 cache control receives the L2 cache set and replaced line status. As the replaced line is modified, L2 cache control signals L2 cache that a full line read is required to the outpage buffer paired with the inpage buffer prior to writing the inpage buffer data to L2 cache. As these are full line accesses and the cache sets are interleaved, the L2 cache set must be used to manipulate address bits 25 and 26 to permit the L2 cache line accesses. Address/key receives the outpage address from L2 control, converts it to a physical address, and holds it in the outpage address buffers along with the L2 cache set. The L2 mini directory update address register is set from the inpage address buffers and the L2 cache set received from L2 control. Address/key transfers the outpage physical address to BSU control in preparation for the L3 line write. Memory control receives the status of the replaced line. As a castout is required, memory control cannot release the L3 resources until the memory update has completed. Castouts are guaranteed to occur to the same memory port used for the inpage. Memory control transfers a command to address/key to update the L2 mini directory using the L2 mini directory update address register associated with this processor. Memory control then marks the current operation completed and allows the requesting processor to enter memory resource priority again. The original L2 store queue request now reenters the L2 cache service priority circuitry. The store access is attempted again, once selected for L2 cache service, and executed as if this is the first attempt to service the request within L2 control. BSU control, recognizing that the replaced L2 cache line is modified, starts the castout sequence after receiving the outpage address from address/key by transferring a full line write command and address to the selected memory port through the L2 cache data flow. Data are transferred from the outpage buffer to memory 16 bytes at a time. After the last quadword transfer to memory, BSU control transfers end-of-operation to memory control. Memory control, upon receipt of end-of-operation from BSU control, releases the L3 port to permit overlapped access to the memory port.

2.2.6 Storage Store, Sequential, Initial L2 Line Access, TLB Hit, No Access Exceptions, L2 Cache Hit The execution unit issues a sequential processor storage store request to the L1 operand cache. The set-associative TLB search yields an absolute address, with no access exceptions, for the logical address presented by the request. If the search of the L1 cache directory finds the data in cache, an L1 hit, through equal comparison with the absolute address from the TLB, a write to the selected L1 cache set is enabled. The store request data are written into the L1 cache congruence and selected set using the store byte control flags to write only the desired bytes within the double-word. If the directory search results in an L1 cache miss, due to a miscompare with the absolute address from the TLB, the write of the L1 cache is canceled. In either case, the store request is enqueued on the L1 store queue. The queue entry information consists of the absolute address, data, store byte flags, and store request type (non-sequential or sequential store, end-of-operation). If the store queue is empty prior to this request or the L1 store queue enqueue pointer equals the transfer pointer, and the L1/L2 interface is available, the store request is transferred to L2 immediately. Otherwise, the transfer is delayed until the L1 store queue transfer pointer selects this entry while the L1/L2 interface is available. Any prefetched instructions which succeed the current instruction are checked for modification by the store request through logical address comparison. If an equal match occurs, the instruction buffers are invalidated. L2 control receives the store request. If the sequential store routine has not been started, then this request is the initial sequential store access as well as the initial store access to the L2 cache line. If the initial sequential store request has been serviced and a sequential operation is in progress, this represents the initial store access to a new L2 cache line in the sequential store routine. If the L2 store queue is empty, this request can be serviced immediately if selected by L2 cache priority. If the L2 store queue for this processor is not empty, then this request must wait on the store queue until all preceding stores for this processor have completed to L2 cache or the L2 cache write buffers. In either case, an entry is made on the L2 store queue for the requesting processor. The L2 cache store queue is physically divided into two portions: control and data. The absolute address and store request type are maintained in the L2 control function. The associated data and store byte flags are enqueued in the L2 cache data flow function. If this store request is the start of a sequential store operation, L2 control must check the L2 cache directory for the presence of the line in L2 cache. If a sequential operation is in progress for this processor, comparison of address bits 24, 25, 27, and 28 with those of the previous sequential store request for this processor has detected absolute address bit 24 of this store request differs from that of the previous store request. This store request is to a different L2 cache line. As such, L2 control must check the L2 cache directory for the presence of this line in L2 cache. No repeat command is transferred to L2 cache control and no information is immediately transferred to address/key and memory control. As this is not the first line to be accessed by the sequential store operation, L2 control checks the status of the previous sequentially accessed L2 cache line. If the previous line is not resident in L2 cache, L2 control holds sequential processing on the current line until the inpage completes. Otherwise, L2 control can continue sequential stores to the current L2 cache line. The L2 cache priority selects this processor store request for service. L2 control transfers a store to L2 cache write buffer command and L2 cache congruence to L2 cache control and a processor L2 cache store command to memory control. As the L1 operand cache is a store-thru cache, an inpage to L1 cache is not required regardless of the original store request L1 cache hit/miss status. L2 control dequeues the store request from the control portion of the L2 store queue to allow overlapped processing of subsequent sequential store requests to the same L2 cache line. L2 control recognizes that this store request is the start of a new L2 cache line within the sequential store operation. If this store request is the start of a sequential store operation, L2 control sets the sequential operation in-progress indicator for this processor. Store queue request absolute address bits 24, 25, 27, and 28 are saved for future reference in the sequential store routine. If an alternate processor lock conflict is detected, it is ignored as the data are destined to the L2 cache write buffers for the requesting processor, not L2 cache. If the requesting processor holds a lock, a machine check is set. One of two conditions result from the L2 cache directory search which yield an L2 cache hit.

Case 1

The search of the L2 cache directory results in an L2 cache hit, but a freeze register with uncorrectable storage error indicator active or line-hold register with uncorrectable storage error indicator active is set for an alternate processor for the requested L2 cache line. L2 control suspends this store request and succeeding sequential store requests pending release of the freeze or line-hold with uncorrectable storage error. The store request is restored onto the control portion of the L2 cache store queue for this processor. Command buffer requests for this processor can still be serviced by L2 control. No information is transferred to address/key. The L2 cache line status and cache set are transferred to L2 cache control, the cache set modifier is transferred to L2 cache, and the L2 cache line status is transferred to memory control. Locked status is forced due to the alternate processor freeze or line-hold with uncorrectable storage error conflict. The L1 status array compares are blocked due to the sequential store operation being in progress. L2 control does not transfer instruction complete to the requesting processor's L1 cache due to the sequential store operation being in progress. L2 cache control receives the store to L2 cache write buffer command and L2 cache congruence and starts the access to L2 cache. L2 cache control transfers the command to L2 data flow to dequeue the oldest entry from the L2 store queue and write into the next L2 cache write buffer. Upon receipt of the L2 cache line status, L2 hit and locked, L2 cache control cancels the dequeue of the data store queue entry and the write of the L2 cache write buffer. Memory control receives the L2 command and L3 port identification. Upon receipt of the L2 cache line status, L2 hit and locked, the request is dropped.

Case 2

The search of the L2 cache directory results in an L2 cache hit. The L2 cache line is not marked modified. No information is transferred to address/key. The L2 cache line status and cache set are transferred to L2 cache control, the cache set modifier is transferred to L2 cache, and the L2 cache line status is transferred to memory control. A linehold, comprised of absolute address bits 4:24 and the L2 cache set, is established for the L2 cache line to be modified by this store request. Absolute address bit 25 is used to record whether this store request modifies the high half-line or low half-line of the L2 cache line. Bit 25 equal to '0'b sets the high half-line modifier of the current line-hold register; bit 25 equal to '1'b sets the low half-line modifier. The L1 status array compares are blocked due to the sequential store operation being in progress. L2 control does not transfer instruction complete to the requesting prQcessor's L1 cache due to the sequential store operation being in progress. L2 cache control receives the store to L2 cache write buffer command and L2 cache congruence and starts the access to L2 cache. L2 cache control transfers the command to L2 data flow to dequeue the oldest entry from the L2 store queue and write into the next L2 cache write buffer. Upon receipt of the L2 cache line status, L2 hit and not locked, L2 cache control completes the store to the L2 cache write buffer, loading the data and store byte flags, address-aligned, into the write buffer for the requesting processor. The L2 cache congruence is saved for subsequent sequential store requests associated with this operation and L2 cache write buffer in L2 data flow. For this portion of the sequential store operation, the cache set is not required, but pipeline stages force the store queue data to be moved into the L2 cache write buffer in a manner consistent with non-sequential store requests. The data store queue entry is dequeued from the L2 store queue, but not the L1 store queue, at the time the data are written into the L2 cache write buffer. Memory control receives the L2 command and L3 port identification. Upon receipt of the L2 cache line status, L2 hit and not locked, the request is dropped.

2.3 MP/3 Processor Storage Request Combinations 2.3.1 Pending Store Conflict

A non-sequential processor storage store occurs to a location in main memory. Regardless of the status of the line in L1 cache, an entry is placed on the L1 store queue. As soon as possible, the store request is transferred to the L2 store queue. As part of the execution sequence of a succeeding instruction, the processor attempts to fetch data from the 'same storage location' in the L1D cache, yielding an operand store compare. A pending store conflict may occur for the L1I cache when the processor executes a sequential instruction prefetch or branch target fetch from the 'same storage location', resulting in a program store compare (store-then-fetch type). The definition of 'same storage location' depends on the status of the line in the L1 cache at the time of the fetch access. The search of the L1 cache directory for the succeeding fetch request yields one of two conditions.

Case 1

The L1 cache directory search results in an L1 hit and 'same storage location' is defined as an eight-byte boundary in storage. The L1 store queue entry addresses are compared with the fetch address to the eight-byte boundary for pending store address matches. The fetch request address detects a match in the L1 store queue, a pending store conflict. In the MP/1, the match condition is ignored and the fetch is allowed to continue for the L1D cache only. In the multi-processor configurations for the L1D cache, and all configurations for the L1I cache, the fetch request is held pending until the store in conflict completes in L2 cache. As the fetch may actually detect one or more pending store conflicts, it is held pending until all conflicts are removed. As a result of the L1 hit, the fetch request is not transferred to L2 control. With the return of the instruction complete for the most recent pending store conflict, the store queue entry is dequeued, and the fetch request is permitted to access L1 cache again. If the repeat of the fetch request finds the data still in L1 cache, the data are returned to the requester, and no information is transferred to L2 control. If the repeat of the fetch request detects an L1 cache miss, the request is transferred to L2 control as an L1 cache inpage is now required.

Case 2

The L1 cache directory search results in an L1 miss and 'same storage location' is defined as a 64-byte boundary in storage (the L1 cache line size). The L1 store queue entry addresses are compared with the fetch address to the 64-byte boundary for pending store address matches. The fetch request address detects a match in the L1 store queue, a pending store conflict. In all configurations for both the L1I and L1D caches the fetch request is held pending until the store in conflict completes in L2 cache. As the fetch may actually detect one or more pending store conflicts, it is held pending until all conflicts are removed. As a result of the pending store conflict, the fetch request is not transferred to L2 control. With the return of the instruction complete for the most recent pending store conflict, the store queue entry is dequeued, and the fetch request is permitted to access L1 cache again. The repeat of the fetch request detects an L1 cache miss and the request is transferred to L2 control as an L1 cache inpage is required. This implementation uses the L1I cache design which prohibits processor access to the L1I cache directory from the cycle the request for invalidation is received in L1I cache control through the actual updating of the L1I cache directory due to the local-invalidate or cross-invalidate request. This results in L1I cache being unavailable for four to six cycles, depending on the number of L1I cache lines being invalidated, zero to two, respectively. For the L1D cache, processor access to the L1D cache directory is prohibited from the cycle after the request for invalidation is received in L1D cache control through the actual updating of the L1D cache directory due to the local-invalidate or cross-invalidate request. This results in L1D cache being unavailable for three to five cycles, depending on the number of L1D cache lines being invalidated, zero to two, respectively.

2.3.2 Storage Consistency Example 1

Two processors are involved in this storage consistency example. The processors, labelled CP0 and CP1, are executing the following instruction streams with the stated initial conditions.

| CP0 Instruction Stream | CP1 Instruction Stream |
| --- | --- |
| ST 1,A | ST 1,B |
| L  2,A | L  2,B |
| L  3,B | L  3,A |

Initial Conditions:
Storage: A=X'00000000'
CP0: GR1=X'00000001'
B=X'00000000'
CP1: GR1=X'00000001'

Each processor executes an instruction sequence containing a pending store conflict. Each processor then attempts to fetch the storage location with the pending store conflict of the other processor. The error state that results from the execution of both sequences is GR3=X'00000000' in both processors. Any other combination of results is valid. It should be noted that the choice of which processor stores first is irrelevant to the architectural example. It is only important that when one processor sees a change to a location in storage that all processors within the configuration see the change. In the time line, CP0 stores into L2 cache first, then CP1. As a result, CP0 is released from its pending store conflict first and loads GR3 with X'00000000'. CP1, due to the CP0 cross-invalidate of the L1 line containing A, must inpage from L2 cache and loads GR3 with X'00000001'.

2.3.3 Storage Consistency Example 2

Two processors are involved in this storage consistency example. The processors, labelled CP0 and CP1, are executing the following instruction streams with the stated initial conditions.

| CP0 Instruction Stream | CP1 Instruction Stream |
| --- | --- |
| MVI A,X'FF'   | MVI A+1,X'FF' |
| L   1,A       | L   1,A       |
| N   1,MASK0   | N   1,MASK1   |
| BNZ TIE       | BNZ TIE       |

Initial Conditions:
Storage: A=X'00000000'
MASK0=X'00FFFFFF'
MASK1=X'FF00FFFF'

Each processor executes an instruction sequence containing a pending store conflict to a common eight-byte storage field. Each processor then attempts to fetch a unique storage location to logically AND with the shared storage location. The error state that results from the execution of both sequences occurs when the logical AND operation in both processors yields X'00000000'. Any other combination of results is valid. It should be noted that the choice of which processor stores first is irrelevant to the architectural example. It is only important that when one processor sees a change to a location in storage that all processors within the configuration see the change. In the time line, CP0 stores into L2 cache first, then CP1. As a result, CP0 is released from its pending store conflict first and loads GR1 with X'FF000000'. The result of the AND with MASK0 is X'00000000'. CP1, due to the CP0 cross-invalidate of the L1 line containing A, must fetch the contents from L2 cache. CP1 loads GR1 with X'FFFF0000'. The result of the AND with MASK1 is X'FF000000'.

2.4 Processor Storage Commands

2.4.1 Alter L2 Cache Request Priority

Application: Performance tuning. Possible use in instructions requiring modification of non-sequential storage locations exceeding the capability of the present store queue design (L2 cache can be held exclusive to a processor). The command is synchronized within the processor to ensure completion of the storage command prior to issuing another storage command or storage key command. Processor storage fetch and store requests can be overlapped with the execution of this storage command. Microcode must ensure that if a particular processor within the configuration is quiescent, it is left in a state where it does not possess any lock, line-holds, or inpage freeze with storage uncorrectable error indication. Failure to do so may result in a lock-out condition as the alter L2 cache request priority storage command cannot complete when it attempts to block requests from an alternate processor if the alternate processor is quiescent and possesses a lock, line-hold, or inpage freeze with storage uncorrectable error indication.

Storage Command Description

Microcode supplies the command and an absolute address. only absolute address bits 18:22 are significant. Address bits 18 and 19 apply to the alternate processor storage requests; address bits 20:22 apply to the priority controls for the requesting processor. When address bit 18 is a '0'b no change to alternate processor priority is requested, and address bit 19 is ignored. If address bit 18 is a '1'b, requests for the alternate processors are disabled if address bit 19 is '0'b; address bit 19 equal to '1'b enables the requests for the alternate processors. Note that inpage completion requests for alternate processors cannot be blocked. The valid bit-patterns for the local processor priority controls are a subset of the available patterns. The rules are relatively simple. Three sources of requests are available: command buffer (storage commands, storage key commands, processor storage fetch requests, vector storage line fetch requests); L2 store queue (processor storage store requests, vector storage store requests, vector storage element fetch requests); inpage complete requests. The priority circuit supports all possible permutations. Note that no request source can be eliminated from priority consideration through this mechanism. The address bits are used to load the local processor priority controls as shown in the following chart.

| Priority | Absolute Address 20:22 Decode | | | | | | | |
| --- | --- | --- | --- | --- | --- | --- | --- | --- |
| Level | 000 | 001 | 010 | 011 | 100 | 101 | 110 | 111 |
| 1 | nc | sq | cb | ic | nc | sq | cb | ic |
| 2 | nc | cb | ic | sq | nc | ic | sq | cb |
| 3 | nc | ic | sq | cb | nc | cb | ic | sq | cb — command buffer request source
ic — inpage complete request source
nc — no change to present request priority
sq — store queue request source Storage Command Execution Microcode issues the command and an absolute address to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command is transferred to L2 control and address/key is instructed to transfer the absolute address to L2 control. L2 control receives the memory control command and, after selection by the L2 cache service priority, uses the absolute address from address/key. L2 control transfers no information to L2 cache control and end-of-operation to memory control. The priority controls for the requesting processor are updated immediately, regardless of the present state of the affected request sources. Three cases result from decodes of address bits 18 and 19.

Case 1

If address bit 18 is a '0'b, then requests from the alternate processors are unaffected. No information is transferred to address/key. This command decode always results in completed status reported to memory control.

Case 2

If address bits 18,19 equal '10'b subsequent alternate processor requests from the command buffers and store queues, but not inpage complete requests, are prevented from entering the L2 cache service priority. Each of the alternate processors' request sources, store queue and command buffer, are disabled unless that processor possesses a lock, line-hold, or inpage freeze with storage uncorrectable error indication, yielding a lock conflict. Possession of a lock, line-hold, or inpage freeze with storage uncorrectable error indication prevents only the holding processor's request sources from being disabled. No information is transferred to address/key. If a lock conflict occurs with either of the alternate processors, L2 control is unable to complete the command and returns locked status to memory control, having partially completed the storage command. With no alternate processor lock conflicts, L2 control completes the command and responds with completed status to memory control.

Case 3

If address bits 18,19 equal '11'b subsequent requests from the alternate processors' command buffer and store queue are enabled. No information is transferred to address/key. This command decode always results in completed status reported to memory control.

All Cases

Memory control, after receiving command status from L2 control, responds with end-of-operation to the requesting processor if L2 control reports completed status. Otherwise, the storage command is temporarily suspended, allowing time for the lock conflict to be cleared, and then re-entered into the memory control priority in an attempt to execute the command in its entirety.

2.4.2 Alter Memory Control Request Priority

Application: address match facilities and storage system debug. The command is synchronized within the processor to ensure completion of the storage command prior to issuing another storage command or storage key command. Processor storage fetch and store requests can be overlapped with the execution of this storage command.

Storage Command Description

Microcode supplies the command and an absolute address. Only absolute address bits 19 and 24 are significant. Address bit 19 applies to alternate processor storage requests; address bit 24 applies to all channel storage requests. A bit value of '0'b disables the requests for the appropriate source; a bit value of '1'b enables the requests for the appropriate source. When the storage command is executed it has no effect on any currently active requests in the storage system, they complete normally. When a particular request source is disabled, the command is intended to prohibit the activation of any further storage requests to processor storage (L3) and extended storage (L4). The memory request queue is affected to the extent that activation of further requests from that source is prohibited, but memory control can accept requests by that source until its queues are full. When a particular request source is enabled, the command is intended to permit the request source access to the L3 and L4 memory ports again. Note that the requesting processor is unable to alter its own request priority in memory control. The storage system internal facility, L2 cache periodic flush, if activated for use in the configuration, is disabled if either request source is disabled in memory control and enabled only if both request sources, alternate processors and channels, are enabled. Prior to issuing this storage command, if alternate processor requests are to be disabled, microcode must guarantee that the alternate processors in the configuration are in a state where they do not possess the memory buffer, any locks, line-holds, pending inpage requests, or inpage freezes with storage uncorrectable error indication. Failure to do so may result in a lock-out condition due to subsequent storage references by the processor left active in the configuration. No special actions are required for channel storage requests, except in preparation for possible channel overruns.

Storage Command Execution

Microcode issues the command and an absolute address to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. L2 control passes absolute address bits 19 and 24 to memory control as part of the memory port identification. Memory control receives the actual storage command and waits for a signal from L2 control that the address has been processed before executing the command. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id, which contains the two address bits required to complete the operation, from L2 control. Memory control executes the command immediately as no resources are required to complete the operation. Memory control, using address bits 19 and 24, sets its priority control latches accordingly. If the command requires disabling a request source, any commands currently active for that source are allowed to complete normally; further requests from that source are removed from priority selection. Had the command enabled a request source, any queued requests are allowed to enter the priority selection again. Memory control responds with end-of-operation to the requesting processor while altering the validity of the storage request sources. Waiting for completion of any currently active storage operations is unnecessary as the normal resource priority serializes any access to the required resources.

2.4.3 Enable Memory Error Correction Bypass

Application: diagnostic testing of processor storage and extended storage. As the command enables bypassing the normal use of error correction in the specified memory port, normal system operations to the memory port must be suspended for the duration of the diagnostic testing. The command is synchronized within the processor to ensure completion of the storage command prior to commencing storage activity within the requesting processor.

Storage Command Description

Execution of the command enables the bypassing of error correction circuitry used within the memory port selected by the address supplied with the storage command. only absolute address bit 24 is significant in the address supplied. This mode provides direct access to the memory contents, bypassing the normal single-bit error correction. When fetch commands access the memory port, the data are read from memory and the associated check bits are loaded into the check-bit registers in the normal fashion. The single-bit error correction associated with the fetch access is bypassed; the data are transferred on the memory buss uncorrected, but with good parity. When store commands access the memory port, the data are written to the memory using check bits from the check-bit register loaded by a previous memory access, not check bits generated from the data supplied.

Storage Command Execution

Microcode issues the command and an absolute address to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id, which contains absolute address bit 24, from L2 control. Memory control allocates the necessary resources and activates the storage command when selected by priority. The command is transferred to BSU control and address/key is instructed to transfer the physical address to BSU control. BSU control transfers the command and physical address to L2 data flow for transfer to the specified memory port and then transfers end-of-operation to memory control. The memory control modules in the selected memory port set their respective error correction bypass controls to allow direct access to the memory contents, avoiding error correction. Memory control, upon receipt of end-of-operation from BSU control, releases the memory port and transfers end-of-operation to the requesting processor.

2.4.4 Flush Store Queue

Applications: Used in S/370 instructions which require serialization prior to the start of execution of the current instruction. Used in non-instruction processing prior to issuing a fetch-and-lock storage request as part of an interlocked update. This storage command does not alter the priority with which store requests are handled in the L2 cache for the requesting processor.

Storage Command Description

Microcode supplies only the command. L1 handles the requirement for flushing the store queue itself, by receiving the instruction complete signals from L2 cache and removing the completed store requests from the L1 store queue. Until the L1 store queue is empty, L1 appears busy for any request. Once the store queue is empty, L1 allows normal activity to commence. This command is not transferred to L2 cache control.

Storage Command Execution

Microcode issues the command to L1. L1 transfers no information to L2 control as it handles the command entirely. L1 suspends the execution of storage requests in the processor pipeline until all previous store requests are completed in L2 cache as indicated by an L1 store queue empty condition.

2.4.5 Force L2 Cache Line Replacement Algorithm

Application: Diagnostic testing of the storage system. The command is synchronized within the processor to ensure completion of the storage command prior to commencing storage activity within the requesting processor. Microcode must ensure that an L2 inpage request is not forced into a bad L2 cache entry when using a fixed cache replacement set if valid data are desired in the specified L2 cache entry.

Storage Command Description

Microcode supplies the command and an absolute address. Only absolute address bits 25:28 are significant. The command is used to force the L2 cache line replacement algorithm to select a single cache set until altered by another such storage command, or resume use of the normal L2 cache line replacement algorithm. The valid bit-patterns for forcing the replacement cache set are a subset of the available patterns. An all zeros pattern, '0000'b, in absolute address bits 25:28 is interpreted as a command to resume use of the normal cache replacement algorithm. '0100'b, '0010'b, '0001'b are interpreted as forcing the replacement cache set to be set 0, 1, and 2, respectively; '1100'b, '1010'b, '1001'b are interpreted as forcing the replacement cache set to be set 3, 4, and 5, respectively. All other patterns are invalid and, if used, yield unpredictable results.

Storage Command Execution

Microcode issues the command and an absolute address to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the. address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command is transferred to L2 control and address/key is instructed to transfer the absolute address to L2 control. L2 control receives the memory control command and, after selection by the L2 cache service priority, uses the absolute address from address/key. Address bits 25:28, if a nonzero pattern, are used to override the normal L2 cache line replacement algorithm, forcing the selection to a particular cache set. If address bits 25:28 equal '0000'b, then the normal L2 cache line replacement algorithm is selected again. L2 control replies with end-of-operation to memory control after initiating the operation. Memory control, after receiving command status from L2 control, responds with end-of-operation to the requesting processor.

2.4.6 Invalidate L1 Cache Line or Congruence

Applications: Clearing of partial results from L1 cache during the page-fault handling routine. Recovery from errors causing the 'processor stopped' condition. For page-fault handling, microcode obtains absolute addresses from the L1 store queue for the instruction under execution a t the time of the TLB miss and subsequent page-fault. Each of these L1 cache lines must be invalidated prior to restarting the processor to maintain data integrity within the system. The associated L1 status entries within the L2 control function must also be cleared. For error recovery, the processor was clock-stopped, implying the processor's L1 cache arrays and associated L1 status arrays do not reflect the current level of storage contents. The L1 cache arrays are cleared by means of R-map accesses. The L1 status arrays are cleared by means of the invalidate L1 cache congruence commands. The command is synchronized within the processor to ensure completion of the storage command prior to issuing another storage command or storage key command. Processor storage fetch and store requests can be overlapped with the execution of this storage command.

Storage Command Description

Absolute address bit 26 is used to select either invalidate L1 cache line, bit 26 equals '0'b, or invalidate L1 cache congruence, bit 26 equals '1'b. Absolute address bits 4:25 are significant to invalidate L1 cache line; absolute address bits 20:25 are significant to invalidate L1 cache congruence. For invalidate L1 cache line, L1 invalidates the proper L1 cache lines if still present in the requesting processor by executing an L1 directory search using the specified absolute address. Both the L1 instruction and operand caches perform the operation requested by the invalidate L1 cache line command. L2 control clears the L1 status entries for both the L1 instruction and operand caches within the requesting processor if still present. No request for invalidation is transferred from L2 control to L1 as the command invalidates L1 cache entries as transferred to L2 control. For invalidate L1 cache congruence, L1 invalidates the proper L1 cache lines if still present in the requesting processor by executing an L1 directory search using the specified absolute address. Both the L1 instruction and operand caches perform the operation requested by the invalidate L1 cache line command. This is a redundant action as retry has already cleared the L1 cache contents. L2 control clears the L1 status entries for both the L1 instruction and operand caches within the requesting processor for the specified L1 congruence. All six entries in each status array are placed in the invalid state. No request for invalidation is transferred from L2 control to L1 as the L1 cache entries have been cleared by previous retry actions.

Storage Command Execution

Microcode issues the command and an absolute address to L1. L1 transfers the absolute address and storage command to L2 control. No data are transferred on the data buss. L1 uses the information to invalidate the appropriate L1 cache entries in the operand and instruction caches. Note that it is possible for an L1 cache miss to result if an alternate processor requested cross-invalidation of the same L1 cache line due to a store request, if the containing L2 cache line was replaced in L2 cache, or when the intended use is as invalidate L1 cache congruence. L2 control receives the primary command, storage command, and absolute address, followed by the actual storage command. After selection by L2 cache service priority, the absolute address is used to search the L2 directory. Any active lock, line-hold, or inpage freeze with storage uncorrectable error indication for the addressed L2 cache line is ignored as only the L1 status arrays can be modified as a result of this storage command. No information is transferred to L2 cache control and end-of-operation is transferred to memory control. The high-order bits of the address are used as the comparand with the L2 cache directory output. One of two conditions results from the L2 cache directory search. The results of the L2 cache directory search are only applicable to the invalidate L1 cache line command, not invalidate L1 cache congruence. Invalidate L1 Cache Line (AA26='0'b)

Case 1

An L2 cache miss results, indicating that the appropriate L1 status entries have already been cleared. No information is transferred to either address/key or L2 cache control. L2 control responds with command completed status to memory control. Memory control, upon receipt of command status from L2 control, responds with end-of-operation to the requesting processor.

Case 2

An L2 cache hit results, identifying the L2 cache set. No information is transferred to either address/key or L2 cache control. L2 control responds with command completed status to memory control. Both L1 status arrays of the requesting processor are searched for copies of the L1 cache line. The alternate processors' L1 status arrays are unaffected by the request. The low-order L2 cache congruence is used to address the L1 status arrays and the L2 cache set and high-order congruence are used as the comparand with the L1 status array outputs. If equal matches result, the appropriate entries are cleared. No address buss request for L1 cache invalidation is required. Memory control, upon receipt of command status from L2 control, responds with end-of-operation to the requesting processor. Invalidate L1 Cache Congruence (AA26='1'b) An L2 cache hit or miss results. No information is transferred to either address/key or L2 cache control. L2 control responds with command completed status to memory control. Both L1 status arrays of the requesting processor have all entries within the specified L1 cache congruence reset to the invalid state. The alternate processors' L1 status arrays are unaffected by the request. No address buss request for L1 cache invalidation is required. Memory control, upon receipt of command status from L2 control, responds with end-of-operation to the requesting processor.

2.4.7 Invalidate L2 Cache Entry

Application: Diagnostic testing of the storage system. Data integrity within the storage hierarchy is not a concern for the environment in which this storage command is used. The command is synchronized within the processor to ensure the activation of the storage command prior to issuing another storage command or storage key command. Processor storage fetch and store requests can be overlapped with the execution of this storage command. Microcode must ensure that if a particular processor within the configuration is quiescent, it is left in a state where it does not possess any lock, line-holds, or inpage freeze with storage uncorrectable error indication. Failure to do so may result in a lock-out condition as the invalidate storage command cannot complete when a quiescent processor possesses a lock, line-hold, or inpage freeze with storage uncorrectable error indication on the L2 cache line within the requested L2 cache entry.

Storage Command Description

Microcode supplies an L2 cache congruence, absolute address bits 16:24, in the corresponding storage address buss bit positions. The L2 cache set is inserted into address bits 25:27 and interpreted as follows:

'000'b is set 0,
'001'b is set 1,
'010'b is set 2,
'100'b is set 3,
'101'b is set 4,
'110'b is set 5.

The remaining bit patterns are invalid. The address is considered an absolute address by L1. The L2 cache entry, as specified by the L2 cache congruence and set supplied by microcode, is invalidated, along with the corresponding L2 mini directory entry. Regardless of the L2 cache line status within the requested entry, the line is never flushed to L3 memory. The L1 status arrays are also searched, and any copies of the L2 cache line which exist at the L1 cache level are purged and the appropriate L1 status entries are cleared.

Storage Command Execution

Microcode issues the command and an absolute address (the L2 cache congruence and set) to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute- address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command invalidate L2 cache entry is transferred to L2 control and address/key is instructed to transfer the absolute address to L2 control. L2 control receives the memory control command to invalidate the L2 cache entry and, after selection by the L2 cache service priority, uses the absolute address from address/key to address the L2 cache directory. L2 uses the address from address/key, recognizing it contains the L2 cache congruence and set. L2 control transfers no information to L2 cache control and command reply to memory control. One of three conditions results from the L2 directory search.

Case 1

The specified L2 cache entry is already marked invalid or bad. No information is transferred to address/key. The L2 cache line status is subsequently transferred to memory control. Memory control receives the L2 cache line status, L2 cache miss, and responds with end-of-operation to the requesting processor. No L2 mini directory entry invalidation is required.

Case 2

A lock, line-hold, or inpage freeze with storage uncorrectable error indication is active to the selected L2 cache line. No information is transferred to address/key. The L2 cache line status is subsequently transferred to memory control. Memory control receives the L2 cache line status, locked, and aborts the current execution of the command. The storage command is temporarily suspended, allowing time for the lock conflict to be cleared, and then re-entered into the memory control priority in an attempt to execute the command in its entirety.

Case 3

The L2 cache line is valid, either modified or unmodified. The L2 cache entry is marked invalid. L2 control transfers the combined address, the L2 cache congruence and the absolute address bits read from the L2 cache directory, to address/key along with the L2 cache set. The L2 cache line status is subsequently transferred to memory control. L2 directory hit status must be forced to memory control to ensure a mini directory update for the invalidated L2 cache entry. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. The invalidate L2 cache entry command is not affected by the request for local-invalidation or cross-invalidation as L1 guarantees the granting of the required address interface in a fixed number of cycles. Address/key receives the absolute address from L2 control, converts it to a physical address, and holds it in the storage command address buffers along with the L2 cache set. Memory control receives the L2 cache line status, L2 hit, and requests invalidation of the appropriate entry in the L2 mini directory using the storage command address buffers associated with this processor in address/key. Memory control then responds with end-of-operation to the requesting processor.

2.4.8 Read Memory Internal Registers

Application: Diagnostic testing of processor storage and extended storage. The command is used in conjunction with the processor storage fetch request to complete the fetching of selected memory internal registers to the requesting processor. The command is synchronized within the processor to ensure the completion of the storage command prior to commencing storage activity within the requesting processor.

Storage Command Description

Microcode supplies the command and an absolute address. Only absolute address bit 24 is significant to the read memory internal registers command in selecting the memory port. This storage command represents the first half of an operational command-pair. The command is designed to read selected memory internal registers from the specified memory port to a 128-byte memory buffer. All four control chips within the memory cards of the selected port participate in the read operation, transferring their copies of the special function registers, the check-bit registers, the redundant-bit registers, and the syndrome registers to the storage system on the storage data buss in preset positions. The storage command associates a memory buffer with the requesting processor, but only for the execution of this storage command. The memory buffer resource lock is not maintained between the execution of this storage command and the receipt of the second command from the requesting processor, the processor fetch with L2 cache miss, and its subsequent completion. The second command of the operational command-pair is the next processor storage fetch request issued by the same processor which results in an L2 cache miss. The storage system handles the L2 cache miss in the normal fashion with the exception of the source of the data and the L2 cache update. The data inpaged into cache storage from the specified address come from the memory buffer instead of the selected memory port. The 32 bytes of data previously loaded into the memory buffer by the read memory internal registers command are transferred to L1 twice to accommodate a normal 64-byte inpage sequence in L1 cache. The data are not loaded into the L2 cache inpage buffer allocated to the processor fetch request. Instead, the previous inpage buffer contents are loaded into the selected L2 cache entry, yielding an inconsistency in the data between the L1 cache and L2 cache for the given L2 cache line. Microcode must guarantee an L2 cache miss for the next processor storage fetch request to have the contents of the memory buffer inpaged into L1 cache. The storage address specified must be on a 128-byte boundary, but either L3 port may be selected.

Storage Command Execution

Microcode issues the command and an absolute address to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command is transferred to BSU control and address/key is instructed to transfer the appropriate address to BSU control. BSU control initiates the diagnostic memory fetch by transferring the command and physical address through L2 data flow to the specified memory port. BSU control records the processor identification associated with this storage command to allow subsequent completion of the read operation on the next processor storage fetch request from this processor. The selected memory port performs the requested diagnostic read, passing the data to the required memory interface register, and L2 data flow directs it to the memory buffer in the storage channel data buffer function. Only two data transfers occur from the selected memory port to the memory buffer. While the last data transfer completes to the memory buffer BSU control transfers end-of-operation to memory control. Memory control, upon receipt of end-of-operation from BSU control, releases the memory port and memory buffer resource lock for this processor and transfers end-of-operation to the requesting processor.

2.4.9 Set Address-Limit Check

Application: Used by 370-XA channels to partition absolute storage into two regions and limit data accesses by subchannels to one or both partitions. The command is synchronized within the processor to ensure completion of the storage command prior to issuing another storage command or storage key command. Processor storage fetch and store requests can be overlapped with the execution of this storage command.

Storage Command Description

Microcode supplies the command and an absolute address. Only absolute address bits 1:15 are significant, yielding an absolute address on a 64KB boundary. Prior to issuing the command, microcode must shift absolute address bits 1:15 into absolute address bit positions 5:19, inserting zeros into the vacated bit positions.

Storage Command Execution

Microcode issues the command and an absolute address to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command is transferred to address/key to set the address-limit register. End-of-operation is transferred to the requesting processor. Upon receipt of the memory control command, address/key immediately sets the address-limit register, bits 1:15, from the storage command absolute address buffer, bits 5:19, associated with the requesting processor.

2.4.10 Invalidate and flush L2 Cache Entry

Application: Diagnostic testing of the storage system. The command is synchronized within the processor to ensure the activation of the storage command prior to issuing another storage command or storage key command. Processor storage fetch and store requests can be overlapped with the execution of this storage command. Microcode must ensure that if a particular processor within the configuration is quiescent, it is left in a state where it does not possess any lock, line-holds, or inpage freeze with storage uncorrectable error indication. Failure to do so may result in a lock-out condition as the invalidate and flush storage command cannot complete when a quiescent processor possesses a lock, line-hold, or inpage freeze with storage uncorrectable error indication on the L2 cache line within the requested L2 cache entry.

Storage Command Description

Microcode supplies an L2 cache congruence, absolute address bits 16:24, in the corresponding storage address buss bit positions. The L2 cache set is inserted into address bits 25:27 and interpreted as follows: '000'b is set 0, '001'b is set 1, '010'b is set 2, '100'b is set 3, '101'b is set 4, '110'b is set 5. The remaining bit patterns are invalid. The address is considered an absolute address by L1. The L2 cache entry, as specified by the L2 cache congruence and set supplied by microcode, is invalidated, along with the corresponding L2 mini directory entry. If the L2 cache line contained within the specified cache entry is modified, the line is flushed to L3 memory. The L1 status arrays are also searched, and any copies of the L2 cache line which exist at the L1 cache level are purged and the appropriate L1 status entries are cleared.

Storage Command Execution

Microcode issues the command and an absolute address (the L2 cache congruence and set) to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command invalidate and flush L2 cache entry is transferred to L2 control and address/key is in structed to transfer the absolute address to L2 control. L2 control receives the memory control command to invalidate and flush the L2 cache entry and, after selection by the L2 cache service priority, uses the absolute address from address/key to address the L2 cache directory. L2 uses the address from address/key, recognizing it contains the L2 cache congruence and set. A load outpage buffer if modified and not locked command is transferred to L2 cache control and command reply is transferred to memory control. one of four conditions results from the L2 directory search.

Case 1

The specified L2 cache entry is already marked invalid or bad. No information is transferred to address/key. The L2 cache line status and cache set are transferred to L2 cache control, the cache set modifier is transferred to L2 cache, and the L2 cache line status is transferred to memory control. Not modified status is forced due to the invalid or bad state of the L2 cache entry. The L1 status array compares are blocked due to the L2 cache entry invalid or bad status. L2 cache control receives load outpage buffer if modified and not locked from L2 control and prepares for an L2 cache line read. L2 cache control drops the command upon receipt of the L2 cache line status, not modified. Memory control receives the L2 cache line status, L2 cache miss, and responds with end-of-operation to the requesting processor. No L2 mini directory entry invalidation is required.

Case 2

A lock, line-hold, or inpage freeze with storage uncorrectable error indication is active to the selected L2 cache line. No information is transferred to address/key. The L2 cache line status and cache set are transferred to L2 cache control, the cache set modifier is transferred to L2 cache, and the L2 cache line status is transferred to memory control. The L1 status array compares are blocked due to the lock, line-hold, or inpage freeze with storage uncorrectable error conflict. L2 cache control receives load outpage buffer if modified and not locked from L2 control and prepares for an L2 cache line read. L2 cache control drops the command upon receipt of the L2 cache line status, locked. Memory control receives the L2 cache line status, locked, and aborts the current execution of the command. The storage command is temporarily suspended, allowing time for the lock conflict to be cleared, and then re-entered into the memory control priority in an attempt to execute the command in its entirety.

Case 3

The L2 cache line is valid, but unmodified. The L2 cache entry is marked invalid. L2 control transfers the combined address, the L2 cache congruence and the absolute address bits read from the L2 cache directory, to address/key along with the L2 cache set. The L2 cache line status and cache set are transferred to L2 cache control, the cache set modifier is transferred to L2 cache, and the L2 cache line status is transferred to memory control. L2 directory hit status must be forced to memory control to ensure a mini directory update for the invalidated L2 cache entry. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. The invalidate and flush command is not affected by the request for local-invalidation or cross-invalidation as L1 guarantees the granting of the required address interface in a fixed number of cycles. Address/key receives the absolute address from L2 control, converts it to a physical address, and holds it in the storage command address buffers along with the L2 cache set. L2 cache control receives load outpage buffer if modified and not locked from L2 control and prepares for an L2 cache line read. L2 cache control, upon receipt of the L2 cache line status, not modified, drops the command. Memory control receives the L2 cache line status, L2 hit, and requests invalidation of the appropriate entry in the L2 mini directory using the storage command address buffers associated with this processor in address/key. Memory control then responds with end-of-operation to the requesting processor.

Case 4

The L2 cache line is valid and modified. The L2 cache entry is marked invalid. L2 control transfers the combined address, the L2 cache congruence and the absolute address bits read from the L2 cache directory, to address/key along with the L2 cache set. The L2 cache line status and cache set are transferred to L2 cache control, the cache set modifier is transferred to L2 cache, and the L2 cache line status is transferred to memory control. L2 directory hit status must be forced to memory control to ensure a mini directory update for the invalidated L2 cache entry. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. The invalidate and flush request is not affected by the request for local-invalidation or cross-invalidation as L1 guarantees the granting of the required address interface in a fixed number of cycles. Address/key receives the absolute address from L2 control, converts it to a physical address, and holds it in the storage command address buffers along with the L2 cache set. L2 cache control receives load outpage buffer if modified and not locked from L2 control and prepares for an L2 cache line read. Upon receipt of the status from L2 control, L2 cache control instructs L2 cache to read a full line from the specified L2 cache congruence and set to the outpage buffer designated by L2 control. Memory control receives the L2 cache line status, forced L2 hit, and requests invalidation of the appropriate entry in the L2 mini directory using the storage command address buffers associated with this processor in address/key. Memory control requests that address/key send the L3 physical address to BSU control and transfers an unload outpage buffer command to BSU control to store the L2 line to the required L3 memory port. Memory control then responds with end-of-operation to the requesting processor. BSU control receives the command from memory control and physical address from address/key. BSU control initiates the L3 line write by transferring the command and address to the selected memory port through the L2 cache data flow. Data are transferred from the outpage buffer to memory 16 bytes at a time. After the last data transfer, BSU control responds with end-of-operation to memory control. Memory control, upon receipt of end-of-operation from BSU control, releases the L3 port to permit overlapped access to the memory port.

2.4.11 Pad L3 Line

Applications: MVCL pattern padding of processor storage. Diagnostic testing of L3 processor storage. Microcode must ensure that the store queue for the requesting processor is empty prior to issuing this storage command. The command is synchronized within the processor to ensure the activation of the storage command prior to commencing storage activity within the requesting processor. Microcode must ensure that if a particular processor within the configuration is quiescent, it is left in a state where it does not possess any lock, line-holds, or inpage freeze with storage uncorrectable error indication. Failure to do so may result in a lock-out condition as the pad L3 line storage command cannot complete when a quiescent processor possesses a lock, line-hold, or inpage freeze with storage uncorrectable error indication on the requested L2 cache line.

Storage Command Description

The storage command is used to replicate an eight-byte data pattern throughout a 128-byte L3 line. Microcode specifies a logical address in the command. The absolute address, after the appropriate address translation in L1, is used to search the L2 cache directory. If an L2 cache hit results, the L2 cache line is invalidated. The corresponding entry in the L2 mini directory is invalidated. The L1 status arrays are also searched, and any copies of the L2 cache line which exist at the L1 cache level are purged and the appropriate L1 status entries are cleared. L1 need not invalidate the L1 cache lines associated with the storage command. L2 control requests invalidation of all L1 cache copies in the configuration as part of the execution of the command if the line exists in L2 cache.

Storage Command Execution

Microcode issues the command and a logical address, on a 128-byte boundary in L3 processor storage, to L1 along with an eight-byte data pattern sourced from local store. If an addressing or protection exception exists, the storage command, address, and data are not transferred to L2 and memory control. L1 transfers the absolute address and a pass address storage command to L2 control and the actual storage command to memory control. The eight-byte data pattern is transferred to L2. L2 control receives the primary command, storage command, and absolute address, followed by the pass address command. The 8 bytes of pattern data are replicated and loaded into the 16-byte alternate data buffer as the storage command does not directly access the L2 cache. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. Memory control transfers a command to L2 control to invalidate the L2 cache line and requests that address/key transfer the absolute address to L2 control, the physical address to BSU control, and update the reference and change bits of the containing 4KB page. Memory control transfers a command to BSU control. This command, pad L3 line, is conditionally executed by BSU control based on the L2 cache line status subsequently transferred by L2 control with the perform memory control access if not locked command. Address/key uses the storage command address buffer to initiate an update of the storage key array. The reference and change bits of the specified 4KB page are set to '1'b. BSU control receives the command from memory control and waits for status from L2 control. L2 control receives the memory control command and, after selection by the L2 cache service priority, uses the address/key address to search the L2 cache directory. A perform memory control access if not locked command is transferred to L2 cache control to be forwarded to BSU control and command reply is transferred to memory control. One of three conditions results from the L2 directory search.

Case 1

An L2 cache miss results from the directory search. No information is transferred to address/key. The L2 cache line status and cache set are transferred to L2 cache control, the cache set modifier is transferred to L2 cache, and the L2 cache line status is transferred to memory control. The L1 status array compares are blocked due to the L2 cache miss. Memory control receives the L2 cache line status, L2 cache miss and not locked; no L2 mini directory update is required. Memory control transfers end-of-operation to the requesting processor. BSU control receives perform memory control access if not locked from L2 control and the physical address from address/key and prepares for the pad L3 line write. Upon receipt of the status from L2 control, not locked, BSU control initiates the L3 line write by transferring the command and address through the L2 data flow to the required memory port. BSU control then specifies that the alternate data buffer contents be transferred to the memory port. The data pattern is sent eight times across the 16-byte L3 storage interface to complete the L3 line padding operation. End-of-operation is transferred to memory control from BSU control after the final data transfer. Memory control, upon receipt of end-of-operation from BSU control, releases the L3 port to permit overlapped access to the memory port.

Case 2

A lock, line-hold, or inpage freeze with storage uncorrectable error indication is active to the addressed L2 cache line. No information is transferred to address/key. The L2 cache line status and cache set are transferred to L2 cache control, the cache set modifier is transferred to L2 cache, and the L2 cache line status is transferred to memory control. The L1 status array compares are blocked due to the lock, line-hold, or inpage freeze with storage uncorrectable error conflict. Memory control receives the L2 cache line status, locked, and aborts the current execution of the command. The storage command is temporarily suspended, allowing time for the lock conflict to be cleared, and then re-entered into the memory control priority in an attempt to execute the command in its entirety. BSU control receives perform memory control access if not locked from L2 control and the physical address from address/key and prepares for the pad L3 line write. Upon receipt of the status from L2 control, locked, BSU control drops the command.

Case 3

An L2 cache hit results from the directory search and the cache line is either modified or unmodified. The L2 cache entry is marked invalid. L2 control transfers the absolute address to address/key along with the L2 cache set. The L2 cache line status and cache set are transferred to L2 cache control, the cache set modifier is transferred to L2 cache, and the L2 cache line status is transferred to memory control. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. The invalidate L2 cache line command is not affected by the request for local-invalidation or cross-invalidation as L1 guarantees the granting of the required address interface in a fixed number of cycles. Address/key receives the absolute address from L2 control, converts it to a physical address, and holds it in the storage command address buffers along with the L2 cache set. Memory control receives the L2 cache line status, L2 hit and not locked, and requests invalidation of the appropriate entry in the L2 mini directory using the storage command address buffers associated with this processor in address/key. Memory control then responds with end-of-operation to the requesting processor. BSU control receives perform memory control access if not locked from L2 control and the physical address from address/key and prepares for the pad L3 line write. Upon receipt of the status from L2 control, not locked, BSU control initiates the L3 line write by transferring the command and address through the L2 data flow to the required memory port. BSU control then specifies that the alternate data buffer contents be transferred to the memory port. The data pattern is sent eight times across the 16-byte L3 storage interface to complete the L3 line padding operation. End-of-operation is transferred to memory control from BSU control after the final data transfer. Memory control, upon receipt of end-of-operation from BSU control, releases the L3 port to permit overlapped access to the memory port.

2.4.12 Reset Processor Storage Interface

Applications: Used in the page-fault handling routine. Used to avoid the store-and-unlock access of an interlocked update. Microcode must ensure that the store queue for the requesting processor is empty of conceptually completed stores prior to issuing this storage command. The command is synchronized within the processor to ensure completion of the storage command prior to commencing storage activity within the requesting processor. This storage command is used in situations where S/370 instructions are to be nullified or suppressed during the page-fault handling routine. The command is intended to clear the storage system of any store requests enqueued within the store queue or L2 cache write buffers that are associated with the S/370 instruction causing the page-fault. The storage command can be used to avoid the store-and-unlock storage access of an interlocked update when the store access is deemed unnecessary by the execution path taken in the instruction. It permits the lock to be reset without executing a store request to that storage location. Note that this command ignores any store queue status. As the reset processor storage interface command is transferred directly from L1 to L2 control, any outstanding requests to L2 must be completed before this command is honored, with the exception of enqueued store requests.

Storage Command Description

Microcode supplies only the command. The storage command causes the following steps to be taken in the storage hierarchy. First, the store queue at the L1 cache level in the requesting processor is placed in its system reset state. All status indicators of the store queue entries are cleared. Second, the L2 store queue of the requesting processor is placed in its system reset state and all store queue entry status indicators are cleared. The immediate store mode status latch associated with the requesting processor's store queue is reset. The lock and line-hold registers of the requesting processor are cleared. If storage uncorrectable errors have been detected on prepaged L2 cache lines for a sequential store operation in progress, L2 control must invalidate the L2 cache lines identified by the line-hold registers containing uncorrectable error indications as part of the execution of this storage command. For vector instructions using sequential full line stores, L2 control must invalidate the L2 cache lines identified by the line-hold registers containing not-in-here indications as part of the execution of this storage command. All L2 cache write buffers of the requesting processor are cleared of any data and store byte flags by placing the associated control and address registers in their system reset state. Any pending inpage for the processor is allowed to complete normally. Finally, any resource locks held for the processor are released. As inpage requests complete normally, this amounts to releasing the memory buffer resource lock. if allocated to the requesting processor. In summary, the processor's pending activities throughout the storage hierarchy are cleared, and the processor-specific portion of the storage system is placed in the system reset state.

Storage Command Execution

Microcode issues the command to L1. L1 transfers the storage command and absolute address, by default, to L2 control. No data are transferred on the data buss. L1 resets its store queue to the system reset state, clearing all status indicators in the queue entries. L2 control receives the primary command, storage command, and the absolute address, by default, followed by the reset processor storage interface command. After selection by the L2 cache service priority, L2 control sets the L2 store queue controls to their system reset state and clears all lock and line-hold registers associated with the requesting processor. Any L2 lines held exclusive due to uncorrectable storage errors or not-in-here bits are invalidated in the L2 cache directory. This may take several cycles in the L2 cache directory. Any pending inpage request for a store with L2 cache miss is completed, resetting the freeze register upon completion, but a line-hold register is not set. If a storage uncorrectable error occurs on inpage for the store request, the line is not loaded into L2 cache and the directory is not updated; in this situation it is handled as a fetch request inpage. The reset processor storage interface command is transferred to memory control and L2 cache control. No information is transferred to address/key. L2 cache control resets any control registers associated with the L2 store queue and L2 cache write buffers for the requesting processor. L2 cache control instructs L2 data flow to perform similar actions. Memory control, after receiving the command from L2 control, responds with end-of-operation to the requesting processor. In parallel, memory control clears the memory buffer resource lock if allocated to the processor.

2.4.13 Transfer L3 Line to Memory Buffer

Application: S/370 PGOUT (Page Out) instruction. For use in the PGOUT instruction, the store queue for the requesting processor must be empty prior to issuing this command to guarantee that all stores for the 4KB page to be moved are complete. This is a part of the serialization and checkpoint-synchronizing operation required at the start of the instruction by the S/370 architecture. The command is used in conjunction with the transfer memory buffer to L4 line command to complete the data move from processor storage to extended storage. As each command-pair moves 128 bytes, a 32 iteration loop is established in microcode to handle the 4KB page. The command is synchronized within the processor to ensure the activation of the storage command prior to commencing storage activity within the requesting processor. The storage system guarantees proper overlap of the operational storage command-pairs utilizing the memory buffer. Microcode must ensure that if a particular processor within the configuration is quiescent, it is left in a state where it does not possess the memory buffer or any lock, line-holds, or inpage freeze with storage uncorrectable error indication. Failure to do so may result in a lock-out condition as the transfer L3 line to memory buffer storage command cannot complete when a quiescent processor possesses the memory buffer or a lock, line-hold, or inpage freeze with storage uncorrectable error indication on the requested L2 cache line.

Storage Command Description

This command represents the first half of an operational storage command-pair. The command is designed to copy 128 bytes of L3 processor storage data, on a 128-byte boundary, from the specified L3 address to a 128-byte memory buffer. The storage command associates a memory buffer with the requesting processor and holds it exclusive until the second command is received and completed from the requesting processor. For PGOUT, transfer memory buffer to L4 line is the second storage command. The reset processor storage interface command can be used as the second command of the command-pair to release the allocated resources without modifying the destination storage location. The implementation outlined does not guarantee that another processor or channels cannot access the L3 line in the interval between when the processor issues this storage command and memory control activates the second storage command to transfer the memory buffer contents to L4 for the PGOUT instruction. This is deemed a minimum exposure given that the operating system is in the process of paging out this 4KB page for the PGOUT instruction and there should be no concurrent references to this 4KB page.

Storage Command Execution

Microcode issues the command and an absolute address, on a 128-byte boundary in L3 processor storage, to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command to reset modified status and flush the L2 cache line is transferred to L2 control and address/key is instructed to transfer the absolute address to L2 control, the physical address to BSU control, and update the reference bit of the containing 4KB page. Memory control transfers a command to BSU control. This command, unload outpage buffer if modified and not locked or transfer L3 line to memory buffer if not modified and not locked, is conditionally executed by BSU control based on the L2 cache line status subsequently transferred by L2 control with the load outpage buffer if modified and not locked command. Address/key uses the storage command address buffer to initiate an update of the storage key array. The reference bit of the specified 4KB page is set to '1'b. BSU control receives the command from memory control and waits for status from L2 control. L2 control receives the memory control command and, after selection by the L2 cache service priority, uses the absolute address from address/key to search the L2 cache directory. A load outpage buffer if modified and not locked command is transferred to L2 cache control and command reply is transferred to memory control. One of four conditions results from the L2 cache directory search.

Case 1

The search of the L2 cache directory results in an L2 cache miss. No information is transferred to address/key.

The L2 cache line status and cache set are transferred to L2 cache control, the cache set modifier is transferred to L2 cache, and the L2 cache line status is transferred to memory control. Not modified status is forced due to the L2 cache miss. The L1 status array compares are blocked due to the reset modified status and flush L2 line command. L2 cache control receives load outpage buffer if modified and not locked from L2 control and prepares for an L2 cache line read. L2 cache control, upon receipt of the L2 cache line status, not modified and not locked, drops the command. BSU control initiates the transfer L3 line to memory buffer command as a result of the L2 cache line status, not modified and not locked. Memory control receives the L2 cache line status, L2 miss and not locked, and recognizes that BSU control is starting the full L3 line fetch access for transfer to the memory buffer. Memory control transfers end-of-operation to the requesting processor.

Case 2

A lock, line-hold, or inpage freeze with storage uncorrectable error indication is active to the selected L2 cache line. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. L2 cache control and BSU control drop the command upon receipt of the L2 cache line status, locked. Memory control receives the L2 cache line status, locked, and aborts the current execution of the command. The storage command is temporarily suspended, allowing time for the lock conflict to be cleared, and then re-entered into the memory control priority in an attempt to execute the command in its entirety.

Case 3

The search of the L2 cache directory results in an L2 cache hit and the cache line is unmodified. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. L2 cache control, upon receipt of the L2 cache line status, not modified and not locked, drops the command. BSU control initiates the transfer L3 line to memory buffer command as a result of the L2 cache line status, not modified and not locked. Memory control receives the L2 cache line status, not modified and not locked, and recognizes that BSU control is starting the full L3 line fetch access for transfer to the memory buffer. Memory control transfers end-of-operation to the requesting processor.

Case 4

The search of the L2 cache directory results in an L2 cache hit and the cache line is modified. The L2 cache line is subsequently marked unmodified as its contents are being transferred to L3 processor storage. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. Upon receipt of the status from L2 control, L2 cache control instructs L2 cache to read a full line from the specified L2 cache congruence and set to the outpage buffer designated by L2 control. Memory control receives the L2 cache line status and recognizes that a flush to processor storage is in progress. The status, modified and not locked, causes BSU control to start the flush. The command and address are transferred through the L2 data flow to the required memory port to initiate the L3 line write operation. Data are transferred from the outpage buffer to memory 16 bytes at a time. After the last quadword transfer to memory, BSU control transfers end-of-operation to memory control. Memory control, upon receipt of end-of-operation from BSU control, transfers an unconditional transfer L3 line to memory buffer command to BSU control and requests that address/key send the L3 physical address to BSU control. Memory control transfers end-of-operation to the requesting processor. BSU control receives the command from memory control and physical address from address/key and starts the transfer L3 line to memory buffer command.

Cases 1,3,4

BSU control initiates the L3 memory port 128-byte fetch by transferring the command and address to processor storage and selecting the memory cards in the desired port. The L3 memory performs the requested read, passing the data to the L3 interface register, and L2 data flow directs it to the memory buffer in the storage channel data buffer function. While the last data transfer completes to the memory buffer BSU control transfers end-of-operation to memory control. During the data transfers to the L3 interface register, address/key monitors the uncorrectable error lines from memory. Should an uncorrectable error be detected during the L3 line fetch several functions are performed. With each transfer to the memory buffer, an L3 uncorrectable error signal is transferred to the requesting processor. At most, the processor receives one storage uncorrectable error indication for a given transfer L3 line to memory buffer command, the first one detected by address/key. The doubleword address of the first storage uncorrectable error detected by address/key is recorded for the requesting processor and an L3 storage indicator latch is set. Memory control, upon receipt of end-of-operation from BSU control, releases the L3 port but retains the memory buffer resource lock for this processor.

2.4.14 Transfer L4 Line to Memory Buffer

Application: S/370 PGIN (Page In) instruction. For use in the PGIN instruction, the store queue of the requesting processor must be empty prior to issuing this command to guarantee that all stores for previously executed instructions are complete. This is part of the serialization and checkpoint-synchronizing operation required at the start of the instruction by the S/370 architecture. Microcode is responsible for verifying that the L4 extended-storage-block number specified in the PGIN instruction is available in the configuration prior to issuing this command. The extended-storage-block number must be converted to an L4 extended storage absolute address by microcode. The address, once generated, is supplied to the storage system with L4 address bits 4:24 in the storage address bit positions 4:24. L4 address bits 1:3 are placed into storage address bit positions 26:28. The command is used in conjunction with the transfer memory buffer to L3 line command to complete the data move from extended storage to processor storage. As each command-pair moves 128 bytes, a 32 iteration loop is established in microcode to handle the 4KB page. The command is synchronized within the processor to ensure the activation of the storage command prior to commencing storage activity within the requesting processor. The storage system guarantees proper overlap of the operational storage command-pairs utilizing the memory buffer. Microcode must ensure that if a particular processor within the configuration. is quiescent, it is left in a state where it does not possess the memory buffer. Failure to do so may result in a lock-out condition as the transfer L4 line to memory buffer storage command cannot complete when a quiescent processor possesses the memory buffer.

Storage Command Description

This command represents the first half of an operational storage command-pair. The command is designed to copy 128 bytes of L4 extended storage data, on a 128-byte boundary, from the specified L4 address to a 128-byte memory buffer. The storage command associates a memory buffer with the requesting processor and holds it exclusive until the second command is received and completed from the requesting processor. For PGIN, transfer memory buffer to L3 line is the second storage command. The reset processor storage interface command can be used as the second command of the command-pair to release the allocated resources without modifying the destination storage location. The implementation outlined does not guarantee that another processor or channels cannot access the L3 line to be loaded in the interval between when the processor issues this storage command and memory control activates the second storage command to transfer the allocated memory buffer contents to L3 for the PGIN instruction. This is deemed a minimum exposure given that the operating system is in the process of paging in this 4KB page for the PGIN instruction and there should be no concurrent references to the allocated 4KB page-frame. No address checks are performed by the storage system on the L4 extended storage address supplied by microcode.

Storage Command Execution

Microcode issues the command and an absolute address, on a 128-byte boundary in L4 extended storage, to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the L4 memory port id from L2 control. Memory control allocates the necessary resources and activates the storage command when selected by priority. Memory control transfers a command to BSU control to fetch 128 bytes from the L4 memory port to the specified memory buffer and requests that address/key send the L4 absolute address to BSU control. End-of-operation is then transferred to the requesting processor. BSU control receives the command from memory control and the L4 absolute address from address/key. BSU control initiates the L4 memory port 128-byte fetch by transferring the command and address to extended storage and selecting the memory cards in the desired port. The L4 memory performs the requested read, passing the data to the L3 interface register, and L2 data flow transfers it to the memory buffer in the storage channel data buffer function. While the last data transfer completes to the memory buffer BSU control transfer end-of-operation to memory control. During the data transfers to the L3 interface register, address/key monitors the uncorrectable error lines from memory. Should an uncorrectable error be detected during the L4 line fetch several functions are performed. With each transfer to the memory buffer, an L3 uncorrectable error signal is transferred to the requesting processor. At most, the processor receives one storage uncorrectable error indication for a given transfer L4 line to memory buffer command, the first one detected by address/key. The double-word address of the first storage uncorrectable error detected by address/key is recorded for the requesting processor and an L4 storage indicator latch is set. As part of the storage uncorrectable error routine, microcode must determine that a PGIN instruction is in progress for setting the condition code appropriately before completion of the S/370 instruction. Memory control, upon receipt of end-of-operation from BSU control, releases the L4 port but retains the memory buffer resource lock for this processor.

2.4.15 Transfer Memory Buffer to L4-Line

Application: S/370 PGOUT (Page Out) instruction. For use in the PGOUT instruction, the store queue of the requesting processor must be empty prior to issuing this command to guarantee that all stores for previously executed instructions are complete. This is a part of the serialization and checkpoint-synchronizing operation required at the start of the instruction by the S/370 architecture. Microcode is responsible for verifying that the L4 extended-storage-block number specified in the PGOUT instruction is available in the configuration prior to issuing this command. The extended-storage-block number must be converted to an L4 extended storage absolute address by microcode. The address, once generated, is supplied to the storage system with L4 address bits 4:24 in the storage address bit positions 4:24. L4 address bits 1:3 are placed into storage address bit positions 26:28. The command is used in conjunction with the transfer L3 line to memory buffer command to complete the data move from processor storage to extended storage. As each command-pair moves 128 bytes, a 32 iteration loop is established in microcode to handle the 4KB page. The command is synchronized within the processor to ensure the activation of the storage command prior to commencing storage activity within the requesting processor. The storage system guarantees proper overlap of the operational storage command-pairs utilizing the memory buffer.

Storage Command Description

This command represents the second half of an operational storage command-pair. The command utilizes a previously allocated memory buffer for the processor as the source of the 128 bytes of data to be moved into the specified L4 extended storage line and releases it upon completion of this operation. For PGOUT, transfer L3 line to memory buffer is the first storage command. The implementation outlined does not guarantee that another processor or channels cannot access the L3 line to be moved in the interval between when the processor issues the first storage command and memory control activates this storage command to transfer the allocated memory buffer contents to L4 for the PGOUT instruction. This is deemed a minimum exposure given that the operating system is in the process of paging out this 4KB page for the PGOUT instruction and there should be no concurrent references to this 4KB page. No address checks are performed by the storage system on the L4 extended storage address supplied by microcode.

Storage Command Execution

Microcode issues the command and an absolute address, on a 128-byte boundary in L4 extended storage, to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the L4 memory port id from L2 control. Memory control allocates the necessary resources and activates the storage command when selected by priority. Memory control transfers the command to BSU control to store the memory buffer contents to the L4 line and requests that address/key send the L4 absolute address to BSU control. End-of-operation is then transferred to the requesting processor. BSU control receives the command from memory control and the L4 absolute address from address/key. BSU control initiates the L4 line write by transferring the command and address through the L2 data flow to the L4 memory port. BSU control then specifies that the memory buffer contents be transferred from the storage channel data buffer function to the proper L3 interface register for transfer to the L4 memory. End-of-operation is transferred to memory control from BSU control after the final data transfer to memory. Memory control, upon receipt of end-of-operation from BSU control, releases the L4 port to permit overlapped access to the memory port and the memory buffer resource lock.

2.4.16 Test and Set

Application: Software interlocked updates to main storage locations which are obeyed by both channels and processors. Microcode must ensure that the store queue for the requesting processor is empty prior to the first issuance of this storage command within the I/O instruction. The command is synchronized within the processor to ensure the activation of the storage command prior to commencing storage activity within the requesting processor. Microcode must ensure that if a particular processor within the configuration is quiescent, it is left in a state where it does not possess any lock, line-holds, or inpage freeze with storage uncorrectable error indication. Failure to do so may result in a lock-out condition as the test and set storage command cannot complete when a quiescent processor possesses a lock, line-hold, or inpage freeze with storage uncorrectable error indication on the requested L2 cache line. When more than one test and set command is executed within an I/O instruction, and intervening store requests are executed, microcode is responsible for storage consistency within the instruction. The storage system performs no pending store conflict checks for test and set storage commands. Within the same I/O instruction, microcode must not perform sequential stores to an L3 line (128 bytes) prior to execution of a test and set to a byte within that L3 line. Due to hardware preparing into L2 cache for sequential stores, this sequence could cause the processor to deadlock.

Storage Command Description

Microcode supplies the command, an absolute address, on an eight-byte boundary, and a single byte of data, designated the lock-byte. The lock-byte contains two fields. The first bit, bit 0, is the lock-bit. The remaining seven bits within the byte contain a process identification. As viewed in storage, a '0'b value in the lock-bit signifies that the associated storage field is currently unlocked, available for use. A value of '1'b signifies that the storage field is locked or already in use by another process which is currently altering the storage field, requiring exclusive use of the contents. The remaining seven bits identify the current, or last, process owner of the lock for the associated storage field. When microcode issues the command it is for the purpose of obtaining exclusive access to the storage field associated with the lock-byte. Microcode supplies a '1'b in the high-order bit and the process identification of the requester. The command, absolute address, and lock-byte are passed to the storage system. The most recent copy of the addressed storage location is interrogated for the current state of the lock-bit. If the lock-bit value is '0'b, the new lock-byte is inserted into the storage location and the new data are returned to the processor; if the lock-bit value is '1'b, the storage location remains unchanged and the original storage contents are returned to the processor. The absolute address is used to search the L2 cache directory. If the L2 cache line containing the lock-byte is modified, the L2 cache line is flushed to L3 processor storage prior to fetching the lock-byte for the test and set operation. This guarantees exclusive access to the data as the memory port is a non-sharable resource. The L2 cache directory entry and the corresponding entry in the L2 mini directory are invalidated. The L1 status arrays are also searched, and any copies of the L2 cache line which exist at the L1 cache level are purged and the appropriate L1 status entries are cleared. The L3 line containing the lock-byte is subsequently inpaged to the L2 cache and the desired half-line is inpaged to the requester's L1 operand cache. The lock-byte is conditionally modified, based on the current state of the lock-bit in the storage location, prior to loading the data into cache storage. The addressed byte is transferred to the processor for testing of the process identification. An equal comparison with the lock-byte supplied with the command signifies that the lock has been granted to the requester; a miscompare signifies that the storage field is currently locked by another process, as identified by the process identification in the byte returned from processor storage.

Storage Command Execution

Microcode issues the command, an absolute address, and the lock-byte sourced from local store to L1. L1 invalidates the associated L1 cache line, if present, in the L1 operand cache. L1 transfers the primary command, storage command, absolute address, and lock-byte, in byte 0 of the 8-byte storage data interface, to L2. L1, in the following cycle, transfers the test and set command and L1 cache set which is to receive the L1 inpage data from processor storage. In the case of an L1 cache hit, the cache set of the current L1 entry is transferred; for an L1 cache miss, the replacement algorithm selects the cache set to be loaded. L2 control receives the primary command, storage command, and absolute address, followed by the test and set command and L1D cache set. The data, containing the lock-byte, are loaded into the alternate data buffer as the storage command does not directly access the L2 cache. L2 control retains the L1D cache set for later L1 status updating. Provided no L2 cache inpage is pending for the requesting processor's store queue, the test and set command is permitted to enter L2 cache priority. After selection by the L2 cache service priority, the command is transferred to memory control and the address to address/key. L2 control sets the command buffer inpage pending latch for the test and set request. Address/key receives the absolute address from L2 control, converts it to a physical address, and holds it in the storage command address buffers. L2 cache control does not receive a command from L2 control as it is not a processor L2 cache storage request. Memory control receives the test and set command and the memory port id from L2 control. Memory control allocates the necessary resources and activates the storage command when selected by priority. The invalidate and flush for test and set command is transferred to L2 control and address/key is instructed to transfer the absolute address to L2 control and the physical address to BSU control. Memory control transfers a command to BSU control. This command, unload outpage buffer if modified and not locked or inpage for test and set if not modified and not locked, is conditionally executed by BSU control based on the L2 cache line status subsequently transferred by L2 control with the load outpage buffer if modified and not locked command. BSU control receives the command from memory control, the physical address from address/key, and waits for status from L2 control. L2 control receives the memory control command to invalidate and flush the L2 cache line for test and set and, after selection by the L2 cache service priority, uses the address/key address to search the L2 cache directory. A load outpage buffer if modified and not locked command is transferred to L2 cache control and command reply is transferred to memory control. One of five conditions results from the L2 directory search.

Case A

The search of the L2 cache directory results in an L2 cache miss, but a previous L2 cache inpage is pending for an alternate processor to the same L2 cache line. No information is transferred to address/key. The L2 cache line status and cache set are transferred to L2 cache control, the cache set modifier is transferred to L2 cache, and the L2 cache line status is transferred to memory control. Not modified status is forced due to the L2 cache miss; locked status is sent due to the previous inpage freeze conflict. The L1 status array compares are blocked due to the L2 cache miss. L2 cache control receives load outpage buffer if modified and not locked from L2 control and prepares for an L2 cache line read. L2 cache control and BSU control drop the command upon receipt of the L2 cache line status, not modified and locked. Memory control receives the L2 cache line status, locked, and aborts the current execution of the command. The storage command is temporarily suspended, allowing time for the lock conflict to be cleared, and then re-entered into the memory control priority in an attempt to execute the command in its entirety. This compare is required even though the test and set command has possession of the L3 port to prevent the possibility of loading the same L3 line into L2 cache twice. Assume a previous inpage request from an alternate processor is pending to the same line as the test and set request. The test and set request performs its inpage to L2 cache as memory control has selected it first, and then the previously pending inpage request is honored by memory control. The same L3 line is then inpaged into L2 cache again, possibly creating coexisting copies in L2 cache.

Case B

The search of the L2 cache directory results in an L2 cache miss and no freeze conflict exists. L2 control transfers the absolute address to address/key. The L2 cache line status and cache set are transferred to L2 cache control, the cache set modifier is transferred to L2 cache, and the L2 cache line status is transferred to memory control. Not modified status is forced due to the L2 cache miss. A processor inpage freeze register is set for the L3 line containing the test and set byte as an inpage sequence to L1 and L2 cache will follow the initial L2 directory search. The L1 status array compares are blocked due to the L2 cache miss. Address/key receives the absolute address from L2 control, converts it to a physical address, and holds it in the storage command and inpage address buffers. L2 cache control receives load outpage buffer if modified and not locked from L2 control and prepares for an L2 cache line read. L2 cache control, upon receipt of the L2 cache line status, not modified and not locked, prepares for an L2 cache inpage. BSU control initiates the inpage for test and set command as a result of the L2 cache line status, not modified and not locked. Memory control receives the L2 cache line status, L2 miss and not locked, and recognizes that BSU control is starting the full L3 line fetch access, with conditional modification of the storage location lock-byte, for the inpage to L1 and L2 cache. No L2 mini directory entry invalidation is required. Memory control transfers a command to L2 control to set L2 status for pending inpage, marking the incoming line modified regardless of whether the contents are actually changed by the test and set operation.

Case C

A lock, line-hold, or inpage freeze with storage uncorrectable error indication is active to the selected L2 cache line. No information is transferred to address/key. The L2 cache line status and cache set are transferred to L2 cache control, the cache set modifier is transferred to L2 cache, and the L2 cache line status is transferred to memory control. The L1 status array compares are blocked due to the lock, line-hold, or inpage freeze with storage uncorrectable error conflict. L2 cache control receives load outpage buffer if modified and not locked from L2 control and prepares for an L2 cache line read. L2 cache control and BSU control drop the command upon receipt of the L2 cache line status, locked. Memory control receives the L2 cache line status, locked, and aborts the current execution of the command. The storage command is temporarily suspended, allowing time for the lock conflict to be cleared, and then re-entered into the memory control priority in an attempt to execute the command in its entirety.

Case D

The search of the L2 cache directory results in an L2 cache hit and the cache line is unmodified. The L2 cache entry is marked invalid. L2 control transfers the absolute address and L2 cache set to address/key. The L2 cache line status and cache set are transferred to L2 cache control, the cache set modifier is transferred to L2 cache, and the L2 cache line status is transferred to memory control. A processor inpage freeze register is set for the L3 line containing the test and set byte as an inpage sequence to L1 and L2 cache will follow the initial L2 directory search. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. The invalidate and flush for test and set command is not affected by the request for local-invalidation or cross-invalidation as L1 guarantees the granting of the required address interface in a fixed rumber of cycles. Address/key receives the absolute address from L2 control, converts it to a physical address, and holds it in the storage command and inpage address buffers. The L2 cache set is retained with the storage command address buffers. L2 cache control receives Load outpage buffer if modified and not locked from L2 control and prepares for an L2 cache line read. L2 cache control, upon receipt of the L2 cache line status, not modified and not locked, prepares for an L2 cache inpage. BSU control initiates the inpage for test and set command as a result of the L2 cache line status, not modified and not locked. Memory control receives the L2 cache line status, not modified and not locked, and recognizes that BSU control is starting the full L3 line fetch access, with conditional modification of the storage location lock-byte, for the inpage to L1 and L2 cache. Memory control requests invalidation of the appropriate entry in the L2 mini directory using the storage command address buffers associated with this processor in address/key. Memory control transfers a command to L2 control to set L2 status for pending inpage, marking the incoming line modified regardless of whether the contents are actually changed by the test and set operation.

Case E

The search of the L2 cache directory results in an L2 cache hit and the cache line is modified. The L2 cache line is subsequently marked invalid as its contents are being transferred to L3 processor storage. L2 control transfers the absolute address and L2 cache set to address/key. The L2 cache line status and cache set are transferred to L2 cache control, the cache set modifier is transferred to L2 cache, and the L2 cache line status is transferred to memory control. A processor inpage freeze register is set for the L3 line containing the test and set byte as an inpage sequence to L1 and L2 cache will follow the initial L2 directory search. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. The invalidate and flush for test and set command is not affected by the request for local-invalidation or cross-invalidation as L1 guarantees the granting of the required address interface in a fixed number of cycles. Address/key receives the absolute address from L2 control, converts it to a physical address, and holds it in the storage command and inpage address buffers. The L2 cache set is retained with the storage command address buffers. L2 cache control receives load outpage buffer if modified and not locked from L2 control and prepares for an L2 cache line read. Upon receipt of the status from L2 control, L2 cache control instructs L2 cache to read a full line from the specified L2 cache congruence and set to the outpage buffer designated by L2 control. Memory control receives the L2 cache line status, modified and not locked, and requests invalidation of the appropriate entry in the L2 mini directory using the storage command address buffers associated with this processor in address/key. The status, L2 cache hit and modified, causes BSU control to start the castout. BSU control starts the castout sequence by transferring a full line write command and address to the selected memory port through the L2 cache data flow. Data are transferred from the outpage buffer to memory 16 bytes at a time. After the last quadword transfer to memory, BSU control transfers end-of-operation to memory control. Memory control, upon receipt of end-of-operation from BSU control, starts a full L3 line fetch access, with conditional modification of the storage location lock-byte, for the inpage to L1 and L2 cache. Memory control transfers a command to L2 control to set L2 status for pending inpage, marking the incoming line modified regardless of whether the contents are actually changed by the test and set operation. Memory control sends a command to BSU control to fetch 128 bytes for test and set from the L3 memory port to the specified inpage buffer and requests that address/key send the L3 physical address to BSU control. BSU control receives the command from memory control and physical address from address/key and starts the inpage for test and set.

Cases B,D,E

BSU control initiates the L3 memory port 128-byte fetch by transferring the command and address to processor storage and selecting the memory cards in the desired port. Data are transferred 16 bytes at a time across a multiplexed command/address and data interface with the L3 memory port. Eight transfers from L3 memory are required to obtain the 128-byte L2 cache line. The sequence of quadword transfers starts with the quadword containing the double-word requested by the processor. Upon receipt of the first quadword, L2 data flow inspects the storage location lock-byte and conditionally updates the byte of data using the lock-byte retained in the alternate data buffer. The next three transfers contain the remainder of the L1 cache line. The final four transfers contain the remainder of the L2 cache line. The data desired by the processor are transferred to L1 cache as they are received in the L2 cache, conditionally modified, and loaded into an L2 cache inpage buffer. While the processing is restarted, the L1 cache inpage operation completes with the loading of the cache followed by the update of the L1 cache directory. While the last data transfer completes to the L2 cache inpage buffer BSU control raises the appropriate processor inpage complete to L2 control. During the data transfers to L2 cache, address/key monitors the L3 uncorrectable error lines. Should an uncorrectable error be detected during the inpage process several functions are performed. With each double-word transfer to the L1 cache, an L3 uncorrectable error signal is transferred simultaneously to identify the status of the data. The status of the remaining quadwords in the containing L2 cache line is also reported to the requesting processor. At most, the processor receives one storage uncorrectable error indication for a given inpage request, the first one detected by address/key. The double-word address of the first storage uncorrectable error detected by address/key is recorded for the requesting processor. Should an uncorrectable storage error occur for any data in the L1 line requested by the processor, an indicator is set for storage uncorrectable error handling. Finally, should an uncorrectable error occur for any data transferred to the L2 cache inpage buffer, address/key sends a signal to L2 control to prevent the completion of the inpage to L2 cache. L2 cache priority selects the inpage complete for the processor for service. L2 control transfers a write inpage buffer command and L2 cache congruence to L2 cache control and an inpage complete status reply to memory control. One of three conditions results from the L2 cache directory search.

Case 1

An L3 storage uncorrectable error was detected on inpage to the L2 cache inpage buffer. L2 control, recognizing that bad data exist in the inpage buffer, blocks the update of the L2 cache directory. The freeze register established for this L2 cache miss inpage is cleared. The L1 operand cache indicator for this processor is set for storage uncorrectable error reporting. No information is transferred to address/key. The L2 cache line status normally transferred to L2 cache control and memory control is forced to locked and not modified. The selected L2 cache set is transferred to L2 cache control and the cache set modifier is transferred to L2 cache. The L1 status arrays are not altered. L2 cache control receives the write inpage buffer command and prepares for an L2 line write to complete the L2 cache inpage, pending status from L2 control. L2 cache control receives the L2 cache set and line status, locked and not modified, and resets the controls associated with the L2 cache inpage buffer associated with this write inpage buffer command. The L2 cache update is canceled and BSU control transfers end-of-operation to memory control. Memory control receives the L2 cache line status, locked and not modified, and releases the resources held by the processor inpage request. The L2 mini directory is not updated.

Case 2

L2 control selects an L2 cache line for replacement. In this case, the status of the replaced line reveals that it is unmodified; no castout is required. The L2 directory is updated to reflect the presence of the new L2 cache line. The freeze register established for this L2 cache miss inpage is cleared. The selected L2 cache set is transferred to address/key and L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 operand cache is updated to reflect the presence of the L1 line in L1 cache. The L1 cache congruence is used to address the L1 status arrays and the L2 cache set and high-order congruence are used as the data placed into the entry selected by the L1 cache set transferred with the processor test and set storage command. L2 cache control receives the write inpage buffer command and prepares for an L2 line write to complete the L2 cache inpage, pending status from L2 control. L2 cache control receives the L2 cache set and replaced line status. As the replaced line is unmodified, L2 cache control signals L2 cache that the inpage buffer is to be written to L2 cache. As this is a full line write and the cache sets are interleaved, the L2 cache set must be used to manipulate address bits 25 and 26 to permit the L2 cache line write. BSU control transfers end-of-operation to memory control. Address/key receives the L2 cache set from L2 control. The L2 mini directory update address register is set from the inpage address buffers and the L2 cache set received from L2 control. Memory control receives the status of the replaced line. As no castout is required, memory control releases the resources held by the inpage request. Memory control transfers a command to address/key to update the L2 mini directory using the L2 mini directory update address register associated with this processor. Memory control then marks the current operation completed and allows the requesting processor to enter memory resource priority again.

Case 3

L2 control selects an L2 cache line for replacement. In this case, the status of the replaced line reveals that it is modified; an L2 cache castout is required. The L2 directory is updated to reflect the presence of the new L2 cache line. The freeze register established for this L2 cache miss inpage is cleared. The address read from the directory, along with the selected L2 cache set, are transferred to address/key. The selected L2 cache set is transferred to L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 operand cache is updated to reflect the presence of the L1 line in L1 cache. The L1 cache congruence is used to address the L1 status arrays and the L2 cache set and high-order congruence are used as the data placed into the entry selected by the L1 cache set transferred with the processor test and set storage command. L2 cache control receives the write inpage buffer command and prepares for an L2 line write to complete the L2 cache inpage, pending status from L2 control. L2 cache control receives the L2 cache set and replaced line status. As the replaced line is modified, L2 cache control signals L2 cache that a full line read is required to the outpage buffer paired with the inpage buffer prior to writing the inpage buffer data to L2 cache. As these are full line accesses and the cache sets are interleaved, the L2 cache set must be used to manipulate address bits 25 and 26 to permit the L2 cache line accesses. Address/key receives the outpage address from L2 control, converts it to a physical address, and holds it in the outpage address buffers along with the L2 cache set. The L2 mini directory update address register is set from the inpage address buffers and the L2 cache set received from L2 control. Address/key transfers the outpage physical address to BSU control in preparation for the L3 line write. Memory control receives the status of the replaced line. As a castout is required, memory control cannot release the L3 resources until the memory update has completed. Castouts are guaranteed to occur to the same memory port used for the inpage. Memory control transfers a command to address/key to update the L2 mini directory using the L2 mini directory update address register associated with this processor. Memory control then marks the current operation completed and allows the requesting processor to enter memory resource priority again. BSU control, recognizing that the replaced L2 cache line is modified, starts the castout sequence after receiving the outpage address from address/key by transferring a full line write command and address to the selected memory port through the L2 cache data flow. Data are transferred from the outpage buffer to memory 16 bytes at a time. After the last quadword transfer to memory, BSU control transfers end-of-operation to memory control. Memory control, upon receipt of end-of-operation from BSU control, releases the L3 port to permit overlapped access to the memory port.

2.4.17 Transfer Memory Buffer to L3 Line

Application: S/370 PGIN (Page In) instruction—for use in the PGIN instruction, the store queue of the requesting processor must be empty prior to issuing this command to guarantee that all stores for previously executed instructions are complete. This is a part of the serialization and checkpoint-synchronizing operation required at the start of the instruction by the S/370 architecture. The command is used in conjunction with the transfer L4 line to memory buffer command to complete the data move from extended storage to processor storage. As each command-pair moves 128 bytes, a 32 iteration loop is established in microcode to handle the 4KB page. The command is synchronized within the processor to ensure the activation of the storage command prior to commencing storage activity within the requesting processor. The storage system guarantees proper overlap of the operational storage command-pairs utilizing the memory buffer. Microcode must ensure that if a particular processor within the configuration is quiescent, it is left in a state where it does not possess any lock, line-holds, or inpage freeze with storage uncorrectable error indication. Failure to do so may result in a lock-out condition as the transfer memory buffer to L3 line storage command cannot complete when a quiescent processor possesses a lock, line-hold, or inpage freeze with storage uncorrectable error indication on the requested L2 cache line.

Storage Command Description

This command represents the second half of an operational storage command-pair. The command utilizes a previously allocated memory buffer for the processor as the source of the 128 bytes of data to be moved into the specified L3 processor storage line and releases it upon completion of this operation. For PGIN, transfer L4 line to memory buffer is the first storage command. The implementation outlined does not guarantee that another processor or channels cannot access the L3 line to be loaded in the interval between when the processor issues the first storage command and memory control activates this storage command to transfer the allocated memory buffer contents to L3 for the PGIN instruction. This is deemed a minimum exposure given that the operating system is in the process of paging in this 4KB page for the PGIN instruction and there should be no concurrent references to the allocated 4KB page-frame.

Storage Command Execution

Microcode issues the command and an absolute address, on a 128-byte boundary in L3 processor storage, to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. Memory control transfers a command to L2 control to invalidate the L2 cache line and requests that address/key transfer the absolute address to L2 control, the physical address to BSU control, and update the reference and change bits of the containing 4KB page. Memory control transfers a command to BSU control. This command, transfer memory buffer to L3 line, is conditionally executed by BSU control based on the L2 cache line status subsequently transferred by L2 control with the perform memory control access if not locked command. Address/key uses the storage command address buffer to initiate an update of the storage key array. The reference and change bits of the specified 4KB page are set to '1'b. BSU control receives the command from memory control and waits for status from L2 control. L2 control receives the memory control command and, after selection by the L2 cache service priority, uses the address/key address to search the L2 cache directory. A perform memory control access if not locked command is transferred to L2 cache control to be forwarded to BSU control and command reply is transferred to memory control. One of three conditions results from the L2 directory search.

Case 1

An L2 cache miss results from the directory search. No information is transferred to address/key. The L2 cache line status and cache set are transferred to L2 cache control, the cache set modifier is transferred to L2 cache, and the L2 cache line status is transferred to memory control. The L1 status array compares are blocked due to the L2 cache miss. Memory control receives the L2 cache line status, L2 cache miss and not locked; no L2 mini directory update is required. End-of-operation is transferred to the requesting processor. BSU control receives perform memory control access if not locked from L2 control and the physical address from address/key and prepares for the L3 line write. Upon receipt of the status from L2 control, not locked, BSU control initiates the L3 line write by transferring the command and address through the L2 data flow to the required memory port. BSU control then specifies that the memory buffer contents be transferred from the storage channel data buffer function to the proper L3 interface register for transfer to L3 memory. End-of-operation is transferred to memory control from BSU control after the final data transfer to memory. Memory control, upon receipt of end-of-operation from BSU control, releases the L3 port to permit overlapped access to the memory port and the memory buffer resource lock.

Case 2

A lock, line-hold, or inpage freeze with storage uncorrectable error indication is active to the addressed L2 cache line. No information is transferred to address/key. The L2 cache line status and cache set are transferred to L2 cache control, the cache set modifier is transferred to L2 cache, and the L2 cache line status is transferred to memory control. The L1 status array compares are blocked due to the lock, line-hold, or inpage freeze with storage uncorrectable error conflict. Memory control receives the L2 cache line status, locked, and aborts the current execution of the command. The storage command is temporarily suspended, allowing time for the lock conflict to be cleared, and then re-entered into the memory control priority in an attempt to execute the command in its entirety. BSU control receives perform memory control access if not locked from L2 control and the physical address from address/key and prepares for the L3 line write. Upon receipt of the status from L2 control, locked, BSU control drops the command.

Case 3

An L2 cache hit results from the directory search and the cache line is either modified or unmodified. The L2 cache entry is marked invalid. L2 control transfers the absolute address to address/key along with the L2 cache set. The L2 cache line status and cache set are transferred to L2 cache control, the cache set modifier is transferred to L2 cache, and the L2 cache line status is transferred to memory control. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate LI/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. The invalidate L2 cache line command is not affected by the request for local-invalidation or cross-invalidation as L1 guarantees the granting of the required address interface in a fixed number of cycles. Address/key receives the absolute address from L2 control, converts it to a physical address, and holds it in the storage command address buffers along with the L2 cache set. Memory control receives the L2 cache line status, L2 hit and not locked, and requests invalidation of the appropriate entry in the L2 mini directory using the storage command address buffers associated with this processor in address/key. End-of-operation is transferred to the requesting processor. BSU control receives perform memory control access if not locked from L2 control and the physical address from address/key and prepares for the L3 line write. Upon receipt of the status from L2 control, not locked, BSU control initiates the L3 line write by transferring the command and address through the L2 data flow to the required memory port. BSU control then specifies that the memory buffer contents be transferred from the storage channel data buffer function to the proper L3 interface register for transfer to L3 memory. End-of-operation is transferred to memory control from BSU control after the final data transfer to memory. Memory control, upon receipt of end-of-operation from BSU control, releases the L3 port to permit overlapped access to the memory port and the memory buffer resource lock.

2.4.18 Write Memory Check-bit, Redundant-bit, and Special Function Registers Application Application: diagnostic testing of processor storage and extended storage. The command is used in conjunction with processor storage store requests to complete the loading of selected memory internal registers. The command is synchronized within the processor to ensure the completion of the storage command prior to commencing storage activity within the requesting processor. Microcode must ensure that if a particular processor within the configuration is quiescent, it is left in a state where it does not possess any lock, line-holds, or inpage freeze with storage uncorrectable error indication. Failure to do so may result in a lock-out condition as the write memory check-bit, redundant-bit, and special function registers storage command cannot complete when a quiescent processor possesses a lock, line-hold, or inpage freeze with storage uncorrectable error indication on the requested L2 cache line.

Storage Command Description

Microcode supplies the command and an absolute address on a 128-byte boundary in L3 processor storage. This storage command represents the second half of an operational command-pair. The command uses a previously loaded L2 cache line as the source of the data to be transferred to the selected memory port. All four control chips within the memory cards of the selected memory port participate in the write operation, accepting a unique value for their check-bit registers, redundant-bit registers, and special function registers from the storage data buss in preset positions. Each chip contains two four-byte error checking and correction networks, each of which maintains a seven-bit check-bit register and a single-bit redundant-bit register. Each control chip also maintains a special function register. The first commands of the operational command-pair are the processor storage stores which load the L2 cache line. All data are stored in the proper bit positions in quadword 0 of the L2 cache line. The memory port accepts one data transfer with this storage command. The contents of the memory arrays in the selected port are unaffected by the execution of this storage command.

Storage Command Execution

Microcode issues the command and an absolute address, on a 128-byte boundary in L3 processor storage, to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command to reset modified status and flush the L2 cache line is transferred to L2 control and address/key is instructed to transfer the absolute address to L2 control and the physical address to BSU control. Memory control transfers a command to BSU control. This command, write memory check-bit, redundant-bit, and special function registers if modified and not locked, is conditionally executed by BSU control based on the L2 cache line status subsequently transferred by L2 control with the load outpage buffer if modified and not locked command. .sk 1 BSU control receives the command from memory control and waits for status from L2 control. L2 control receives the memory control command and, after selection by the L2 cache service priority, uses the absolute address from address/key to search the L2 cache directory. A load outpage buffer if modified and not locked command is transferred to L2 cache control and command reply is transferred to memory control. One of four conditions results from the L2 cache directory search.

Case 1

The search of the L2 cache directory results in an L2 cache miss. No information is transferred to address/key. The L2 cache line status and cache set are transferred to L2 cache control, the cache set modifier is transferred to L2 cache, and the L2 cache line status is transferred to memory control. Not modified status is forced due to the L2 cache miss. The L1 status array compares are blocked due to the reset modified status and flush L2 line command. L2 cache control receives load outpage buffer if modified and not locked from L2 control and prepares for an L2 cache line read. L2 cache control and BSU control, upon receipt of the L2 cache line status, not modified and not locked, drop the command. Memory control receives the L2 cache line status, L2 miss and not locked, and completes the command by transferring end-of-operation to the requesting processor.

Case 2

A lock, line-hold, or inpage freeze with storage uncorrectable error indication is active to the selected L2 cache line. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. L2 cache control and BSU control drop the command upon receipt of the L2 cache line status, locked. Memory control receives the L2 cache line status, locked, and aborts the current execution of the command. The storage command is temporarily suspended, allowing time for the lock conflict to be cleared, and then re-entered into the memory control priority in an attempt to execute the command in its entirety.

Case 3

The search of the L2 cache directory results in an L2 cache hit and the cache line is unmodified. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. L2 cache control and BSU control, upon receipt of the L2 cache line status, not modified and not locked, drop the command. Memory control receives the L2 cache line status, not modified and not locked, and completes the command by transferring end-of-operation to the requesting processor.

Case 4

The search of the L2 cache directory results in an L2 cache hit and the cache line is modified. The L2 cache line is subsequently marked unmodified. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. Upon receipt of the status from L2 control, L2 cache control instructs L2 cache to read a full line from the specified L2 cache congruence and set to the outpage buffer designated by L2 control. Memory control receives the L2 cache line status and recognizes that the diagnostic store to processor storage is in progress. The status, modified and not locked, causes BSU control to start the diagnostic memory store by transferring the command and physical address through L2 data flow to the specified memory port. Only quadword 0 is transferred from the outpage buffer to the selected memory port. After the data transfer to memory, BSU control transfers end-of-operation to memory control. The selected memory card-pair performs the requested diagnostic write, loading the check-bit, redundant-bit, and special function registers from the proper positions on the storage data buss, and drop their combined busy indication to memory control. Memory control, upon receipt of not busy from the selected memory card-pair, releases the memory port and transfers end-of-operation to the requesting processor.

2.4.19 Write Memory Redundant-bit Address Registers

Application: Diagnostic testing of processor storage and extended storage. The command is used in conjunction with processor storage store requests to complete the loading of selected memory internal registers. The command is synchronized within the processor to ensure the completion of the storage command prior to commencing storage activity within the requesting processor. Microcode must ensure that if a particular processor within the configuration is quiescent, it is left in a state where it does not possess any lock, line-holds, or inpage freeze with storage uncorrectable error indication. Failure to do so may result in a lock-out condition as the write memory redundant-bit address registers storage command cannot complete when a quiescent processor possesses a lock, line-hold, or inpage freeze with storage uncorrectable error indication on the requested L2 cache line.

Storage Command Description

Microcode supplies the command and an absolute address on a 128-byte boundary in L3 processor storage. This storage command represents the second half of an operational command-pair. The command uses a previously loaded L2 cache line as the source of the data to be transferred to the selected memory port. All four control chips within the memory cards of the selected memory port participate in the write operation, accepting a unique value for their redundant-bit address registers from the storage data buss in preset positions. Each chip contains two four-byte error checking and correction networks, each of which maintains two six-bit redundant-bit address registers. The first commands of the operational command-pair are the processor storage stores which load the L2 cache line. All data are stored in the proper bit positions in quadword 0 of the L2 cache line. The memory port accepts one data transfer with this storage command. The contents of the memory arrays in the selected port are unaffected by the execution of this storage command.

Storage Command Execution

Microcode issues the command and an absolute address, on a 128-byte boundary in L3 processor storage, to L1. L1 transfers the absolute address and a pass address storage command to L2 control and the actual storage command to memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources and activates the storage command when selected by priority. The command to reset modified status and flush the L2 cache line is transferred to L2 control and address/key is instructed to transfer the absolute address to L2 control and the physical address to BSU control. Memory control transfers a command to BSU control. This command, write memory redundant-bit address registers if modified and not locked, is conditionally executed by BSU control based on the L2 cache line status subsequently transferred by L2 control with the load outpage buffer if modified and not locked command. BSU control receives the command from memory control and waits for status from L2 control. L2 control receives the memory control command and, after selection by the L2 cache service priority, uses the absolute address from address/key to search the L2 cache directory. A load outpage buffer if modified and not locked command is transferred to L2 cache control and command reply is transferred to memory control. One of four conditions results from the L2 cache directory search.

Case 1

The search of the L2 cache directory results in an L2 cache miss. No information is transferred to address/key. The L2 cache line status and cache set are transferred to L2 cache control, the cache set modifier is transferred to L2 cache, and the L2 cache line status is transferred to memory control. Not modified status is forced due to the L2 cache miss. The L1 status array compares are blocked due to the reset modified status and flush L2 line command. L2 cache control receives load outpage buffer if modified and not locked from L2 control and prepares for an L2 cache line read. L2 cache control and BSU control, upon receipt of the L2 cache line status, not modified and not locked, drop the command. Memory control receives the L2 cache line status, L2 miss and not locked, and completes the command by transferring end-of-operation to the requesting processor.

Case 2

A lock, line-hold, or inpage freeze with storage uncorrectable error indication is active to the selected L2 cache line. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. L2 cache control and BSU control drop the command upon receipt of the L2 cache line status, locked. Memory control receives the L2 cache line status, locked, and aborts the current execution of the command. The storage command is temporarily suspended, allowing time for the lock conflict to be cleared, and then re-entered into the memory control priority in an attempt to execute the command in its entirety.

Case 3

The search of the L2 cache directory results in an L2 cache hit and the cache line is unmodified. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. L2 cache control and BSU control, upon receipt of the L2 cache line status, not modified and not locked, drop the command. Memory control receives the L2 cache line status, not modified and not locked, and completes the command by transferring end-of-operation to the requesting processor.

Case 4

The search of the L2 cache directory results in an L2 cache hit and the cache line is modified. The L2 cache line is subsequently marked unmodified. No information is transferred to address/key. The L2 cache line status and cache set are transferred to L2 cache control, the cache set modifier is transferred to L2 cache, and the L2 cache line status is transferred to memory control. The L1 status array compares are blocked due to the reset modified status and flush L2 line command. L2 cache control receives load outpage buffer if modified and not locked from L2 control and prepares for an L2 cache line read. Upon receipt of the status from L2 control, L2 cache control instructs L2 cache to read a full line from the specified L2 cache congruence and set to the outpage buffer designated by L2 control. Memory control receives the L2 cache line status and recognizes that the diagnostic store to processor storage is in progress. The status, modified and not locked, causes BSU control to start the diagnostic memory store by transferring the command and physical address through L2 data flow to the specified memory port. Only quadword 0 is transferred from the outpage buffer to the selected memory port. After the data transfer to memory, BSU control transfers end-of-operation to memory control. The selected memory card-pair performs the requested diagnostic write, loading the redundant-bit address registers from the proper positions on the storage data buss, and drop their combined busy indication to memory control. Memory control, upon receipt of not busy from the selected memory card-pair, releases the memory port and transfers end-of-operation to the requesting processor.

2.5 Processor Storage Key Commands 2.5.1 Fetch Storage Key

Application: dynamic address translation TLB loading. The command is synchronized within the processor to ensure completion of the storage key command prior to commencing storage activity within the requesting processor.

Storage Key Command Description

To support key-controlled protection, the TLB maintains part of the storage key, the access-control bits and fetch-protection bit, which is checked for protection violations as part of the processor storage requests in the L1 cache. This command is used during address translation to fetch these fields within the storage key for subsequent loading into the TLB.

Storage Key Command Execution

The address translation hardware generates the command and absolute address to transfer to L1. Only address bits 1:19, generated within the address translator, are significant as an absolute address. L1 checks for any addressing exception, address check boundary exceeded. If no addressing exception exists, the command and absolute address bits 4:19 are transferred to L2 control. No data are transferred on the data buss. L2 control receives the primary command, storage command, and absolute address, followed by the fetch storage key command. After selection by the L2 cache service priority, the fetch storage key command and the absolute address are transferred directly to address/key. No information is transferred to either L2 cache control or memory control. Address/key receives the command and absolute address from L2 control and holds it in the f etch storage key address buffer for this processor. If the storage key array access buffer is available, the command is started immediately by placing the absolute address into this buffer and initiating the storage key array access. The entire storage key is read from the array and the access-control bits and fetch-protection bit are placed in the appropriate key buss bit positions of the L1 storage control interface for the requesting processor. The reference and change bits on the buss are forced to '0'b and the key valid bit is set active. L2 cache control does not receive a command from L2 control as this is not a processor L2 cache storage request. Memory control does not receive a command from L2 control as this storage key command is handled entirely without its intervention. The requesting processor interprets the setting of the processor key valid bit as an end-of-operation for this storage key command.

2.5.2 Insert Storage Key

Applications: Support S/370 ISK (Insert Storage Key) and 370-XA ISKE (Insert Storage Key Extended) instructions. The command is synchronized within the processor to ensure completion of the storage key command prior to commencing storage activity within the requesting processor.

Storage Key Command Description

Microcode supplies a real address to access the storage key and processor reference/change bits (R/C) arrays. Only address bits 1:19 are significant. A storage key array exists for maintaining the full storage key and an overlapped-access two-port R/C array exists for maintaining the reference and change bits associated with processor implicit updates. Requests for the full storage key require accessing all copies of the reference and change bits and logically orting them together to get accurate information.

Storage Key Command Execution

Microcode issues the command and a real address to L1. L1 translates the real address to an absolute address. If no addressing exception exists for the real address, the storage key command and absolute address bits 4:19 are transferred to L2 control and memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage key command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources by entering the command into the storage key array priority circuitry. When memory control has no previous storage key command active for the storage key array it transfers this command to address/key. Address/key receives the command and places the command and selected address into the storage key array access buffer. The R/C array is an overlapped-access two-port array. When updates due to processor storage requests are not utilizing both ports, the storage key command is activated. One set of R/C bits is read from the first available port; no change to the current state of the R/C bits occurs. In parallel with the first R/C array access the storage key array is read for the 4KB page; no change to the current state takes place. Address/key responds with end-of-operation to memory control at this time to permit the maximum allowable overlap. Then the other R/C array port is read for the reference and change bits; no change to the current state occurs. All copies of the reference and change bits from both processor R/C array ports and the storage key array are logically or'ed together and sent to the requesting processor in the appropriate key buss bit positions of the L1 storage control interface along with the access-control and fetch-protection bits read from the storage key array. The key valid bit is set active. The requesting processor interprets the setting of the processor key valid bit as an end-of-operation for this storage key command.

2.5.3 Reset Reference Bit

Applications: Support S/370 RRB (Reset Reference Bit) and 370-XA RRBE (Reset Reference Bit Extended) instructions. The command is synchronized within the processor to ensure completion of the storage key command prior to commencing storage activity within the requesting processor.

Storage Key Command Description

Microcode supplies a real address to access the storage key and processor reference/change bits (R/C) arrays. Only address bits 1:19 are significant. A storage key array exists for maintaining the full storage key and an overlapped-access two-port R/C array exists for maintaining the reference and change bits associated with processor implicit updates. Requests for the reference and change bits require accessing all copies of the reference and change bits and logically sorting them together to get accurate information. The reference and change bits are used by microcode to determine the condition code for the applications. All copies of the reference bit specified by the absolute address are reset to '0'b as part of the command execution.

Storage Key Command Execution

Microcode issues the command and a real address to L1. L1 translates the real address to an absolute address. If no addressing exception exists for the real address, the storage key command and absolute address bits 4:19 are transferred to L2 control and memory control. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Memory control receives the actual storage key command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources by entering the command into the storage key array priority circuitry. When memory control has no previous storage key command active for the storage key array it transfers this command to address/key. Address/key receives the command and places the command and selected address into the storage key array access buffer. The R/C array is an overlapped-access two-port array. When updates due to processor storage requests are not utilizing both ports, the storage key command is activated. One set of R/C bits is read from the first available port, and then the reference bit of the 4KB page in that port is reset to '0'b. In parallel with the first R/C array access and update the storage key array is read for the 4KB page and its reference bit is reset to '0'b. Address/key responds with end-of-operation to memory control at this time to permit the maximum allowable overlap. Then the other R/C array port is read for the reference and change bits and the reference bit of the 4KB page in that port is reset to '0'b. All copies of the reference and change bits read from both processor R/C array ports and the storage key array are logically or'ed together and sent to the requesting processor in the appropriate key buss bit positions of the L1 storage control interface. All other data bits in the key bus bit positions are forced to '0'b and the key valid bit is set active. The requesting processor interprets the setting of the processor key valid bit as an end-of-operation for this storage key command.

2.5.4 Set Storage Key

Applications: Support S/370 SSK (Set Storage Key) and 370-XA SSKE (Set Storage Key Extended) instructions. Microcode must ensure that the store queue for the requesting processor is empty prior to issuing this storage key command. This is a part of the serialization and checkpoint-synchronizing operation required at the start of the instructions by the S/370 architecture. The command is synchronized within the processor to ensure completion of the storage key command prior to commencing storage activity within the requesting processor.

Storage Key Command Description

Microcode supplies a real address to access the storage key and processor reference/change bits (R/C) arrays only address bits 1:19 are significant. A storage key array exists for maintaining the full storage key and an overlapped-access two-port R/C array exists for maintaining the reference and change bits associated with processor implicit updates. Requests to set the storage key require resetting all copies of the reference and change bits in the R/C array to '0'b and inserting the new storage key value in the storage key array.

Storage Key Command Execution

Microcode issues the command and a real address to L1 along with a seven-bit key value inserted into the low-order portion of the address supplied. L1 translates the real address to an absolute address. If no addressing exception exists for the real address, the storage key command and absolute address bits 4:19 are transferred to L2 control and memory control, and the seven-bit storage key is transferred to address/key with the key valid bit set active. No data are transferred on the data buss. L2 control receives the primary command, storage command, and absolute address, followed by the pass address command. L2 control transfers command valid to memory control and address/key. After selection by the L2 cache service priority, the command is transferred to memory control and the address to address/key. Address/key, recognizing the change in the key valid bit status, latches the processor key buss data in preparation for the storage key command. Memory control receives the actual storage key command and waits for a signal from L2 control that the address has been processed before entering the command into priority. Address/key receives the absolute address from L2 control, converts it to a physical address, and holds it in the storage command address buffers. L2 cache control does not receive a command from L2 control as it is not a processor L2 cache storage request. Memory control receives the command signifying that the address has been sent to address/key and the memory port id from L2 control. Memory control allocates the necessary resources by entering the command into the storage key array priority circuitry. When memory control has no previous storage key command active for the storage key array it transfers this command to address/key. Address/key receives the command and places the command and selected address into the storage key array access buffer. The R/C array is a two-port array. When updates due to processor storage requests are not utilizing both ports, the storage key command is activated. One set of R/C bits is read from the first available port, and then the reference and change bits of the 4KB page in that port are reset to '0'b. In parallel with the first R/C array access and update the storage key array is read for the 4KB page and the new seven-bit key value from the processor key register is stored into the storage key array. Address/key responds with end-of-operation to memory control at this time to permit the maximum allowable overlap. Then the other R/C array port is read for the reference and change bits and they are reset to '0'b. The key valid bit is set active. The requesting processor interprets the setting of the processor key valid bit as an end-of-operation for this storage key command. The valid bit is set late in the operation to guarantee that any related machine checks can be associated with this S/370 instruction checkpoint.

3.0 Storage Routines 3.1 Channel Storage Fetch Routines 3.1.1 Storage Fetch, 1:8 Quadwords, No Access Exceptions, L2M Directory Hit/L2 Cache Hit The shared channel processor issues a channel storage fetch request to the storage system through a multiple cycle transfer of command and address to address/key. The four cycles of command/address transfer occur at the channel clock rate. The first transfer contains the shared channel processor buffer identification, an L3 storage fetch request, and an indication of whether storage address-check boundary (ACB) and storage key checking are required. The second transfer contains the low-order absolute address bits, 16:31. The following transfer contains the high-order absolute address bits, 0:15, with 4:15 significant to L3 processor storage. The final transfer contains the channel storage key, the address-limit check control, a storage key and ACB check override, and a seven-bit storage field length. Address/key receives the channel storage request at the channel clock rate. Following the last transfer, a channel storage request pending latch is set at the channel clock rate and the channel request is converted to processor clocks. When metastability has been removed, the SHCP buffer id, channel storage request, and memory port id are transferred to memory control. Address/key converts the absolute address to a physical address through memory mapping and calculates the stop address, or ending field address, for the storage field length indicated. Memory control receives the storage channel data buffer id, storage request, partial/full L3 line indication, and memory port id, and the request separately enters priority for the L2 cache mini directory and the storage key array. If no request is currently active to the L2 mini directory, then this channel storage request, once selected by priority, causes a command to be transferred to the L2 mini directory to check for the presence of the line in L2 cache. Address/key is instructed to transfer the appropriate address to the L2 mini directory. If no request is currently active to the storage key array, then this channel storage request, once selected by priority, causes a command to be transferred to address/key to perform the address and protection checks associated with the channel storage request in the address/key SHCP command buffer. Address/key, upon receipt of the memory control SHCP commands, uses the appropriate SHCP command buffer to determine what addressing and protection checks should be applied and transfers the selected storage address to the L2 mini directory. Address/key end-of-operation is returned to memory control when the SHCP command obtains access to the storage key array. The appropriate addressing and protection checks are performed and the reference bit of the 4KB page containing the requested L3 line is set to '1'b as a result of the channel fetch request, provided no access exceptions occur. The results of the addressing and protection checks are returned to memory control. The L2 cache mini directory, upon receipt of the memory control command and address/key address, is set-associatively searched and yields an L2 cache hit. The L2 status is returned to memory control. Memory control, upon receipt of the L2 mini directory status and address/key status, enters the channel request into memory priority, provided no access exceptions exist. In this case an L2 hit is indicated by the L2 cache mini directory search. However, as the L2 mini directory may falsely indicate the existence of a line in L2 cache, the required memory port must be allocated. Memory control allocates the necessary resources and activates the request when selected by priority. A command is transferred to L2 control to perform a channel L2 cache fetch. Address/key is instructed to transfer the selected SHCP command buffer address to L2 control and BSU control. A command is sent to BSU control to perform a channel L2 cache fetch to the selected storage channel data buffer. Address/key transfers the selected absolute address to L2 control and the L3 physical address to BSU control in case of an L2 cache miss. The stop and start addresses for the channel fetch are also transferred to BSU control to control the loading of the storage channel data buffer if L2 cache miss. BSU control receives the channel L2 fetch command from memory control and the required addresses from address/key and holds them for the current storage operation. BSU control transfers the command, stop address, and start address to SCDB control and waits for L2 status to commence the data transfers. L2 control receives the memory control command and, after selection by the L2 cache service priority, uses the address/key address to search the L2 cache directory. The processor inpage freeze registers and line-hold registers with active storage uncorrectable error indications are compared for a match with the channel L2 fetch line address. Should a match occur, L2 miss status is forced to make the channel request access L3 storage. A channel L2 fetch command is transferred to BSU control and command reply is transferred to memory control. An L2 cache hit results from the directory search. No information is transferred to address/key. The L2 cache line status is subsequently transferred to BSU control and memory control. SCDB control receives the channel L2 fetch command, storage channel data buffer identification, stop and start addresses, and waits for the data from the L2 cache data flow function. Memory control receives the L2 cache line status, L2 cache hit, and releases the memory port associated with the channel request. End-of-operation for the channel request is transferred to address/key. Prior to knowledge of the L2 cache status, the command and address are transferred to BSU control to start the access to L2 cache. The read cycles in L2 cache are taken and the L2 hit status initiates the transfers to the storage channel data buffer. The six L2 cache sets are read simultaneously, yielding 32 bytes in each of four read cycles. The desired 128 bytes are latched in subsequent cycles for transfer to the selected storage channel data buffer. Data are transferred to the storage channel data buffer 32 bytes at a time, from the leftmost 32 bytes to the rightmost 32 bytes within the 128-byte L2 cache line. Note that the full L2 cache line is transferred to the storage channel data buffer for a channel storage fetch request which finds the data in L2 cache, regardless of the field length. Address/key, upon receipt of end-of-operation from memory control, converts the indication to the channel clock rate and responds with SHCP request complete with clean status to the shared channel processor. SCDB control receives the L2 cache data, 32 bytes per cycle, and gates the data into the selected storage channel data buffer at the processor clock rate.

3.1.2 Storage Fetch, 1:8 Quadwords, No Access Exceptions, L2M Directory Hit/L2 Cache Miss The shared channel processor issues a channel storage fetch request to the storage system through a multiple cycle transfer of command and address to address/key. The four cycles of command/address transfer occur at the channel clock rate. The first transfer contains the shared channel processor buffer identification, an L3 storage fetch request, and an indication of whether storage address-check boundary (ACB) and storage key checking are required. The second transfer contains the low-order absolute address bits, 16:31. The following transfer contains the high-order absolute address bits, 0:15, with 4:15 significant to L3 processor storage. The final transfer contains the channel storage key, the address-limit check control, a storage key and ACB check override, and a seven-bit storage field length. Address/key receives the channel storage request at the channel clock rate. Following the last transfer, a channel storage request pending latch is set at the channel clock rate and the channel request is converted to processor clocks. When metastability has been removed, the SHCP buffer id, channel storage request, and memory port id are transferred to memory control. Address/key converts the absolute address to a physical address through memory mapping and calculates the stop address, or ending field address, for the storage field length indicated. Memory control receives the storage channel data buffer id, storage request, partial/full L3 line indication, and memory port id, and the request separately enters priority for the L2 cache mini directory and the storage key array. If no request is currently active to the L2 mini directory, then this channel storage request, once selected by priority, causes a command to be transferred to the L2 mini directory to check for the presence of the line in L2 cache. Address/key is instructed to transfer the appropriate address to the L2 mini directory. If no request is currently active to the storage key array, then this channel storage request, once selected by priority, causes a command to be transferred to address/key to perform the address and protection checks associated with the channel storage request in the address/key SHCP command buffer. Address/key, upon receipt of the memory control SHCP commands, uses the appropriate SHCP command buffer to determine what addressing and protection checks should be applied and transfers the selected storage address to the L2 mini directory. Address/key end-of-operation is returned to memory control when the SHCP command obtains access to the storage key array. The appropriate addressing and protection checks are performed and the reference bit of the 4KB page containing the requested L3 line is set to '1'b as a result of the channel fetch request, provided no access exceptions occur. The results of the addressing and protection checks are returned to memory control. The L2 cache mini directory, upon receipt of the memory control command and address/key address, is set-associatively searched and yields an L2 cache hit. The L2 status is returned to memory control. Memory control, upon receipt of the L2 mini directory status and address/key status, enters the channel request into memory priority, provided no access exceptions exist. In this case an L2 hit is indicated by the L2 cache mini directory search. However, as the L2 mini directory may falsely indicate the existence of a line in L2 cache, the required memory port must be allocated. Memory control allocates the necessary resources and activates the request when selected by priority. A command is transferred to L2 control to perform a channel L2 cache fetch. Address/key is instructed to transfer the selected SHCP command buffer address to L2 control and BSU control. A command is sent to BSU control to perform a channel L2 cache fetch to the selected storage channel data buffer. Address/key transfers the selected absolute address to L2 control and the L3 physical address to BSU control in case of an L2 cache miss. The stop and start addresses for the channel fetch are also transferred to BSU control to control the loading of the storage channel data buffer if L2 cache miss. BSU control receives the channel L2 fetch command from memory control and the required addresses from address/key and holds them for the current storage operation. BSU control transfers the command, stop address, and start address to SCDB control and waits for L2 status to commence the data transfers. L2 control receives the memory control command and, after selection by the L2 cache service priority, uses the address/key address to search the L2 cache directory. The processor inpage freeze registers and line-hold registers with active storage uncorrectable error indications are compared for a match with the channel L2 fetch line address. Should a match occur, L2 miss status is forced to make the channel request access L3 storage. A channel L2 fetch command is transferred to BSU control and command reply is transferred to memory control. An L2 cache miss results from the directory search. No information is transferred to address/key. The L2 cache line status is subsequently transferred to BSU control and memory control. SCDB control receives the channel L2 fetch command, storage channel data buffer identification, stop and start addresses, and waits for the data from the L2 cache data flow function. Memory control receives the L2 cache line status, L2 cache miss. Recognizing that BSU control must fetch the requested data from processor storage, memory control retains the memory port lock associated with the channel request. Prior to knowledge of the L2 cache status, the command and address are transferred to BSU control to start the access to L2 cache. The read cycles in L2 cache are taken, but the L2 miss status prevents any data transfer to the storage channel data buffer. BSU control initiates the L3 storage 128-byte fetch by transferring the command and address through the L2 data flow to the required memory port. BSU control transfers a new command, stop address, and start address to SCDB control due to the L2 cache miss. SCDB control receives the channel L3 fetch command, storage channel data buffer identification, stop and start addresses, and waits for the data from the L2 cache data flow function. For this sequence, SCDB control expects 16 bytes of storage data per transfer. The L3 memory performs the requested read, passing the data to the L3 interface register, and L2 data flow directs it to the storage channel data buffer function. Data are always read from the specified address, in a left to right sequence, for the number of bytes specified within the L3 line, and transferred in full quadwords to L2 data flow. While the last data transfer completes to the storage channel data buffer, BSU control transfers end-of-operation to memory control. During the data transfers to the L3 interface register, address/key monitors the uncorrectable error lines from memory. The error status is recorded for the SHCP buffer identified and forwarded to the shared channel processor at request completion. SCDB control receives the L3 storage data, 16 bytes per cycle, from L2 data flow and gates the data into the selected storage channel data buffer at the processor clock rate. Memory control, upon receipt of end-of-operation from BSU control, releases the L3 port and returns end-of-operation for the channel request to address/key. Address/key, upon receipt of end-of-operation from memory control, converts the indication to the channel clock rate and responds with SHCP request complete with clean status to the shared channel processor, provided all data fetched from L3 storage are valid.

3.1.3 Storage Fetch, 1:8 Quadwords, No Access Exceptions, L2M Directory Miss

The shared channel processor issues a channel storage fetch request to the storage system through a multiple cycle transfer of command and address to address/key. The four cycles of command/address transfer occur at the channel clock rate. The first transfer contains the shared channel processor buffer identification, an L3 storage fetch request, and an indication of whether storage address-check boundary (ACB) and storage key checking are required. The second transfer contains the low-order absolute address bits, 16:31. The following transfer contains the high-order absolute address bits, 0:15, with 4:15 significant to L3 processor storage. The final transfer contains the channel storage key, the address-limit check control, a storage key and ACB check override, and a seven-bit storage field length. Address/key receives the channel storage request at the channel clock rate. Following the last transfer, a channel storage request pending latch is set at the channel clock rate and the channel request is converted to processor clocks. When metastability has been removed, the SHCP buffer id, channel storage request, and memory port id are transferred to memory control. Address/key converts the absolute address to a physical address through memory mapping and calculates the stop address, or ending field address, for the storage field length indicated. Memory control receives the storage channel data buffer id, storage request, partial/full L3 line indication, and memory port id, and the request separately enters priority for the L2 cache mini directory and the storage key array. If no request is currently active to the L2 mini directory, then this channel storage request, once selected by priority, causes a command to be transferred to the L2 mini directory to check for the presence of the line in L2 cache. Address/key is instructed to transfer the appropriate address to the L2 mini directory. If no request is currently active to the storage key array, then this channel storage request, once selected by priority, causes a command to be transferred to address/key to perform the address and protection checks associated with the channel storage request in the address/key SHCP command buffer. Address/key, upon receipt of the memory control SHCP commands, uses the appropriate SHCP command buffer to determine what addressing and protection checks should be applied and transfers the selected storage address to the L2 mini directory. Address/key end-of-operation is returned to memory control when the SHCP command obtains access to the storage key array. The appropriate addressing and protection checks are performed and the reference bit of the 4KB page containing the requested L3 line is set to '1'b as a result of the channel fetch request, provided no access exceptions occur. The results of the addressing and protection checks are returned to memory control. The L2 cache mini directory, upon receipt of the memory control command and address/key address, is set-associatively searched and yields an L2 cache miss. The L2 status is returned to memory control. Memory control, upon receipt of the L2 mini directory status and address/key status, enters the channel request into memory priority, provided no access exceptions exist. In this case an L2 miss is indicated by the L2 cache mini directory search. This is always a true indication of the status of the L3 line at the time of the L2 mini directory search and the required memory port must be allocated. Memory control allocates the necessary resources and activates the request when selected by priority. Address/key is instructed to transfer the selected SHCP command buffer address to BSU control. A command is sent to BSU control to perform a channel L3 storage fetch to the selected storage channel data buffer. Address/key transfers the selected L3 physical address to BSU control. The stop and start addresses for the channel fetch are also transferred to BSU control to control the loading of the storage channel data buffer. BSU control receives the channel L3 fetch command from memory control and the required addresses from address/key and holds them for the current storage operation. BSU control initiates the L3 storage fetch by transferring the command and address through the L2 data flow to the required memory port. BSU control transfers the command, stop address, and start address to SCDB control. SCDB control receives the channel L3 fetch command, storage channel data buffer identification, stop and start addresses, and waits for the data from the L2 cache data flow function. For this sequence, SCDB control expects 16 bytes of storage data per transfer. The L3 memory performs the requested read, passing the data to the L3 interface register, and L2 data flow directs it to the storage channel data buffer function. Data are always read from the specified address, in a left to right sequence, for the number of bytes specified within the L3 line, and transferred in full quadwords to L2 data flow. While the last data transfer completes to the storage channel data buffer, BSU control transfers end-of-operation to memory control. During the data transfers to the L3 interface register, address/key monitors the uncorrectable error lines from memory. The error status is recorded for the SHCP buffer identified and forwarded to the shared channel processor at request completion. SCDB control receives the L3 storage data, 16 bytes per cycle, from L2 data flow and gates the data into the selected storage channel data buffer at the processor clock rate. Memory control, upon receipt of end-of-operation from BSU control, releases the L3 port and returns end-of-operation for the channel request to address/key. Address/key, upon receipt of end-of-operation from memory control, converts the indication to the channel clock rate and responds with SHCP request complete with clean status to the shared channel processor, provided all data fetched from L3 storage are valid.

3.2 Channel Storage Store Routines 3.2.1 Storage Store, 1:128 Bytes, No Access Exceptions, L2M Directory Hit/L2 Cache Hit The shared channel processor issues a channel storage store request to the storage system through a two-phase operation. The store data are first transferred to a storage channel data buffer. After successful completion of the data transfer, the command and address are transferred to address/key to start the actual storage operation. The shared channel processor starts a channel storage store request by requesting that the channel data buffer transfer the data across an 8-byte bi-directional data interface to SCDB control at the channel clock rate. The first transfer on the interface contains the storage channel data buffer identification, command, fetch or store, and a quadword address within the 128-byte buffer, absolute address bits 25:27. The data transfers follow and always occur in increments of two, representing an integral number of quadwords. SCDB control receives the command and data transfers at the channel clock rate and loads the control information into the appropriate registers and the data into the selected storage channel data.buffer at the channel clock rate. The data are loaded into the storage channel data buffer starting with the quadword identified by the quadword address. SCDB control signals successful completion to the channel data buffer by dropping transfer echo the cycle after the last data transfer. The channel data buffer then signals successful completion of the data transfer to the shared channel processor. The shared channel processor issues a channel storage store request to the storage system through a multiple cycle transfer of command and address to address/key. The four cycles of command/address transfer occur at the channel clock rate. The first transfer contains the shared channel processor buffer identification, an L3 storage store request, and an indication of whether storage address-check boundary (ACB) and storage key checking are required. The second transfer contains the low-order absolute address bits, 16:31. The following transfer contains the high-order absolute address bits, 0:15, with 4:15 significant to L3 processor storage. The final transfer contains the channel storage key, the address-limit check control, a storage key and ACB check override, and a seven-bit storage field length. Address/key receives the channel storage request at the channel clock rate. Following the last transfer, a channel storage request pending latch is set at the channel clock rate and the channel request is converted to processor clocks. When metastability has been removed, the SHCP buffer id, channel storage request, and memory port id are transferred to memory control. Address/key converts the absolute address to a physical address through memory mapping and calculates the stop address, or ending field address, for the storage field length indicated. Using the starting address and field-length, address/key generates two bits to indicate which L2 half-lines are modified by the store request, one bit for each 64-byte half-line. These are inserted into address bit positions 27 and 28 of the L2 absolute address. Bit 27 equal to '1'b indicates the high half-line is modified; bit 28 equal to '1'b indicates the low half-line is modified. Memory control receives the storage channel data buffer id, storage request, partial/full L3 line indication, and memory port id, and the request separately enters priority for the L2 cache mini directory and the storage key array. If no request is currently active to the L2 mini directory, then this channel storage request, once selected by priority, causes a command to be transferred to the L2 mini directory to check for the presence of the line in L2 cache. Address/key is instructed to transfer the appropriate address to the L2 mini directory. If no request is currently active to the storage key array, then this channel storage request, once selected by priority, causes a command to be transferred to address/key to perform the address and protection checks associated with the channel storage request in the address/key SHCP command buffer. Address/key, upon receipt of the memory control SHCP commands, uses the appropriate SHCP command buffer to determine what addressing and protection checks should be applied and transfers the selected storage address to the L2 mini directory. Address/key end-of-operation is returned to memory control when the SHCP command obtains access to the storage key array. The appropriate addressing and protection checks are performed and the reference and change bits of the 4KB page containing the requested L3 line are set to '1'b as a result of the channel store request, provided no access exceptions occur. The results of the addressing and protection checks are returned to memory control. The L2 cache mini directory, upon receipt of the memory control command and address/key address, is set-associatively searched and yields an L2 cache hit. The L2 status is returned to memory control. Memory control, upon receipt of the L2 mini directory status and address/key status, enters the channel request into memory priority, provided no access exceptions exist. In this case an L2 hit is indicated by the L2 cache mini directory search. However, as the L2 mini directory may falsely indicate the existence of a line in L2 cache, the required memory port must be allocated. Memory control allocates the necessary. resources, including an inpage/outpage buffer pair, and activates the request when selected by priority. Address/key is instructed to transfer the selected SHCP command buffer address to BSU control. A command is sent to BSU control to perform a channel L2 cache store from the selected storage channel data buffer. Address/key transfers the selected L3 physical address to BSU control in case of an L2 cache miss. The stop and start addresses for the channel store are also transferred to BSU control to allow generation of the store byte flags for the L2 cache line write. BSU control receives the channel L2 store command from memory control and the required addresses from address/key and holds them for the current storage operation. BSU control transfers the command, stop address, and start address to SCDB control and synchronizes the generation and loading of the inpage buffer store byte flags with the data transfers from the storage channel data buffer. SCDB control receives the channel L2 store command, storage channel data buffer identification, stop and start addresses, and begins reading the selected storage channel data buffer contents. For channel L2 store operations, SCDB always transfers 128 bytes from the storage channel data buffer to L2 data flow, regardless of the number of bytes actually stored. Four 32-byte transfers are made to the L2 cache inpage buffer, proceeding from left to right, starting with quadwords 0 and 1. In parallel with the first storage channel data buffer read, memory control transfers a command to L2 control to perform a channel L2 cache store. Address/key is instructed to transfer the selected SHCP command buffer address to L2 control. Address/key transfers the modified L2 absolute address, including the L2 cache line half-line modifiers, to L2 control. L2 control receives the memory control command and, after selection by the L2 cache service priority, uses the address/key address to search the L2 cache directory. The processor inpage freeze registers and line-hold registers with active storage uncorrectable error indications are compared for a match with the channel L2 store line address. Should a match occur, L2 miss status is forced to make the channel request access L3 storage. A channel L2 store command is transferred to BSU control and command reply is transferred to memory control. An L2 cache hit results from the directory search. The processor lock registers are not compared with the address as this is a channel store request. No information is transferred to address/key. The L2 cache line status is subsequently transferred to BSU control and memory control. All L1 status arrays are searched for copies of the modified L2 cache line halves under control of the half-line modifiers, address bits 27 and 28 from address/key. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. Memory control receives the L2 cache line status, L2 cache hit, and releases the memory port associated with the channel request. End-of-operation for the channel request is transferred to address/key. Prior to knowledge of the L2 cache status, the command and address are transferred to BSU control to start the access to L2 cache. As this is a full line store and the cache sets are interleaved, the L2 cache set must be used to manipulate address bits 25 and 26 to permit the L2 cache line write. Upon receipt of the L2 cache set and line status, L2 hit, the full line write is completed to L2 cache under control of the inpage buffer store byte flags. Address/key, upon receipt of end-of-operation from memory control, converts the indication to the channel clock rate and responds with SHCP request complete with clean status to the shared channel processor.

3.2.2 Storage Store, 1:128 Bytes, No Access Exceptions, L2M Directory-Hit/L2 Cache Miss The shared channel processor issues a channel storage store request to the storage system through a two-phase operation. The store data are first transferred to a storage channel data buffer. After successful completion of the data transfer, the command and address are transferred to address/key to start the actual storage operation. The shared channel processor starts a channel storage store request by requesting that the channel data buffer transfer the data across an 8-byte bi-directional data interface to SCDB control at the channel clock rate. The first transfer on the interface contains the storage channel data buffer identification, command, fetch or store, and a quadword address within the 128-byte buffer, absolute address bits 25:27. The data transfers follow and always occur in increments of two, representing an integral number of quadwords. SCDB control receives the command and data transfers at the channel clock rate and loads the control information into the appropriate registers and the data into the selected storage channel data buffer at the channel clock rate. The data are loaded into the storage channel data buffer starting with the quadword identified by the quadword address. SCDB control signals successful completion to the channel data buffer by dropping transfer echo the cycle after the last data transfer. The channel data buffer then signals successful completion of the data transfer to the shared channel processor. The shared channel processor issues a channel storage store request to the storage system through a multiple cycle transfer of command and address to address/key. The four cycles of command/address transfer occur at the channel clock rate. The first transfer contains the shared channel processor buffer identification, an L3 storage store request, and an indication of whether storage address-check boundary (ACB) and storage key checking are required. The second transfer contains the low-order absolute address bits, 16:31. The following transfer contains the high-order absolute address bits, 0:15, with 4:15 significant to L3 processor storage. The final transfer contains the channel storage key, the address-limit check control, a storage key and ACB check override, and a seven-bit storage field length. Address/key receives the channel storage request at the channel clock rate. Following the last transfer, a channel storage request pending latch is set at the channel clock rate and the channel request is converted to processor clocks. When metastability has been removed, the SHCP buffer id, channel storage request, and memory port id are transferred to memory control. Address/key converts the absolute address to a physical address through memory mapping and calculates the stop address, or ending field address, for the storage field length indicated. Using the starting address and field-length, address/key generates two bits to indicate which L2 half-lines are modified by the store request, one bit for each 64-byte half-line. These are inserted into address bit positions 27 and 28 of the L2 absolute address. Bit 27 equal to '1'b indicates the high half-line is modified; bit 28 equal to '1'b indicates the low half-line is modified. Memory control receives the storage channel data buffer id, storage request, partial/full L3 line indication, and memory port id, and the request separately enters priority for the L2 cache mini directory and the storage key array. If no request is currently active to the L2 mini directory, then this channel storage request, once selected by priority, causes a command to be transferred to the L2 mini directory to check for the presence of the line in L2 cache. Address/key is instructed to transfer the appropriate address to the L2 mini directory. If no request is currently active to the storage key array, then this channel storage request, once selected by priority, causes a command to be transferred to address/key to perform the address and protection checks associated with the channel storage request in the address/key SHCP command buffer. Address/key, upon receipt of the memory control SHCP commands, uses the appropriate SHCP command buffer to determine what addressing and protection checks should be applied and transfers the selected storage address to the L2 mini directory. Address/key end-of-operation is returned to memory control when the SHCP command obtains access to the storage key array. The appropriate addressing and protection checks are performed and the reference and change bits of the 4KB page containing the requested L3 line are set to '1'b as a result of the channel store request, provided no access exceptions occur. The results of the addressing and protection checks are returned to memory control. The L2 cache mini directory, upon receipt of the memory control command and address/key address, is set-associatively searched and yields an L2 cache hit. The L2 status is returned to memory control. Memory control, upon receipt of the L2 mini directory status and address/key status, enters the channel request into memory priority, provided no access exceptions exist. In this case an L2 hit is indicated by the L2 cache mini directory search. However, as the L2 mini directory may falsely indicate the existence of a line in L2 cache, the required memory port must be allocated. Memory control allocates the necessary resources, including an inpage/outpage buffer pair, and activates the request when selected by priority. Address/key is instructed to transfer the selected SHCP command buffer address to BSU control. A command is sent to BSU control to perform a channel L2 cache store from the selected storage channel data buffer. Address/key transfers the selected L3 physical address to BSU control in case of an L2 cache miss. The stop and start addresses for the channel store are also transferred to BSU control to allow generation of the store byte flags for the L2 cache line write. BSU control receives the channel L2 store command from memory control and the required addresses from address/key and holds them for the current storage operation. BSU control transfers the command, stop address, and start address to SCDB control and synchronizes the generation and loading of the inpage buffer store byte flags with the data transfers from the storage channel data buffer. SCDB control receives the channel L2 store command, storage channel data buffer identification, stop and start addresses, and begins reading the selected storage channel data buffer contents. For channel L2 store operations, SCDB always transfers 128 bytes from the storage channel data buffer to L2 data flow, regardless of the number of bytes actually stored. Four 32-byte transfers are made to the L2 cache inpage buffer, proceeding from left to right, starting with quadwords 0 and 1. In parallel with the first storage channel data buffer read, memory control transfers a command to L2 control to perform a channel L2 cache store. Address/key is instructed to transfer the selected SHCP command buffer address to L2 control. Address/key transfers the modified L2 absolute address, including the L2 cache line half-line modifiers, to L2 control. L2. control receives the memory control command and, after selection by the L2 cache service priority, uses the address/key address to search the L2 cache directory. The processor inpage freeze registers and line-hold registers with active storage uncorrectable error indications are compared for a match with the channel L2 store line address. Should a match occur, L2 miss status is forced to make the channel request access L3 storage. A channel L2 store command is transferred to BSU control and command reply is transferred to memory. BSU control. An L2 cache miss results from the directory search. No information is transferred to address/key. The L2 cache line status is subsequently transferred to BSU control and memory control. The L1 status array compares are blocked due to the L2 cache miss. Memory control receives the L2 cache line status, L2 cache miss. Recognizing that BSU control must store the requested data to L3 processor storage, memory control retains the memory port lock associated with the channel request. Prior to knowledge of the L2 cache status, the command and address are transferred to BSU control to start the access to L2 cache. As this is a full line store and the cache sets are interleaved, the L2 cache set must be used to manipulate address bits 25 and 26 to permit the L2 cache line write. Upon receipt of the L2 cache set and line status, L2 miss, the full line write is cancelled. BSU control transfers a new command, stop address, and start address to SCDB control due to the L2 cache miss. SCDB control receives the channel L3 store command, storage channel data buffer identification, stop and start addresses, and begins reading the selected storage channel data buffer contents. For channel L3 store operations, SCDB transfers only the required quadwords from the storage channel data buffer to L2 data flow for subsequent transfer to L3 storage. The quadword transfers commence with the start address and proceed, in sequential order, through the stop address. BSU control selects the memory port and transfers command and address to the memory cards the cycle before the first quadword is latched from the storage channel data buffer on L2 data flow. BSU control then gates the appropriate number of quadwords from the storage channel data buffer through the L3 interface register to L3 memory. BSU control transfers end-of-operation to memory control following the last data transfer to the selected memory port. Memory control, if a full line store is in progress, releases the memory port based on BSU end-of-operation to permit overlapped access to the memory port and transfers end-of-operation to address/key for the channel request. If a full line store is not in progress, memory control waits for L3 busy to drop from the selected memory port before releasing the L3 port, but transfers end-of-operation to address/key for the channel request based on BSU end-of-operation. Address/key, upon receipt of end-of-operation from memory control, converts the indication to the channel clock rate and responds with SHCP request complete with clean status to the shared channel processor.

3.2.3 Storage Store, 1:128 Bytes, No Access Exceptions, L2M Directory Miss

The shared channel processor issues a channel storage store request to the storage system through a two-phase operation. The store data are first transferred to a storage channel data buffer. After successful completion of the data transfer, the command and address are transferred to address/key to start the actual storage operation. The shared channel processor starts a channel storage store request by requesting that the channel data buffer transfer the data across an 8-byte bi-directional data interface to SCDB control at the channel clock rate. The first transfer on the interface contains the storage channel data buffer identification, command, fetch or store, and a quadword address within the 128-byte buffer, absolute address bits 25:27. The data transfers follow and always occur in increments of two, representing an integral number of quadwords. SCDB control receives the command and data transfers at the channel clock rate and loads the control information into the appropriate registers and the data into the selected storage channel data buffer at the channel clock rate. The data are loaded into the storage channel data buffer starting with the quadword identified by the quadword address. SCDB control signals successful completion to the channel data buffer by dropping transfer echo the cycle after the last data transfer. The channel data buffer then signals successful completion of the data transfer to the shared channel processor. The shared channel processor issues a channel storage store request to the storage system through a multiple cycle transfer of command and address to address/key. The four cycles of command/address transfer occur at the channel clock rate. The first transfer contains the shared channel processor buffer identification, an L3 storage store request, and an indication of whether storage address-check boundary (ACB) and storage key checking are required. The second transfer contains the low-order absolute address bits, 16:31. The following transfer contains the high-order absolute address bits, 0:15, with 4:15 significant to L3 processor storage. The final transfer contains the channel storage key, the address-limit check control, a storage key and ACB check override, and a seven-bit storage field length. Address/key receives the channel storage request at the channel clock rate. Following the last transfer, a channel storage request pending latch is set at the channel clock rate and the channel request is converted to processor clocks. When metastability has been removed, the SHCP buffer id, channel storage request, and memory port id are transferred to memory control. Address/key converts the absolute address to a physical address through memory mapping and calculates the stop address, or ending field address, for the storage field length indicated. Using the starting address and field-length, address/key generates two bits to indicate which L2 half-lines are modified by the store request, one bit for each 64-byte half-line. These are inserted into address bit positions 27 and 28 of the L2 absolute address. Bit 27 equal to '1'b indicates the high half-line is modified; bit 28 equal to '1'b indicates the low half-line is modified. Memory control receives the storage channel data buffer id, storage request, partial/full L3 line indication, and memory port id, and the request separately enters priority for the L2 cache mini directory and the storage key array. If no request is currently active to the L2 mini directory, then this channel storage request, once selected by priority, causes a command to be transferred to the L2 mini directory to check for the presence of the line in L2 cache. Address/key is instructed to transfer the appropriate address to the L2 mini directory. If no request is currently active to the storage key array, then this channel storage request, once selected by priority, causes a command to be transferred to address/key to perform the address and protection checks associated with the channel storage request in the address/key SHCP command buffer. Address/key, upon receipt of the memory control SHCP commands, uses the appropriate SHCP command buffer to determine what addressing and protection checks should be applied and transfers the selected storage address to the L2 mini directory. Address/key end-of-operation is returned to memory control when the SHCP command obtains access to the storage key array. The appropriate addressing and protection checks are performed and the reference and change bits of the 4KB page containing the requested L3 line are set to '1'b as a result of the channel store request, provided no access exceptions occur. The results of the addressing and protection checks are returned to memory control. The L2 cache mini directory, upon receipt of the memory control command and address/key address, is set-associatively searched and yields an L2 cache miss. The L2 status is returned to memory control. Memory control, upon receipt of the L2 mini directory status and address/key status, enters the channel request into memory priority, provided no access exceptions exist. In this case an L2 miss is indicated by the L2 cache mini directory search. This is always a true indication of the status of the L3 line at the time of the L2 mini directory search and the required memory port must be allocated. Memory control allocates the necessary resources, including an inpage/outpage buffer pair, and activates the request when selected by priority. Address/key is instructed to transfer the selected SHCP command buffer address to BSU control. A command is sent to BSU control to perform a channel L3 storage store from the selected storage channel data buffer. Address/key transfers the selected L3 physical address to BSU control. The stop and start addresses for the channel store are also transferred to BSU control to identify the number of quadword transfers to L3 storage. BSU control receives the channel L3 store command from memory control and the required addresses from address/key and holds them for the current storage operation. BSU control transfers the command, stop address, and start address to SCDB control. SCDB control receives the channel L3 store command, storage channel data buffer identification, stop and start addresses, and begins reading the selected storage channel data buffer contents. For channel L3 store operations, SCDB transfers only the required quadwords from the storage channel data buffer to L2 data flow for subsequent transfer to L3 storage. The quadword transfers commence with the start address and proceed, in sequential order, through the stop address. BSU control selects the memory port and transfers command and address to the memory cards the cycle before the first quadword is latched from the storage channel data buffer on L2 data flow. BSU control then gates the appropriate number of quadwords from the storage channel data buffer through the L3 interface register to L3 memory. BSU control transfers end-of-operation to memory control following the last data transfer to the selected memory port. Memory control, if a full line store is in progress, releases the memory port based on BSU end-of-operation to permit overlapped access to the memory port and transfers end-of-operation to address/key for the channel request. If a full line store is not in progress, memory control waits for L3 busy to drop from the selected memory port before releasing the L3 port, but transfers end-of-operation to address/key for the channel request based on BSU end-of-operation. Address/key, upon receipt of end-of-operation from memory control, converts the indication to the channel clock rate and responds with SHCP request complete with clean status to the shared channel processor.

3.3 Channel Storage Commands 3.3.1 Transfer Storage Channel Data Buffer to L4 Line Application: 370-XA support of direct data transfers from channel I/O devices to extended storage. Authority and protection checking are accomplished by channel microcode. Channel microcode is responsible for verifying that the L4 extended-storage-block number specified in the data address field of the channel command word is available in the configuration prior to issuing this command. The extended-storage-block number must be converted to an L4 extended storage absolute address by microcode. The address, once generated, is supplied to the storage system with L4 address bits 3:24 in the storage address bit positions 3:24.

Storage Command Description

This command allows the shared channel processor to move data from I/O devices through the channel subsystem to L4 extended storage. The command is designed to move 128 bytes of data from the selected storage channel data buffer to L4 extended storage at the L4 absolute address specified in the storage command. The L4 absolute address must be on a 128-byte boundary. The only significant differences between this command and a 128-byte channel storage store to L3 processor storage are the destination of the data and the lack of any address and protection checking required on the part of the storage subsystem for L4 extended storage.

Storage Command Execution

The shared channel processor starts a transfer channel buffer to L4 line command by requesting that the channel data buffer transfer the data across an 8-byte bi-directional data interface to SCDB control at the channel clock rate. The first transfer on the interface contains the storage channel data buffer identification, command, fetch or store, and a quadword address within the 128-byte buffer, absolute address bits 25:27, which must be '000'b. Sixteen data transfers follow. SCDB control receives the command and data transfers at the channel clock rate and loads the control information into the appropriate registers and the data into the selected storage channel data buffer at the channel clock rate. The data are loaded into the storage channel data buffer starting with the quadword identified by the quadword address. SCDB control signals successful completion to the channel data buffer by dropping transfer echo the cycle after the last data transfer. The channel data buffer then signals successful completion of the data transfer to the shared channel processor. The shared channel processor issues a channel storage command to the storage system through a multiple cycle transfer of command and address to address/ key. The four cycles of command/address transfer occur at the channel clock rate. The first transfer contains the shared channel processor buffer identification and a transfer channel buffer to L4 line storage command. The second transfer contains the low-order absolute address bits, 16:31, with 16:24 significant to L4 extended storage. Address bits 25:31 must be zeros. The following transfer contains the high-order absolute address bits, 0:15, with 3:15 significant to L4 extended storage. The final transfer contains a seven-bit storage field length which must specify a 128-byte length. Address/key receives the channel storage command at the channel clock rate. Following the last transfer, a channel storage request pending latch is set at the channel clock rate and the channel request is converted to processor clocks. When metastability has been removed, the SHCP buffer id, channel storage command, and memory port id are transferred to memory control. Memory control receives the storage channel data buffer id, transfer channel buffer to L4 line storage command, and L4 memory port id, and the request enters priority for the storage key array. This priority path is used to permit memory control to verify with address/key that this is a valid request. If no request is currently active to the storage key array, then this channel storage request, once selected by priority, causes a command to be transferred to address/key to transfer validity status associated with the channel storage command in the address/ key SHCP command buffer. Address/key, upon receipt of the memory control SHCP command, replies with end-of-operation to memory control. The validity status of the SHCP storage command is transferred to memory control. Memory control, upon receipt of the address/key status, enters the channel command into memory priority, provided it is a valid command. Memory control allocates the necessary resources and activates the command when selected by priority. Address/key is instructed to transfer the selected SHCP command buffer address to BSU control. A command is sent to BSU control to perform a full line L4 storage store from the selected storage channel data buffer. Address/key transfers the selected L4 absolute address and card-pair selects to BSU control. BSU control receives the transfer channel buffer to L4 line command from memory control and the L4 absolute address and L4 card-pair selects from address/key. BSU control transfers the command to SCDB control. SCDB control receives the transfer channel buffer to L4 line command, storage channel data buffer identification, and begins reading the selected storage channel data buffer contents. SCDB control transfers the quadwords from the storage channel data buffer in sequential order from zero through seven. BSU control initiates the L4 storage 128-byte store by transferring the command and address through the L2 data flow to the L4 memory port. BSU control then gates the data transfers from SCDB control through the L4 interface register to L4 memory. BSU control transfers end-of-operation to memory control following the last data transfer to the selected L4 memory card-pair. Memory control, upon receipt of end-of-operation from BSU control, transfers end-of-operation to address/key for the channel request and recognizing that a full line store is in progress, releases the L4 memory port based on BSU end-of-operation, delayed to permit the maximum allowable overlapped access to the memory port. Address/key, upon receipt of end-of-operation from memory control, converts the indication to the channel clock rate and responds with SHCP request complete with clean status to the shared channel processor.

3.3.2 Transfer L4 Line to Storage Channel Data Buffer

Application: 370-XA support of direct data transfers from extended storage to channel I/O devices. Authority and protection checking are accomplished by channel microcode. Channel microcode is responsible for verifying that the L4 extended-storage-block number specified in the data address field of the channel command word is available in the configuration prior to issuing this command. The extended-storage-block number must be converted to an L4 extended storage absolute address by microcode. The address, once generated, is supplied to the storage system with L4 address bits 3:24 in the storage address bit positions 3:24.

Storage Command Description

This command allows the shared channel processor to move data from L4 extended storage through the channel subsystem to I/O devices. The command is designed to copy 128 bytes of L4 extended storage data from the specified L4 absolute address, on a 128-byte boundary, to the selected storage channel data buffer. The shared channel processor can then unload the storage channel data buffer to the channel subsystem. The only significant differences between this command and a 128-byte channel storage fetch from L3 processor storage are the source of the data and the lack of any address and protection checking required on the part of the storage subsystem for L4 extended storage.

Storage Command Execution

The shared -channel processor issues a channel storage command to the storage system through a multiple cycle transfer of command and address to address/key. The four cycles of command/address transfer occur at the channel clock rate. The first transfer contains the shared channel processor buffer identification and a transfer L4 line to channel buffer storage command. The second transfer contains the low-order absolute address bits, 16:31, with 16:24 significant to L4 extended storage. Address bits 25:31 must be zeros. The following transfer contains the high-order absolute address bits, 0:15, with 3:15 significant to L4 extended storage. The final transfer contains a seven-bit storage field length which must specify a 128-byte length. Address/key receives the channel storage command at the channel clock rate. Following the last transfer, a channel storage request pending latch is set at the channel clock rate and the channel command is converted to processor clocks. When metastability has been removed, the SHCP buffer id, channel storage command, and memory port id are transferred to memory control. Memory control receives the storage channel data buffer id, transfer L4 line to channel buffer storage command, and L4 memory port id, and the request enters priority for the storage key array. This priority path is used to permit memory control to verify with address/key that this is a valid request. If no request is currently active to the storage key array, then this channel storage request, once selected by priority, causes a command to be transferred to address/key to transfer validity status associated with the channel storage command in the address/key SHCP command buffer. Address/key, upon receipt of the memory control SHCP command, replies with end-of-operation to memory control. The validity status of the SHCP storage command is transferred to memory control. Memory control, upon receipt of the address/key status, enters the channel command into memory priority, provided it is a valid command. Memory control allocates the necessary resources and activates the command when selected by priority. Address/key is instructed to transfer the selected SHCP command buffer address to BSU control. A command is sent to BSU control to perform a full line L4 storage fetch to the selected storage channel data buffer. Address/key transfers the selected L4 absolute address and card-pair selects to BSU control. BSU control receives the transfer L4 line to channel buffer command from memory control and the L4 absolute address and L4 card-pair selects from address/key. BSU control transfers the command to SCDB control. BSU control initiates the L4 storage 128-byte fetch by transferring the command and address through the L2 data flow to the L4 memory port. SCDB control receives the transfer L4 line to channel buffer command, storage channel data buffer identification, and waits for the data from the L2 cache data flow function. SCDB control expects 16 bytes of storage data per transfer. The selected L4 memory card-pair performs the requested read, passing the data to the L4 interface register, and L2 data flow directs it to the storage channel data buffer function. While the last data transfer completes to the storage channel data buffer, BSU control transfers end-of-operation to memory control. During the data transfers to the L4 interface register, address/key monitors the uncorrectable error lines from memory. The error status is recorded for the SHCP buffer identified and forwarded to the shared channel processor at request completion. SCDB control receives the L4 storage data, 16 bytes per cycle, from L2 data flow and gates the data into the selected storage channel data buffer at the processor clock rate. Memory control, upon receipt of end-of-operation from BSU control, releases the L4 port and returns end-of-operation for the channel request to address/key. Address/key, upon receipt of end-of-operation from memory control, converts the indication to the channel clock rate and responds with SHCP request complete with clean status to the shared channel processor, provided all data fetched from L4 extended storage are valid.

3.3.3 Test and Set

Application: Software interlocked updates to main storage locations which are obeyed by both channels and processors. Microcode must ensure that if a particular processor within the configuration is quiescent, it is left in a state where it does not possess any lock or line-holds. Failure to do so may result in a lock-out condition as the channel test and set command cannot complete when a quiescent processor possesses a lock or line-hold on the requested L2 cache line.

Storage Command Description

Channel microcode supplies the command, an absolute address, on an eight-byte boundary, and a single byte of data, designated the lock-byte. The lock-byte contains two fields. The first bit, bit 0, is the lock-bit. The remaining seven bits within the byte contain a process identification. As viewed in storage, a '0'b value in the lock-bit signifies that the associated storage field is currently unlocked, available for use. A value of '1'b signifies that the storage field is locked or already in use by another process which is currently altering the storage field, requiring exclusive use of the contents. The remaining seven bits identify the current, or last, process owner of the lock for the associated storage field. When channel microcode issues the command it is for the purpose of obtaining exclusive access to the storage field associated with the lock-byte. Microcode supplies a '1'b in the high-order bit and the process identification of the requester. The command, absolute address, and lock-byte are passed to the storage system. The most recent copy of the addressed storage location is interrogated for the current state of the lock-bit. If the lock-bit value is '0'b, the new lock-byte is inserted into the storage location and the new data are returned to the shared channel processor; if the lock-bit value is '1'b, the storage location remains unchanged and the original storage contents are returned to the shared channel processor. The absolute address is used to search the L2 cache mini directory. If an L2 cache hit results from the L2 mini directory search, the copy of the L3 line within the L2 cache must be removed. If the L2 cache line containing the lock-byte is modified, the L2 cache line is flushed to L3 processor storage prior to fetching the lock-byte for the test and set operation. This guarantees exclusive access to the data as the memory port is a non-sharable resource. The L2 cache directory entry and the corresponding entry in the L2 mini directory are invalidated. The L1 status arrays are also searched, and any copies of the L2 cache line which exist at the L1 cache level are purged and the appropriate L1 status entries are cleared. The L3 line containing the lock-byte is subsequently fetched to the selected storage channel data buffer from L3 processor storage. Only the required number of quadwords are fetched from storage, as, specified by the channel storage command field length. The lock-byte is conditionally modified, based on the current state of the lock-bit in the storage location, prior to loading the data into the storage channel data buffer. The lock-byte is unconditionally stored back to L3 processor storage. The shared channel processor ultimately obtains the requested data from the storage channel. Data buffer and tests the process identification. An equal comparison with the lock-byte supplied with the command signifies that the lock has been granted to the requester; a miscompare signifies that the storage field is currently locked by another process, as identified by the process identification in the byte returned from processor storage.

Storage Command Execution

The shared channel processor starts a test and set command by requesting that the channel data buffer transfer the data across an 8-byte bi-directional data interface to SCDB control at the channel clock rate. The first transfer on the interface contains the storage channel data buffer identification, command, fetch or store, and a quadword address within the 128-byte buffer, absolute address bits 25:27. Two data transfers, comprising the quadword containing the lock-byte, follow. SCDB control receives the command and data transfers at the channel clock rate and loads the control information into the appropriate registers and the data into the selected storage channel data buffer at the channel clock rate. The data are loaded into the storage channel data buffer in the position identified by the quadword address. SCDB control signals successful completion to the channel data buffer by dropping transfer echo the cycle after the last data transfer. The channel data buffer then signals successful completion of the data transfer to the shared channel processor. The shared channel processor issues a channel storage command to the storage system through a multiple cycle transfer of command and address to address/key. The four cycles of command/address transfer occur at the channel clock rate. The first transfer contains the shared channel processor buffer identification, a test and set storage command, and an indication of whether storage address-check boundary (ACB) and storage key checking are required. The second transfer contains the low-order absolute address bits, 16:31. The following transfer contains the high-order absolute address bits, 0:15, with 4:15 significant to L3 processor storage. The final transfer contains the channel storage key, the address-limit check control, a storage key and ACB check override, and a seven-bit storage field length. Address/key receives the channel storage command at the channel clock rate. Following the last transfer, a channel storage request pending latch is set at the channel clock rate and the channel command is converted to processor clocks. When metastability has been removed, the SHCP buffer id, channel storage command, and memory port id are transferred to memory control. Address/key converts the absolute address to a physical address through memory mapping and calculates the stop address, or ending field address, for the storage field length indicated. Memory control receives the storage channel data buffer id, storage command, and memory port id, and the request separately enters priority for the L2 cache mini directory and the storage key array. If no request is currently active to the L2 mini directory, then this channel storage request, once selected by priority, causes a command to be transferred to the L2 mini directory to check for the presence of the line in L2 cache. Address/key is instructed to transfer the appropriate address to the L2 mini directory. If no request is currently active to the storage key array, then this channel storage request, once selected by priority, causes a command to be transferred to address/key to perform the address and protection checks associated with the channel storage request in the address/key SHCP command buffer. Address/key, upon receipt of the memory control SHCP commands, uses the appropriate SHCP command buffer to determine what addressing and protection checks should be applied and transfers the selected storage address to the L2 mini directory. Address/key end-of-operation is returned to memory control when the SHCP command obtains access to the storage key array. The appropriate addressing and protection checks are performed and the reference and change bits of the 4KB page containing the requested L3 line are set to '1'b as a result of the channel test and set command, provided no access exceptions occur. The results of the addressing and protection checks are returned to memory control. The L2 cache mini directory, upon receipt of the memory control command and address/key address, is set-associatively searched. One of two conditions result from the L2 mini directory search. The L2 cache line status is returned to memory control.
Case A Memory control, upon receipt of the L2 mini directory status and address/key status, enters the channel request into memory priority, provided no access exceptions exist. In this case an L2 miss is indicated by the L2 cache mini directory search. This is always a true indication of the status of the L3 line at the time of the L2 mini directory search and the required memory port must be allocated. Memory control allocates the necessary resources and activates the request when selected by priority. Address/key is instructed to transfer the selected SHCP command buffer address to BSU control. A command is sent to BSU control to perform a channel L3 test and set with the selected storage channel data buffer. Address/key transfers the selected L3 physical address to BSU control. The stop and start addresses for the channel test and set L3 fetch are also transferred to BSU control to control the loading of the storage channel data buffer. BSU control receives the channel L3 test and set command from memory control and the required addresses from address/key and holds them for the current storage operation. BSU control initiates the L3 storage fetch by transferring the command and address through the L2 data flow to the required memory port. BSU control transfers the command, stop address, start address, and absolute address bit 28 to SCDB control.
Case B Memory control, upon receipt of the L2 mini directory status and address/key status, enters the channel request into memory priority, provided no access exceptions exist. In this case an L2 hit is indicated by the L2 cache mini directory search. However, as the L2 mini directory may falsely indicate the existence of a line in L2 cache, the required memory port must be allocated. Memory control allocates the necessary resources, including an inpage/outpage buffer pair, and activates the request when selected by priority. A command is transferred to L2 control to perform an invalidate and flush for channel test and set. Address/key is instructed to transfer the selected SHCP command buffer address to L2 control and BSU control. Memory control transfers an unload outpage buffer if modified and not locked or channel test and set if not modified and not locked command to BSU control along with the storage channel data buffer identification. Address/key transfers the selected absolute address to L2 control and the L3 physical address to BSU control. The stop and start addresses for the channel test and set L3 fetch are also transferred to BSU control to control the loading of the storage channel data buffer. BSU control receives the unload outpage buffer if modified and not locked or channel test and set if not modified and not locked command from memory control and the required addresses from address/key and holds them for the current storage operation. BSU control then waits for L2 status. L2 control receives the memory control command to invalidate and flush the L2 cache line for channel test and set and, after selection by the L2 cache service priority, uses the address/key address to search the L2 cache directory. A load outpage buffer if modified and not locked command is transferred to BSU control and command reply is transferred to memory control. One of five conditions result from the L2 cache directory search.
Case 1

The search of the L2 cache directory results in an L2 cache miss. No information is passed to address/key. The L2 cache line status is subsequently transferred to BSU control and memory control. Not modified status is forced due to the L2 cache miss. BSU control receives the L2 cache line status, not modified and not locked, and commences the channel L3 test and set fetch operation. BSU control initiates the L3 storage fetch by transferring the command and address through the L2 data flow to the required memory port. BSU control transfers the command, stop address, start address, and absolute address bit 28 to SCDB control. Memory control receives the L2 cache line status, L2 miss, and recognizes that BSU control will start the channel L3 test and set operation.

Case 2

A lock or line-hold is active to the selected L2 cache line. No information is transferred to address/key. The L2 cache line status is subsequently transferred to BSU control and memory control. BSU control receives the L2 cache line status, locked, and drops the memory control command. Memory control receives the L2 cache line status, locked, and aborts the current execution of the command. The channel storage command is temporarily suspended, allowing time for the lock conflict to be cleared, and then re-entered into the memory control priority in an attempt to execute the command in its entirety.

Case 3

The search of the L2 cache directory results in an L2 cache hit, but an inpage freeze register with storage uncorrectable error indication is active for a processor for the addressed L2 cache line. No information is passed to address/key. The L2 cache line status is subsequently transferred to BSU control and memory control. Not modified status and L2 cache miss are forced. BSU control receives the L2 cache line status, not modified and not locked, and commences the channel L3 test and set fetch operation. BSU control initiates the L3 storage fetch by transferring the command and address through the L2 data flow to the required memory port. BSU control transfers the command, stop address, start address, and absolute address bit 28 to SCDB control. Memory control receives the L2 cache line status, L2 miss, and recognizes that BSU control will start the channel L3 test and set operation.

Case 4

The search of the L2 cache directory results in an L2 cache hit and the cache line is unmodified. The L2 cache entry is marked invalid. The absolute address and L2 cache set are transferred to address/key. The L2 cache line status is subsequently transferred to BSU control and memory control. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. Address/key receives the absolute address and L2 cache set. Recognizing that a channel operation is in progress, the L2 cache set is latched in the appropriate SHCP address buffer. BSU control receives the L2 cache line status, not modified and not locked, and commences the channel L3 test and set fetch operation. BSU control initiates the L3 storage fetch by transferring the command and address through the L2 data flow to the required memory port. BSU control transfers the command, stop address, start address, and absolute address bit 28 to SCDB control. Memory control receives the L2 cache line status, L2 hit and not modified, and recognizes that BSU control will start the channel L3 test and set operation. Memory control requests invalidation of the appropriate entry in the L2 mini directory using the appropriate SHCP command buffer address.

Case 5

The search of the L2 cache directory results in an L2 cache hit and the cache line is modified. The L2 cache entry is marked invalid as its contents are being transferred to L3 processor storage. The absolute address and L2 cache set are transferred to address/key. The L2 cache line status is subsequently transferred to BSU control and memory control. All L1 status arrays are searched for copies of the two L1 cache lines within the L2 cache line marked invalid. The low-order L2 cache congruence is used to address the L1 status arrays and the L2 cache set and high-order congruence are used as the comparand with the L1 status array outputs. If L1 cache copies are found, then the appropriate L1/L2 address busses are requested for invalidation. The L1 cache congruence and L1 cache sets, two for the L1 operand cache and two for the L1 instruction cache, are simultaneously transferred to the appropriate processors for invalidation of the L1 cache copies after the request for the address buss has been granted by that L1. Address/key receives the absolute address and L2 cache set. Recognizing that a channel operation is in progress, the L2 cache set is latched in the appropriate SHCP address buffer. BSU control receives the L2 cache line status, modified and not locked, and commences the castout operation. BSU control instructs L2 cache to read a full line from the specified L2 cache congruence and set to the outpage buffer designated by L2 control. Memory control receives the L2 cache line status, L2 hit and modified, and recognizes that BSU control will start the castout. Memory control requests invalidation of the appropriate entry in the L2 mini directory using the appropriate SHCP command buffer address. BSU control initiates the L3 storage store by transferring the command and address through the L2 data flow to the required memory port. BSU controls the transfer of quadwords from the appropriate outpage buffer through the L3 interface register to memory. After the last data transfer, BSU control responds with end-of-operation to memory control. Memory control, upon receipt of BSU end-of-operation, starts the channel L3 test and set sequence at the buss grant priority cycle. All resources have been previously allocated and L2 cache miss is now guaranteed. Address/key is instructed to transfer the selected SHCP command buffer address to BSU control. A command is sent to BSU control to perform a channel L3 test and set with the selected storage channel data buffer. Address/key transfers the selected L3 physical address to BSU control. The stop and start addresses for the channel test and set L3 fetch are also transferred to BSU control to control the loading of the storage channel data buffer. BSU control receives the channel L3 test and set command from memory control and the required addresses from address/key and holds them for the current storage operation. BSU control initiates the L3 storage fetch by transferring the command and address through the L2 data flow to the required memory port. BSU control transfers the command, stop address, start address, and absolute address bit 28 to SCDB control.

Cases A, (B.1), (B.3), (B.4), (B.5)

SCDB control receives the channel test and set command, storage channel data buffer identification, stop and start addresses, absolute address bit 28, and waits for the data from the L2 cache data flow function. SCDB control expects 16 bytes of storage data per transfer. The L3 memory performs the requested read, passing the data to the L3 interface register, and L2 data flow directs it to the storage channel data buffer function. Data are always read from the specified address, in a left to right sequence, for the number of bytes specified within the L3 line, and transferred in full quadwords to L2 data flow. While the last data transfer completes to the storage channel data buffer, BSU control generates a channel L3 store command for the same storage channel data buffer. During the data transfers to the L3 interface register, address/key monitors the uncorrectable error lines from memory. The error status is recorded for the SHCP buffer identified and forwarded to the shared channel processor at request completion. SCDB control receives the L3 storage data, 16 bytes per cycle, from L2 data flow and gates the data into the selected storage channel data buffer at the processor clock rate. The first quadword transfer contains the storage lock-byte, as identified by absolute address bit 28. The lock-bit is tested and the storage location lock-byte is loaded into the proper position in the storage channel data buffer if the lock-bit is '1'b; otherwise, the data supplied by the shared channel processor for the channel test and set command for that byte position remains in the storage channel data buffer. Following the last write into the storage channel data buffer, SCDB control reads the quadword identified by the start address and transfers the data to L2 data flow. In parallel, BSU control forces the memory field length to indicate 1 byte, selects the memory port, and transfers a store command and address to the memory cards the cycle before the storage channel data buffer quadword is latched on L2 data flow. BSU control then gates the single quadword from the storage channel data buffer through the L3 interface register to L3 memory. BSU control transfers end-of-operation to memory control following the quadword data transfer to the selected memory port. Memory control, recognizing that a channel test and set operation is in progress, transfers end-of-operation to address/key for the channel request based on BSU end-of-operation, but waits for L3 busy to drop from the selected memory port before releasing the L3 port. Address/key, upon receipt of end-of-operation from memory control, converts the indication to the channel clock rate and responds with SHCP request complete with clean status to the shared channel processor, provided all data fetched from L3 storage are valid.

3.4 Vector Storage Fetch Routines 3.4.1 Storage Fetch, TLB Miss

The execution unit issues a vector storage fetch request, either for an element or 64-byte line, to the L1 cache and the externals function. The set-associative TLB search fails to yield an absolute address for the logical address presented by the request. A request for dynamic address translation is presented to the execution unit and the current storage operation is suspended pending its results. The request is not transferred to the L2 cache or vector processor due to the TLB miss condition. The request is subsequently re-executed if the address translates successfully.

3.4.2 Storage Fetch, TLB Hit, Access Exception

The execution unit issues a vector storage fetch request, either for an element or 64-byte line, to the L1 cache and the externals function. The set-associative TLB search yields an absolute address for the logical address presented by the request. However, an access exception, either protection or addressing, is detected as a result of the TLB access. The execution unit is notified of the access exception and the current storage operation is nullified. The request is not transferred to the L2 cache or vector processor due to the access exception.

3.4.3 Storage Line Fetch, TLB Hit, No Access Exceptions, L2 Cache Hit

The execution unit issues a vector storage 64-byte line fetch request to the L1 cache and the externals function. The set-associative TLB search yields an absolute address, with no access exceptions, for the logical address presented by the request. The L1 cache is not checked for the presence of the data requested by a vector storage fetch. To avoid pending stores within the processor, the store queue of the requesting processor is flushed prior to starting any vector instruction. Consequently, no pending store conflicts can exist for vector line fetch requests. The externals function transfers the vector fetch request to the vector processor. L1 cache transfers the vector line fetch request and absolute address bits 4:28 to L2 as a line is required for the vector processor. In the following cycle, the L1 cache set used to identify vector line fetches is transferred to L2 along with the L1 operand cache identifier. As an inpage to L1 cache is not occurring, no L1 cache entry is selected for replacement and the contents of the L1 cache and inpage buffer are unaffected. The L2 cache priority selects this vector fetch request for service. L2 control transfers a processor L2 cache fetch command and L2 cache congruence to L2 cache control and a processor L2 cache fetch command to memory control. An inpage to the L1 cache of the requesting processor is required and is allowed regardless of any lock or line-hold without uncorrectable storage error indicator active which any alternate processor may possess. One of two conditions result from the L2 cache directory search which yield an L2 cache hit.

Case 1

The search of the L2 cache directory results in an L2 cache hit, but a freeze register with uncorrectable storage error indicator active or line-hold register with uncorrectable storage error indicator active is set for an alternate processor for the requested L2 cache line. L2 control suspends this fetch request pending release of the freeze or line-hold with uncorrectable storage error. No information is transferred to address/key. The L2 cache line status and cache set are transferred to L2 cache control, the cache set modifier is transferred to L2 cache, and the L2 cache line status is transferred to memory control. Locked status is forced due to the alternate processor freeze or line-hold with uncorrectable storage error conflict. The L1 status arrays for the requesting processor are unaffected by the vector line fetch request as the data are destined for the vector processor, not L1 cache. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 hit and locked, blocks any data transfers to the requesting L1 cache and drops the command. Memory control receives the L2 command and L3 port identification. Upon receipt of the L2 cache line status, L2 hit and locked, the request is dropped.

Case 2

The search of the L2 cache directory results in an L2 cache hit. The absolute address is transferred to address/key with a set reference bit command. The L2 cache line status and cache set are transferred to L2 cache control, the cache set modifier is transferred to L2 cache, and the L2 cache line status is transferred to memory control. The L1 status arrays for the requesting processor are unaffected by the vector line fetch request as the data are destined for the vector processor, not L1 cache. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 hit and not locked, uses the L2 cache set to select the proper 32 bytes on each read cycle and gate 8 bytes per transfer cycle to the requesting L1 cache, starting with the double-word initially requested. L1 cache, as each double-word is received from L2 cache, aligns the data according to the original vector line fetch request storage address. In the following cycle, each 8 bytes of aligned data are transferred to the vector processor. Memory control receives the L2 command and L3 port identification. Upon receipt of the L2 cache line status, L2 hit and not locked, the request is dropped. Address/key receives the absolute address for reference bit updating. The reference bit for the 4KB page containing the L1 cache line requested by the vector fetch request is set to '1'b.

3.4.4 Storage Line Fetch, TLB Hit, No Access Exceptions, L2 Cache Miss

The execution unit issues a vector storage 64-byte line fetch request to the L1 cache and the externals function. The set-associative TLB search yields an absolute address, with no access exceptions, for the logical address presented by the request. The L1 cache is not checked for the presence of the data requested by a vector storage fetch. To avoid pending stores within the processor, the store queue of the requesting processor is flushed prior to starting any vector instruction. Consequently, no pending store conflicts can exist for vector line fetch requests. The externals function transfers the vector fetch request to the vector processor. L1 cache transfers the vector line fetch request and absolute address bits 4:28 to L2 as a line is required for the vector processor. In the following cycle, the L1 cache set used to identify vector line fetches is transferred to L2 along with the L1 operand cache identifier. As an inpage to L1 cache is not occurring, no L1 cache entry is selected for replacement and the contents of the L1 cache and inpage buffer are unaffected. The L2 cache priority selects this vector fetch request for service. L2 control transfers a processor L2 cache fetch command and L2 cache congruence to L2 cache control and a processor L2 cache fetch command to memory control. An inpage to the L1 cache of the requesting processor is required and is allowed regardless of any lock or line-hold without uncorrectable storage error indicator active which any alternate processor may possess. One of two conditions result from the L2 cache directory search which yield an L2 cache miss. The fetch request is suspended as a result of the L2 cache miss to allow other requests to be serviced in the L2 cache while the inpage for the requested L3 line occurs.

Case A

The search of the L2 cache directory results in an L2 cache miss, but a previous L2 cache inpage is pending for an alternate processor to the same L2 cache line. L2 control suspends this fetch request pending completion of the previous inpage request. No information is transferred to address/key. The L2 cache line status and cache set are transferred to L2 cache control, the cache set modifier is transferred to L2 cache, and the L2 cache line status is transferred to memory control. Locked status is forced due to the previous inpage freeze conflict. The L1 status arrays for the requesting processor are unaffected by the vector line fetch request as the data are destined for the vector processor, not L1 cache. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 miss and locked, blocks any data transfers to the requesting L1 cache and drops the command. Memory control receives the L2 command and L3 port identification. Upon receipt of the L2 cache line status, L2 miss and locked, the request is dropped.

Case B

The search of the L2 cache directory results in an L2 cache miss. L2 control suspends this fetch request and sets the processor inpage freeze register. The absolute address is transferred to address/key. The L2 cache line status and cache set are transferred to L2 cache control, the cache set modifier is transferred to L2 cache, and the L2 cache line status is transferred to memory control. The L1 status arrays for the requesting processor are unaffected by the vector line fetch request as the data are destined for the vector processor, not L1 cache. L2 cache control receives the processor L2 cache fetch command and L2 cache congruence and starts the access to L2 cache. L2 cache control transfers the command to L2 data flow to read the six L2 cache sets at the specified congruence. Two read cycles are required to obtain the desired 64-byte L1 cache line. The first read cycle yields 32 bytes containing the double-word requested by the processor. L2 cache control, upon receipt of the L2 cache line status, L2 miss and not locked, blocks any data transfers to the requesting L1 cache and drops the command. Memory control receives the L2 command and L3 port identification. Upon receipt of the L2 cache line status, L2 miss and not locked, the request enters priority for the required L3 memory port. When all resources are available, including an inpage/outpage buffer pair, a command is transferred to BSU control to start the L3 fetch access for the processor. Memory control instructs L2 control to set L2 directory status normally for the pending inpage. Address/key receives the absolute address. The reference bit for the 4KB page containing the requested L2 cache line is set to '1'b. The absolute address is converted to an L3 physical address. The physical address is transferred to BSU control as soon as the interface is available as a result of the L2 cache miss. BSU control, upon receipt of the memory control command and address/key L3 physical address, initiates the L3 memory port 128-byte fetch by transferring the command and address to processor storage and selecting the memory cards in the desired port. Data are transferred 16 bytes at a time across a multiplexed command/address and data interface with the L3 memory port. Eight transfers from L3 memory are required to obtain the 128-byte L2 cache line. The sequence of quadword transfers starts with the quadword containing the double-word requested by the fetch access. The next three transfers contain the remainder of the L1 cache line. The final four transfers contain the remainder of the L2 cache line. The data desired by the processor are transferred to L1 cache as they are received in the L2 cache and loaded into an L2 cache inpage buffer. While the last data transfer completes to the L2 cache inpage buffer BSU control raises the appropriate processor inpage complete to L2 control. L1 cache, as each double-word is received from L2 cache, aligns the data according to the original vector line fetch request storage address. In the following cycle, each 8 bytes of aligned data are transferred to the vector processor. During the data transfers to L2 cache, address/key monitors the L3 uncorrectable error lines. Should an uncorrectable error be detected during the inpage process several functions are performed. With each double-word transfer to the L1 cache, an L3 uncorrectable error signal is transferred simultaneously to identify the status of the data. The status of the remaining quadwords in the containing L2 cache line is also reported to the requesting processor. At most, the processor receives one storage uncorrectable error indication for a given inpage request, the first one detected by address/key. The double-word address of the first storage uncorrectable error detected by address/key is recorded for the requesting processor. Should an uncorrectable storage error occur for any data in the L1 line requested by the processor, an indicator is set for storage uncorrectable error handling. Finally, should an uncorrectable error occur for any data transferred to the L2 cache inpage buffer, address/key sends a signal to L2 control to prevent the completion of the inpage to L2 cache. L2 cache priority selects the inpage complete for the processor for service. L2 control transfers a write inpage buffer command and L2 cache congruence to L2 cache control and an inpage complete status reply to memory control. One of three conditions result from the L2 cache directory search.

Case 1

An L3 storage uncorrectable error was detected on inpage to the L2 cache inpage buffer. L2 control, recognizing that bad data exist in the inpage buffer, blocks the update of the L2 cache directory. The freeze register established for this L2 cache miss inpage is cleared. The L1 operand cache indicator for the processor which requested the inpage is set for storage uncorrectable error reporting. No information is transferred to address/key. The L2 cache line status normally transferred to L2 cache control and memory control is forced to locked and not modified. The selected L2 cache set is transferred to L2 cache control and the cache set modifier is transferred to L2 cache. The L1 status arrays are not altered. L2 cache control receives the write inpage buffer command and prepares for an L2 line write to complete the L2 cache inpage, pending status from L2 control. L2 cache control receives the L2 cache set and line status, locked and not modified, and resets the controls associated with the L2 cache inpage buffer associated with this write inpage buffer command. The L2 cache update is canceled and BSU control transfers end-of-operation to memory control. Memory control receives the L2 cache line status, locked and not modified, and releases the resources held by the processor inpage request. The L2 mini directory is not updated.

Case 2

L2 control selects an L2 cache line for replacement. In this case, the status of the replaced line reveals that it is unmodified; no castout is required. The L2 directory is updated to reflect the presence of the new L2 cache line. The freeze register established for this L2 cache miss inpage is cleared. The selected L2 cache set is transferred to address/key and L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 operand cache is not updated due to the fetch request being for the vector processor. L2 cache control receives the write inpage buffer command and prepares for an L2 line write to complete the L2 cache inpage, pending status from L2 control. L2 cache control receives the L2 cache set and replaced line status. As the replaced line is unmodified, L2 cache control signals L2 cache that the inpage buffer is to be written to L2 cache. As this is a full line write and the cache sets are interleaved, the L2 cache set must be used to manipulate address bits 25 and 26 to permit the L2 cache line write. BSU control transfers end-of-operation to memory control. Address/key receives the L2 cache set from L2 control. The L2 mini directory update address register is set from the inpage address buffers and the L2 cache set received from L2 control. Memory control receives the status of the replaced line. As no castout is required, memory control releases the resources held by the inpage request. Memory control transfers a command to address/key to update the L2 mini directory using the L2 mini directory update address register associated with this processor. Memory control then marks the current operation completed and allows the requesting processor to enter memory resource priority again.

Case 3

L2 control selects an L2 cache line for replacement. In this case, the status of the replaced line reveals that it is modified; an L2 cache castout is required. The L2 directory is updated to reflect the presence of the new L2 cache line. The freeze register established for this L2 cache miss inpage is cleared. The address read from the directory, along with the selected L2 cache set, are transferred to address/key. The selected L2 cache set is transferred to L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 operand cache is not updated due to the fetch request being for the vector processor. L2 cache control receives the write inpage buffer command and prepares for an L2 line write to complete the L2 cache inpage, pending status from L2 control. L2 cache control receives the L2 cache set and replaced line status. As the replaced line is modified, L2 cache control signals L2 cache that a full line read is required to the outpage buffer paired with the inpage buffer prior to writing the inpage buffer data to L2 cache. As these are full line accesses and the cache sets are interleaved, the L2 cache set must be used to manipulate address bits 25 and 26 to permit the L2 cache line accesses. Address/key receives the outpage address from L2 control, converts it to a physical address, and holds it in the outpage address buffers along with the L2 cache set. The L2 mini directory update address register is set from the inpage address buffers and the L2 cache set received from L2 control. Address/key transfers the outpage physical address to BSU control in preparation for the L3 line write. Memory control receives the status of the replaced line. As a castout is required, memory control cannot release the L3 resources until the memory update has completed. Castouts are guaranteed to occur to the same memory port used for the inpage. Memory control transfers a command to address/key to update the L2 mini directory using the L2 mini directory update address register associated with this processor. Memory control then marks the current operation completed and allows the requesting processor to enter memory resource priority again. BSU control, recognizing that the replaced L2 cache line is modified, starts the castout sequence after receiving the outpage address from address/key by transferring a full line write command and address to the selected memory port through the L2 cache data flow. Data are transferred from the outpage buffer to memory 16 bytes at a time. After the last quadword transfer to memory, BSU control transfers end-of-operation to memory control. Memory control, upon receipt of end-of-operation from BSU control, releases the L3 port to permit overlapped access to the memory port.

3.4.5 Storage Element Fetch, TLB Hit, No Access Exceptions, L2 Cache Hit

The execution unit issues a vector storage element fetch request to the L1 cache and the externals function. The set-associative TLB search yields an absolute address, with no access exceptions, for the logical address presented by the request. The L1 cache is not checked for the presence of the data requested by a vector storage fetch. To avoid pending stores within the processor, the store queue of the requesting processor is flushed prior to starting any vector instruction. Consequently, no pending store conflicts can exist for vector element fetch requests. The externals function transfers the vector fetch request to the vector processor. L1 cache buffers the required alignment information for the vector element fetch request. L1 cache transfers the vector element fetch request and absolute address bits 4:28 to L2 for the vector processor. As an inpage to L1 cache is not occurring, no L1 cache entry is selected for replacement and the contents of the L1 cache and inpage buffer are unaffected. L2 control receives the vector element fetch request. If the L2 store queue is empty, this request can be serviced immediately if selected by L2 cache priority. If the L2 store queue for this processor is not empty, then this request must wait on the store queue until all preceding vector element fetch requests for this processor have completed in L2 cache. In any case, an entry is made on the L2 store queue for the requesting processor. The L2 cache store queue is physically divided into two portions: control and data. The absolute address and vector element fetch request controls are maintained in the L2 control function. The data store queue in L2 cache data flow is unaffected by the vector element fetch request. The L2 cache priority selects this vector fetch request for service. L2 control transfers an L2 cache vector element fetch command and L2 cache congruence to L2 cache control and a processor L2 cache fetch command to memory control. A single double-word transfer to the L1 cache of the requesting processor is required and is allowed regardless. of any lock or line-hold without uncorrectable storage error indicator active which any alternate processor may possess. L2 control dequeues the vector element fetch request from the control portion of the L2 cache store queue for this processor. One of two conditions result from the L2 cache directory search which yield an L2 cache hit.

Case 1

The search of the L2 cache directory results in an L2 cache hit, but a freeze register with uncorrectable storage error indicator active or line-hold register with uncorrectable storage error indicator active is set for an alternate processor for the requested L2 cache line. L2 control suspends this fetch request pending release of the freeze or line-hold with uncorrectable storage error. The vector element fetch request is restored onto the control portion of the L2 cache store queue for this processor. No information is transferred to address/key. The L2 cache line status and cache set are transferred to L2 cache control, the cache set modifier is transferred to L2 cache, and the L2 cache line status is transferred to memory control. Locked status is forced due to the alternate processor freeze or line-hold with uncorrectable storage error conflict. The L1 status arrays for the requesting processor are unaffected by the vector element fetch request as the data are destined for the vector processor, not L1 cache. L2 cache control receives the L2 cache vector element fetch command and L2 cache congruence and starts the access to L2 cache. L2 cache control transfers the command to L2 data flow to read the six L2 cache sets at the specified congruence. Two read cycles are utilized as for a line fetch, even though only 8 bytes are desired, due to pipeline considerations. The first. read cycle yields 32 bytes containing the double-word requested by the processor. L2 cache control, upon receipt of the L2 cache line status, L2 hit and locked, blocks the data transfer to the requesting L1 cache and drops the command. Memory control receives the L2 command and L3 port identification. Upon receipt of the L2 cache line status, L2 hit and locked, the request is dropped.

Case 2

The search of the L2 cache directory results in an L2 cache hit. The absolute address is transferred to address/key with a set reference bit command. The L2 cache line status and cache set are transferred to L2 cache control, the cache set modifier is transferred to L2 cache, and the L2 cache line status is transferred to memory control. The L1 status arrays for the requesting processor are unaffected by the vector element fetch request as the data are destined for the vector processor, not L1 cache. L2 cache control receives the L2 cache vector element fetch command and L2 cache congruence and starts the access to L2 cache. L2 cache control transfers the command to L2 data flow to read the six L2 cache sets at the specified congruence. Two read cycles are utilized as for a line fetch, even though only 8 bytes are desired, due to pipeline considerations. The first read cycle yields 32 bytes containing the double-word requested by the processor. L2 cache control, upon receipt of the L2 cache line status, L2 hit and not locked, uses the L2 cache set to select the proper 32 bytes on each read cycle, but gates only the 8 bytes requested by the starting address to the L1 cache. The command is now complete in L2 cache. L1 cache, as the double-word is received from L2 cache, aligns the data according to the original vector element fetch request buffered alignment information. In the following cycle, the 8 bytes of aligned data are transferred to the vector processor. Memory control receives the L2 command and L3 port identification. Upon receipt of the L2 cache line status, L2 hit and not locked, the request is dropped. Address/key receives the absolute address for reference bit updating. The reference bit for the 4KB page containing the L1 cache line requested by the vector fetch request is set to '1'b.

3.4.6 Storage Element Fetch, TLB Hit, No Access Exceptions, L2 Cache Miss

The execution unit issues a vector storage element fetch request to the L1 cache and the externals function. The set-associative TLB search yields an absolute address, with no access exceptions, for the logical address presented by the request. The L1 cache is not checked for the presence of the data requested by a vector storage fetch. To avoid pending stores within the processor, the store queue of the requesting processor is flushed prior to starting any vector instruction. Consequently, no pending store conflicts can exist for vector element fetch requests. The externals function transfers the vector fetch request to the vector processor. L1 cache buffers the required alignment information for the vector element fetch request. L1 cache transfers the vector element fetch request and absolute address bits 4:28 to L2 for the vector processor. As an inpage to L1 cache is not occurring, no L1 cache entry is selected for replacement and the contents of the L1 cache and inpage buffer are unaffected. L2 control receives the vector element fetch request. If the L2 store queue is empty, this request can be serviced immediately if selected by L2 cache priority. If the L2 store queue for this processor is not empty, then this request must wait on the store queue until all preceding vector element fetch requests for this processor have completed in L2 cache. In any case, an entry is made on the L2 store queue for the requesting processor. The L2 cache store queue is physically divided into two portions: control and data. The absolute address and vector element fetch request controls are maintained in the L2 control function. The data store queue in L2 cache data flow is unaffected by the vector element fetch request. The L2 cache priority selects this vector fetch request for service. L2 control transfers an L2 cache vector element fetch command and L2 cache congruence to L2 cache control and a processor L2 cache fetch command to memory control. A single double-word transfer to the L1 cache of the requesting processor is required and is allowed regardless of any lock or line-hold without uncorrectable storage error indicator active which any alternate processor may possess. L2 control dequeues the vector element fetch request from the control portion of the L2 cache store queue for this processor. One of two conditions result from the L2 cache directory search which yield an L2 cache miss. The fetch request is suspended as a result of the L2 cache miss to allow other requests to be serviced in the L2 cache while the inpage for the requested L3 line occurs.

Case A

The search of the L2 cache directory results in an L2 cache miss, but a previous L2 cache inpage is pending for an alternate processor to the same L2 cache line. L2 control suspends this fetch request pending completion of the previous inpage request. The vector element fetch request is restored onto the control portion of the L2 cache store queue for this processor. No information is transferred to address/key. The L2 cache line status and cache set are transferred to L2 cache control, the cache set modifier is transferred to L2 cache, and the L2 cache line status is transferred to memory control. Locked status is forced due to the previous inpage freeze conflict. The L1 status arrays for the requesting processor are unaffected by the vector element fetch request as the data are destined for the vector processor, not L1 cache. L2 cache control receives the L2 cache vector element fetch command and L2 cache congruence and starts the access to L2 cache. L2 cache control transfers the command to L2 data flow to read the six L2 cache sets at the specified congruence. Two read cycles are utilized as for a line fetch, even though only 8 bytes are desired, due to pipeline considerations. The first read cycle yields 32 bytes containing the double-word requested by the processor. L2 cache control, upon receipt of the L2 cache line status, L2 miss and locked, blocks the data transfer to the requesting L1 cache and drops the command. Memory control receives the L2 command and L3 port identification. Upon receipt of the L2 cache line status, L2 miss and locked, the request is dropped.

Case B

The search of the L2 cache directory results in an L2 cache miss. L2 control suspends this fetch request and sets the processor inpage freeze register. The absolute address is transferred to address/key. The L2 cache line status and cache set are transferred to L2 cache control, the cache set modifier is transferred to L2 cache, and the L2 cache line status is transferred to memory control. The L1 status arrays for the requesting processor are unaffected by the vector element fetch request as the data are destined for the vector processor, not L1 cache. L2 cache control receives the L2 cache vector element fetch command and L2 cache congruence and starts the access to L2 cache. L2 cache control transfers the command to L2 data flow to read the six L2 cache sets at the specified congruence. Two read cycles are utilized as for a line fetch, even though only 8 bytes are desired, due to pipeline considerations. The first read cycle yields 32 bytes containing the double-word requested by the processor. L2 cache control, upon receipt of the L2 cache line status, L2 miss and not locked, blocks the data transfer to the requesting L1 cache and drops the command. Memory control receives the L2 command and L3 port identification. Upon receipt of the L2 cache line status, L2 miss and not locked, the request enters priority for the required L3 memory port. When all resources are available, including an inpage/outpage buffer pair, a command is transferred to BSU control to start the L3 fetch access for the processor. Memory control instructs L2 control to set L2 directory status normally for the pending inpage. Address/key receives the absolute address. The reference bit for the 4KB page containing the requested L2 cache line is set to '1'b. The absolute address is converted to an L3 physical address. The physical address is transferred to BSU control as soon as the interface is available as a result of the L2 cache miss. BSU control, upon receipt of the memory control command and address/key L3 physical address, initiates the L3 memory part 128-byte fetch by transferring the command and address to processor storage and selecting the memory cards in the desired port. Data are transferred 16 bytes at a time across a multiplexed command/address and data interface with the L3 memory port. Eight transfers from L3 memory are required to obtain the 128-byte L2 cache line. The sequence of quadword transfers starts with the quadword containing the double-word requested by the fetch access. The next three transfers contain the remainder of the L1 cache line. The final four transfers contain the remainder of the L2 cache line. The data desired by the processor are transferred to L1 cache as they are received in the L2 cache and loaded into an L2 cache inpage buffer. While the last data transfer completes to the L2 cache inpage buffer BSU control raises the appropriate processor inpage complete to L2 control. L1 cache, as the double-word is received from L2 cache, aligns the data according to the original vector element fetch request buffered alignment information. In the following cycle, the 8 bytes of aligned data are transferred to the vector processor. During the data transfers to L2 cache, address/key monitors the L3 uncorrectable error lines. Should an uncorrectable error be detected during the inpage process several functions are performed. With the double-word transfer to the L1 cache, an L3 uncorrectable error signal is transferred simultaneously to identify the status of the data. The status of the remaining quadwords in the containing L2 cache line is also reported to the requesting processor. At most, the processor receives one storage uncorrectable error indication for a given inpage request, the first one detected by address/key. The double-word address of the first storage uncorrectable error detected by address/key is recorded for the requesting processor. Should an uncorrectable storage error occur for any data in the L1 line requested by the processor, an indicator is set for storage uncorrectable error handling. Finally, should an uncorrectable error occur for any data transferred to the L2 cache inpage buffer, address/key sends a signal to L2 control to prevent the completion of the inpage to L2 cache. L2 cache priority selects the inpage complete for the processor for service. L2 control transfers a write inpage buffer command and L2 cache congruence to L2 cache control and an inpage complete status reply to memory control. One of three conditions result from the L2 cache directory search.

Case 1

An L3 storage uncorrectable error was detected on inpage to the L2 cache inpage buffer. L2 control, recognizing that bad data exist in the inpage buffer, blocks the update of the L2 cache directory. The freeze register established for this L2 cache miss inpage is cleared. The L1 operand cache indicator for the processor which requested the inpage is set for storage uncorrectable error reporting. No information is transferred to address/key. The L2 cache line status normally transferred to L2 cache control and memory control is forced to locked and not modified. The selected L2 cache set is transferred to L2 cache control and the cache set modifier is transferred to L2 cache. The L1 status arrays are not altered. L2 cache control receives the write inpage buffer command and prepares for an L2 line write to complete the L2 cache inpage, pending status from L2 control. L2 cache control receives the L2 cache set and line status, locked and not modified, and resets the controls associated with the L2 cache inpage buffer associated with this write inpage buffer command. The L2 cache update is canceled and BSU control transfers end-of-operation to memory control. Memory control receives the L2 cache line status, locked and not modified, and releases the resources held by the processor inpage request. The L2 mini directory is not updated.

Case 2

L2 control selects an L2 cache line for replacement. In this case, the status of the replaced line reveals that it is unmodified; no castout is required. The L2 directory is updated to reflect the presence of the new L2 cache line. The freeze register established for this L2 cache miss inpage is cleared. The selected L2 cache set is transferred to address/key and L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 operand cache is not updated due to the fetch request being for the vector processor. L2 cache control receives the write inpage buffer command and prepares for an L2 line write to complete the L2 cache inpage, pending status from L2 control. L2 cache control receives the L2 cache set and replaced line status. As the replaced line is unmodified, L2 cache control signals L2 cache that the inpage buffer is to be written to L2 cache. As this is a full line write and the cache sets are interleaved, the L2 cache set must be used to manipulate address bits 25 and 26 to permit the L2 cache line write. BSU control transfers end-of-operation to memory control. Address/key receives the L2 cache set from L2 control. The L2 mini directory update address register is set from the inpage address buffers and the L2 cache set received from L2 control. Memory control receives the status of the replaced line. As no castout is required, memory control releases the resources held by the inpage request. Memory control transfers a command to address/key to update the L2 mini directory using the L2 mini directory update address register associated with this processor. Memory control then marks the current operation completed and allows the requesting processor to enter memory resource priority again.

Case 3

L2 control selects an L2 cache line for replacement. In this case, the status of the replaced line reveals that it is modified; an L2 cache castout is required. The L2 directory is updated to reflect the presence of the new L2 cache line. The freeze register established for this L2 cache miss inpage is cleared. The address read from the directory, along with the selected L2 cache set, are transferred to address/key. The selected L2 cache set is transferred to L2 cache control. The status of the replaced L2 cache line is transferred to L2 cache control and memory control, and the cache set modifier is transferred to L2 cache. The L1 status arrays for all L1 caches in the configuration are checked for copies of the replaced L2 cache line. Should any be found, the appropriate requests for invalidation are transferred to the L1 caches. The L1 status is cleared of the L1 copy status for the replaced L2 cache line. The L1 status array of the requesting processor's L1 operand cache is not updated due to the fetch request being for the vector processor. L2 cache control receives the write inpage buffer command and prepares for an L2 line write to complete the L2 cache inpage, pending status from L2 control. L2 cache control receives the L2 cache set and replaced line status. As the replaced line is modified, L2 cache control signals L2 cache that a full line read is required to the outpage buffer paired with the inpage buffer prior to writing the inpage buffer data to L2 cache. As these are full line accesses and the cache sets are interleaved, the L2 cache set must be used to manipulate address bits 25 and 26 to permit the L2 cache line accesses. Address/key receives the outpage address from L2 control, converts it to a physical address, and holds it in the outpage address buffers along with the L2 cache set. The L2 mini directory update address register is set from the inpage address buffers and the L2 cache set received from L2 control. Address/key transfers the outpage physical address to BSU control in preparation for the L3 line write. Memory control receives the status of the replaced line. As a castout is required, memory control cannot release the L3 resources until the memory update has completed. Castouts are guaranteed to occur to the same memory port used for the inpage. Memory control transfers a command to address/key to update the L2 mini directory using the L2 mini directory update address register associated with this processor. Memory control then marks the current operation completed and allows the requesting processor to enter memory resource priority again. BSU control, recognizing that the replaced L2 cache line is modified, starts the castout sequence after receiving the outpage address from address/key by transferring a full line write command and address to the selected memory port through the L2 cache data flow. Data are transferred from the outpage buffer to memory 16 bytes at a time. After the last quadword transfer to memory, BSU control transfers end-of-operation to memory control. Memory control, upon receipt of end-of-operation from BSU control, releases the L3 port to permit overlapped access to the memory port.

As mentioned previously, the store-in cache buffer requires a high degree of error detection and correction. Unfortunately, this is inconsistent with the need for high speed operation. It is also inconsistent with the desirability of minimal circuitry. Error detection and correction techniques typically utilize error correcting codes which require the use of checking blocks containing multiple bytes of information to reduce the costs of check bits. Such methods usually require additional machine (instruction) cycles and may even require additional storage cycles. The time for these cycles tends to slow down the cache operation, defeating the very purpose for which cache storage is added. While the addition of circuitry may be effective to partially overcome the time loss created by error detection and correction, the cache circuits are typically high speed and therefore more expensive than usual. Adding expensive circuitry is obviously not a desirable solution.

In the error correction system of this invention, only the single check-bit normally associated with a byte of data is used. The system does not attempt to directly correct a fetch error. Instead, the normal machine check is allowed to occur as with any parity error. The retry routine determines that a cache error has occurred and invokes a hardware invert-retry mechanism designed to correct detectable hard bit failures within each checking block.

The error checking mechanism utilizes the byte oriented organization of the cache storage. Each eight bits of data are associated with a single check bit, i.e., a parity bit. Odd parity is maintained across the resulting nine-bit field. This technique supports single bit detection of failures which occur due to the state opposite of the stuck state of the failed storage cell. When the storage cells fail and the intended value of the bit is the same as the state of the failed cell, no error will be detected, but neither is the data read from the cell incorrect so nothing is lost.

The following example illustrates the error correction algorithm, which may be easily implemented in conventional logic of the same type as used elsewhere in the system. The example considers a single byte of the cache line with a hard failure in bit 2 of the byte, the bit being stuck at a logical "1".

| 0 1 2 3 4 5 6 7 P | |
|---|---|
| 0 0 0 0 0 0 0 0 1 | L2 cache write register contains good data during an attempted store operation. |
| 0 0 1 0 0 0 0 0 1 | Cache contents after a write operation with a hard bit failure in bit 2. |
| 0 0 1 0 0 0 0 0 1 | On a subsequent read from cache operation, a parity error is developed, causing a machine check signal, initiating an instruction retry. Retry determines that the error occurred in cache and puts the machine in a state which allows the cache data flow hardware to start invert-retry at the failing address and cache set. |
| 0 0 1 0 0 0 0 0 1 | The cache data flow hardware of BSU 26 reads the cache line at the failing byte address and places the data in the outpage buffer 93. |
| 1 1 0 1 1 1 1 1 0 | The cache data flow hardware inverts the data and loads it into the inpage buffer 91 in preparation for a cache line write. |
| 1 1 1 1 1 1 1 1 0 | The cache data flow hardware writes the inpage buffer contents to the addressed cache entry. Bit two has been inverted to the failed state. |
| 0 0 0 0 0 0 0 0 1 | The outpage buffer content is inverted by the cache data flow hardware and the now correct data is latched into the outpage buffer. The parity check now indicates that valid data exists in the register. |

This system for detection and correction of cache errors is exceptionally efficient since it utilizes many existing system facilities and does not function in the absence of a detected error.

Figure 6:
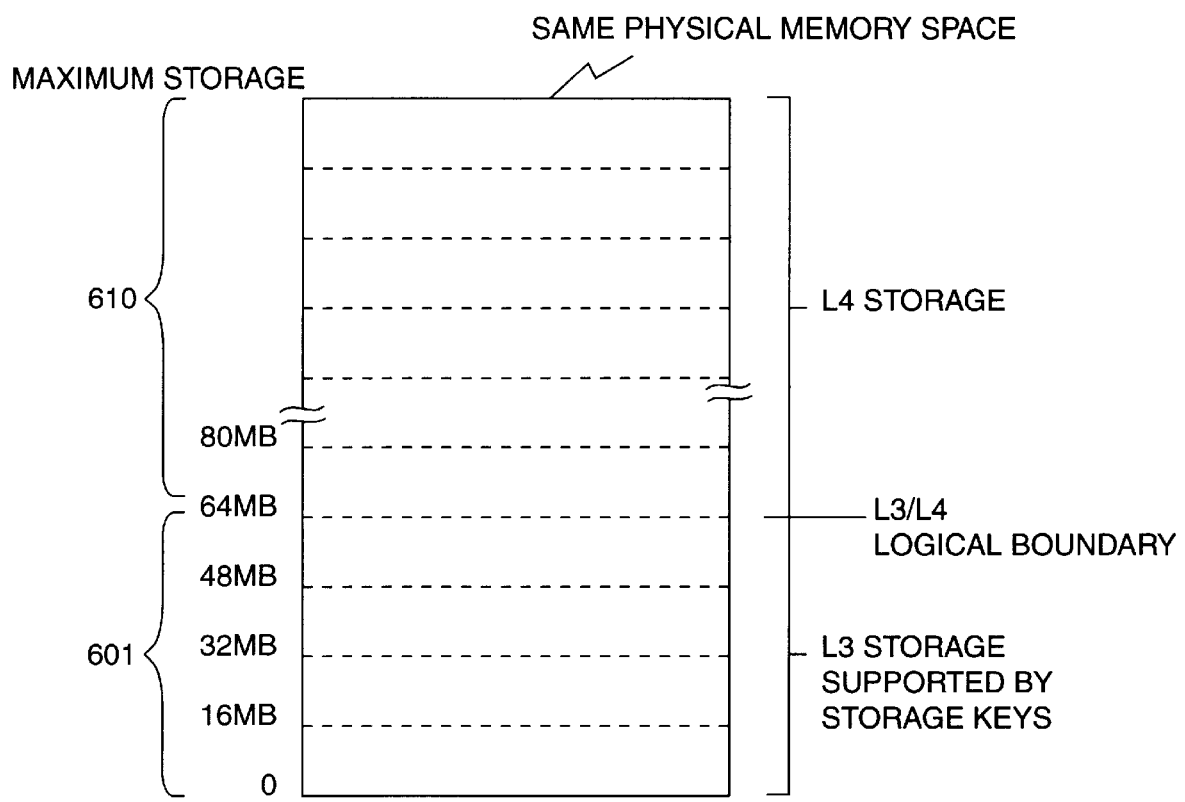
FIG. 6 is a showing of the arrangement of real and extended storage in the main storage unit.

With reference to FIG. 6, the mechanism which transfers data between the real storage 601 (L3) and extended storage 610 (L4) functions with a line size comparable to the size of the lines supported by the cache immediately above it in the storage hierarchy. A set of four commands allows lines to be moved from any logical type of storage to another. The use of a storage buffer which is external to the normal cache structure allows data movement without contamination of the caches within the system since the data transfers take place completely within the storage subsystem.

The real storage L3 601 and extended storage L4 610 share a common set of cards making the division between the two purely logical. In the preferred embodiment, the boundary between L3 and L4 can be set to any 16 MB boundary. L3 will lie below the boundary and L4 will lie above.

A storage buffer capable of holding a 128 byte line, corresponding to the size of the L2 cache in the system, is used as a staging area for data transfers between L3 and L4. In the preferred embodiment, a set of four storage commands allows data transfers between the storage buffer and the L3 storage 601 or L4 storage 610. All data movements involve 128 bytes of each 128 byte field starts on a 128 byte boundary in storage.

The four storage commands used by the central processing unit microcode are: transfer L3 line to storage (memory) buffer (TL3LMB), transfer L4 line to storage (memory) buffer (TL4LMB), transfer storage (memory) buffer to L3 line (TMBL3L), and transfer storage (memory) buffer to L4 line (TMBL4L). The commands are used in pairs to effect a data transfer from one storage location to another, with each command performing half the operation. Each command pair copies a 128 byte line from one storage location to another.

TL3LMB and TL4LMB both copy a 128 byte line from the specified storage location to the storage buffer. The request, comprising a command and absolute address on a 128 byte boundary, is initially made to the L3/L4 storage controller 12 (FIG. 1). The storage controller 12 must grant access to the required storage resource as well as the storage buffer. When these commands are selected by the L3/L4 storage controller 12, a lock is placed on the storage buffer for the requesting processor. This serializes the use of the storage buffer. Only the processor which placed the lock on the storage buffer may release it.

As previously described, the L2 cache buffer storage 26 (FIG. 2) is a store-in cache, as such the 128 byte line requested by the TL3LMB command may exist in the L2 cache. If this is the case and it is not modified, the data is fetched from L3 storage to the storage buffer. If the line exists in L2 cache and is modified, the data is stored back to L3 storage and copied to the storage buffer. The status of the line in the L2 cache is updated to indicate that it is unmodified, but still valid, as it has been copied to L3 storage. The reference bit in the storage key associated with the 4KB page containing the 128 byte line is set active.

For protocol reasons, the 128 byte line requested by TL4LMB cannot exist in L2 cache. Only data from L3 storage may be copied to L2 cache. As such, data is simply copied from L4 storage to the storage buffer for this command.

TMBL3L and TMBL4L both move a 128 byte line from the storage buffer to the specified storage location. The request, which includes the command and an absolute address on a 128 byte boundary, is initially made to the L3/L4 storage controller. The storage controller must grant access to the required storage resource as well as the storage buffer. The command contends for the L3 or L4 port only when the storage buffer lock was previously set by the same processor. When selected by the L3/L4 storage controller, the storage buffer lock is reset. This releases the storage buffer for use by another processor in the system.

As previously described, the L2 cache buffer storage 28 is a store-in cache. The 128 byte line modified by the TMBL3L command may exist in L2 cache. If it does, it is invalidated along with an L1 cache copies as the storage buffer contents are moved to L3 storage, replacing the old data. The reference and change bits in the storage key associated with the 4KB page containing the 128 byte line are set active. A 128 byte line requested by TMBL4L cannot exist in L2 cache, only in the storage buffer. Only data from L3 storage may be copied to L2 cache. The data is simply copied from the storage buffer to the L4 storage location.

These commands avoid the need for the processor to take time to fetch the data from storage, place it somewhere in the processor and then turn around and store it again, significantly improving the performance of instructions which require such data movement.

It is often necessary to move blocks of data substantially longer than the 128 bytes afforded by the previously described instructions. A PAGE IN instruction will move the 4KB block from L4 storage to L3 storage. The PAGE OUT instruction moves a 4KB block of data from L3 storage to L4 storage. Since the storage commands move only 128 bytes at a time, a microcode loop with 32 iterations is employed, updating the storage address after each iteration, to accomplish the 4KB block move. For PAGE IN, the loop consists of TL4LMB4-TMBL3L command pairs. For PAGE OUT, the loop consists of TL3LMB-TMBL4L command pairs.

The PAGE IN and PAGE OUT instructions specify the L4 block through an extended-storage block number. This number is translated by microcode, taking into account the logical dividing address between L3 and L4 storage, to an absolute address acceptable to the storage subsystem prior to execution of the data transfer commands.

MOVE LONG also takes advantage of the storage to storage transfer commands. In the case where each of the storage operands is aligned on a 128 byte boundary in storage, the TL3LMB-TMBL3L command pairs can be executed for all integral 128 byte lines. This obviates the need to execute a fetch-store loop in the central processor, moving data up to the processor and back to storage. This significantly improves the performance of the MOVE LONG instruction in the case where data movement is actually required by the instruction.

Figure 7:
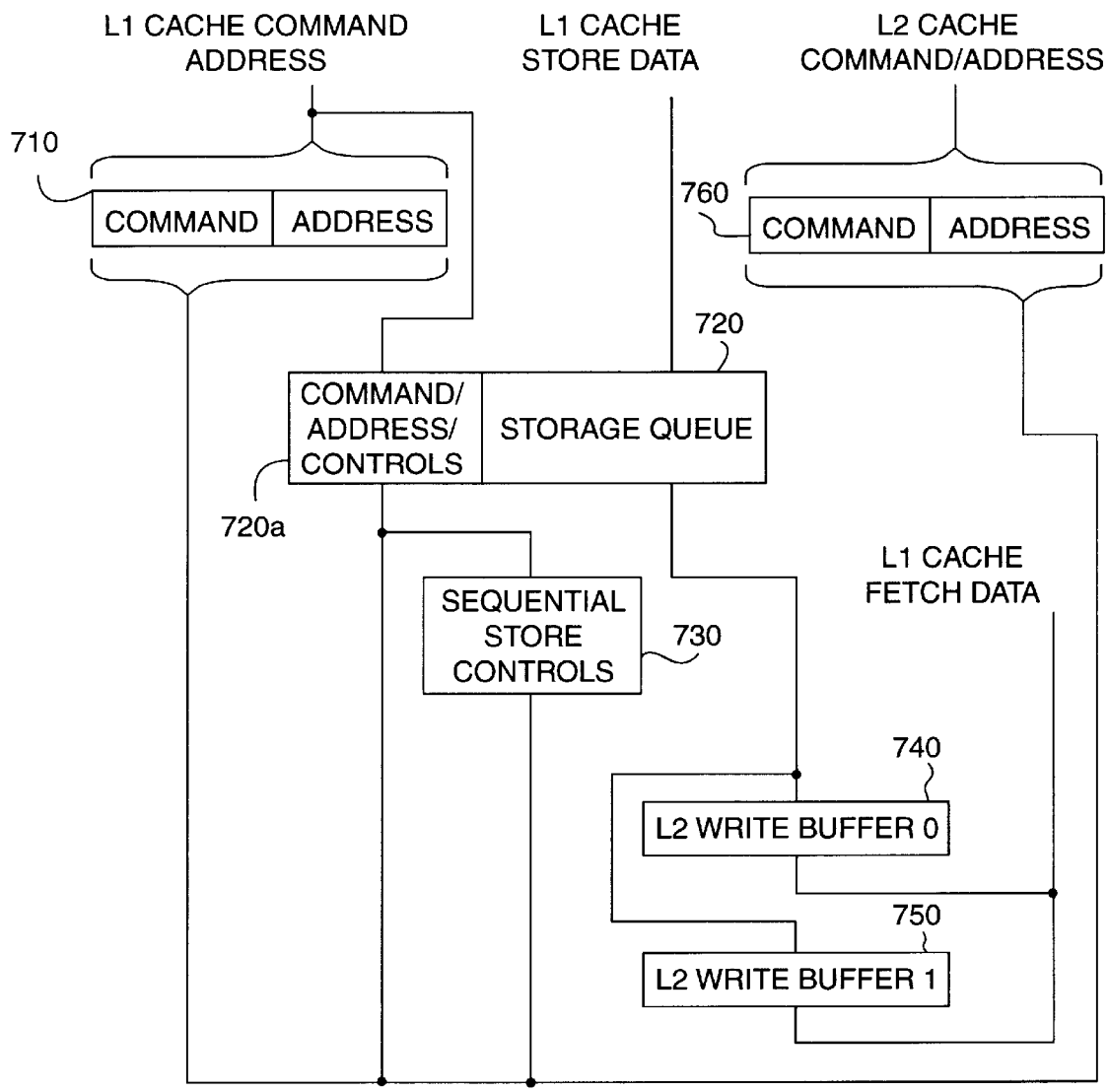
FIG. 7 is a showing of the control for the storage buffer.

With reference to FIG. 7, command buffer 710 is provided to hold the specified command information. Store queue 720 functions as previously described. A portion 720a contains control information specifying the address of the store request and the type of store operation, sequential or non-sequential and other status information. Sequential store request block 730 indicates the presence of a sequential store request which requires the data to be accumulated and stored as a block. L2 write buffer 740 and L2 write buffer 750 provide 256 bytes of data storage. Buffer 760 contains the L2 cache command and address.

In summary, the four data transfer commands described above are effective to support the IBM System 370 instructions which move large amounts of data from storage to storage. The commands are sufficiently flexible to allow the transfer of data between combination of L3 and L4 storage. The problem of maintaining storage consistency is made easier by moving data in blocks which are the same size as the L2 cache line size, allowing existing storage consistency mechanisms to function for these commands. Pipelining is achieved to the extent that L3/L4 storage access times are the limiting factors in the execution rate of the commands. Data is transferred directly from storage to a buffer in the storage subsystem back to storage. This technique also improves cache hit ratios as unwanted data is not inpaged into cache buffer storage simply to accomplish the storage to storage transfers. In other words, the algorithm which allocates cache space is not impacted by the storage to storage transfers.

Figure 8:
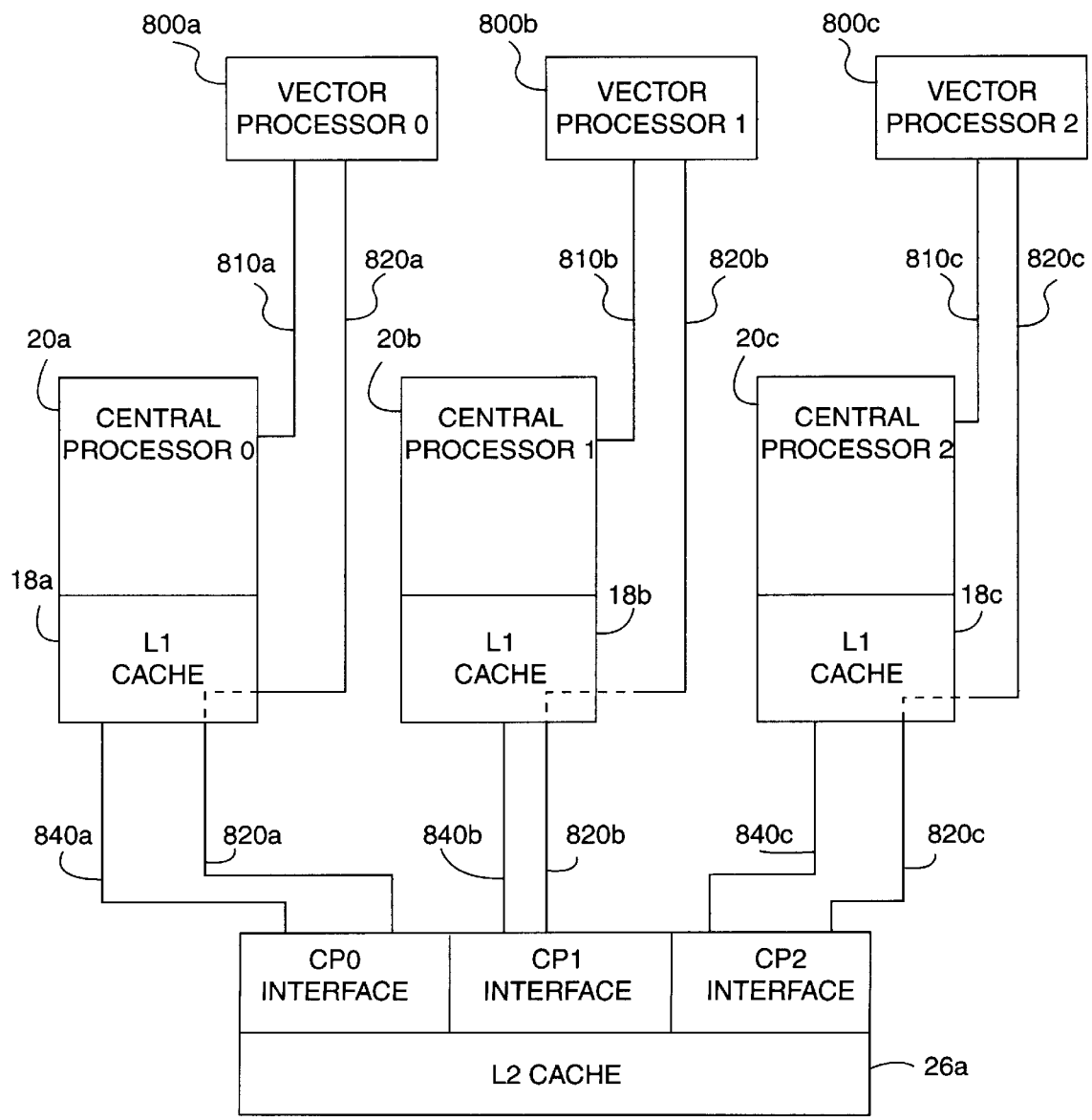
FIG. 8 shows the manner of attachment of the vector processors to the central processors.

Considering now the specific manner in which vector storage operations are performed by the system, and particularly, the showing in FIGS. 8 and 9, it will be appreciated that the storage activity of a vector processor is significantly different from the storage reference patterns of the conventional central processor. It has been found that the inclusion of a specific mode of operation tailored to the vector processor provides an unexpectedly significant improvement in system performance.

The system accommodates both a line fetch and element fetch mode. The line fetch supports data streaming and transfers data to the vector processor at nearly the maximum theoretical rate. The element fetch mode permits the handling of large strides (separations) between the element in storage by requiring only a single data transfer between the storage subsystem and the vector processor. Such requests take advantage of the L2 storage cache queue for the associated central processor to queue element fetch requests, allowing the maximum request service rate on the shared L2 cache resource.

L1 cache is bypassed for vector processor fetches to allow pipelining with the larger L2 cache storage.

The system provides for storage fetches which are in non-sequential element store mode, sequential full-line mode, and sequential partial-line mode. The non-sequential mode supports large strides between elements in storage, storing up to eight bytes per request. The sequential partial-line mode supports small strides while reducing the busy time associated with L2 cache access for this type of operation. The sequential full line mode supports storing contiguous data elements in an entire L2 cache line, thereby obviating the need for a cache inpage when an L2 cache miss occurs. The various modes support the different data organization in a manner which optimizes performance of the vector processor while minimizing the utilization of the common L2 cache resource.

With reference to FIG. 8, a plurality of vector processors 800a, 800b and 800c are included in the data processing system which also contains the central processing units 20a, 20b and 20c, previously described. The vector processors and central processing units are connected by control bus 810a, 810b and 810c, respectively. Each of the vector processors is connected through respective L1 cache 18a, 18b and 18c by its respective data bus 820a, 820b and 820c. Although each data bus is routed through L2 cache, the L1 cache is bypassed for the vector storage operations.

In the preferred embodiment the vector processor is specifically designed to process the IBM System 370 vector architecture instruction set. The central processor participates in the execution of such instructions by initially decoding the instruction operation code and passing work to the vector processor. The central processor is still active while the vector processor is performing work for it, however, it does not advance to the next instruction until the vector processor has completed the work required for the particular vector instruction.

The central processing unit handles all storage references for the vector processor. Vector fetches are requests issued by the central processor on behalf of the vector processor. The hardware paths used by the central processing unit 20a, 20b and 20c are also used during vector fetches. The respective central processing units issue commands to the L2 cache during vector fetch operation over control bus 840a, 840b and 840c connected to the L2 cache 26a.

During vector fetch operations the L1 cache does not record the storage data which is passed to the vector processor. The L1 cache is bypassed for all vector fetches to allow the L2 cache buffer storage to be the source of data in the vector fetch request pipeline.

Vector storage operations are requests issued by the central processing unit on behalf of the vector processor. The request is simultaneously issued to the L1 store queue and the vector processor. The data associated with the store request, which comes from the vector processor, enters the L1 store queue after the command and address. When all the necessary information for the vector store request is in the L1 store queue, it is passed to the L2 store queue for subsequent storage into the L2 cache buffer storage. The L1 cache, being a store-through design, can be updated by the vector store requests when copies are found in L1 cache or it can be invalidated as store requests are entered into L2 cache. The L2 cache is a store-in cache for the vector store requests and storage consistency is maintained by the existing L2 cache hardware.

Vector operations are associated with various data types and organization. Vectors are defined as a collection of like data elements in storage. They possess common element length and data format. The lengths can be two, four or eight bytes and are aligned on integral boundaries in storage, creating halfword elements (HWE), fullword elements (FWE),. and doubleword elements (DWE). The separation between elements in a vector is called the stride. For contiguous elements within a vector, the stride is one.

Complex numbers are stored with a real part and an imaginary part for the same element in contiguous locations in storage. When complex numbers are stored as contiguous elements in a vector in storage, it means that the real parts, as well as the imaginary parts are separated by a stride of two. Processing of complex vectors requires separate handling of the real and imaginary parts. The ability to handle a stride of two is therefore a significant aspect of the system.

Data for a matrix is stored in either row-oriented or column-oriented fashion. In the case where the storing is row-oriented, and it is desired to access all the elements of a row, data is accessed with a stride of one since all the elements of a row are stored contiguously in storage. When it is desired to access all elements of a column, the elements are separated by a stride equal to the number of columns. For large matrices, the separation may be such that each of the desired elements exists in a different cache line. It is essential that only the desired elements be accessed, rather than the entire cache line, if optimum performance is to be achieved.

From the preceding discussion is can be easily seen that the element size and stride are important factors in the vector storage access operations.

Vector fetches may be either line fetches or element fetches. Line fetches relate to the L1 cache size, in the preferred embodiment this is 64 bytes. Each fetch access of this type effectively bypasses the L1 cache and is sent directly to the L2 cache. Each line fetch appears as a processor L1 cache inpage request to the L2 cache hardware. Each line fetch requires the L2 cache read cycles, each cycle accessing 32 bytes of the desired L1 cache line. The data is transferred over eight cycles through the requesting processor's L1 cache to the associated vector processor.

The element fetch also utilizes two L2 cache read cycles, even though only a single read access is required. This is a consequence of the two-cycle L2 cache design. Only a single data transfer cycle is required to send the element through the L1 cache to the associated vector processor.

L2 cache misses for element and line fetches are handled as processor L1 cache inpage requests with L2 cache misses, except for the number of data transfers made to L1 cache on element fetches.

Processor microcode is used to determine which type of request to use. In a triadic system, that is, a three processor system, a round robin priority algorithm controls access of the processor to L2 cache. Thus, if each processor can access once every three priority cycles and each access requires two cycles, each processor can access L2 cache once every six cycles. With eight data transfer cycles for line fetches, the transfer cycles rather than L2 cache service rate is the limiting factor on the data transfer rate. When non-contiguous elements are fetches using line fetches, the extra data is simply discarded by the vector processor.

For element fetches, only one element transfer will occur every six cycles if the L2 cache is fully utilized by all three processors. In the best case, one data transfer will occur every two cycles if the requesting processor is granted access to L2 cache every priority cycle. Line fetches, where possible, provide greater bandwidth.

The hardware implementation of the line fetch operation utilizes the same command buffer as that used for processor L1 cache inpage requests. The command and doubleword address of the first element desired are transferred to the L2 cache. An L1 cache identifier indicating the operand cache and an L1 cache set identifying the vector processor as the destination of the data, not an actual L1 cache set, are part of the line fetch request. No data is inpaged to the L1 cache and no record of the data existing in the attached vector processor is maintained at the L2 cache level.

To improve the utilization of L2 cache during element fetches, the requests utilize the processor's store queue. In such an operation, the store queue acts as an element fetch queue. Only the command and address are enqueued, as data is transferred with each L2 cache fetch access. The advantage is that fetch requests are stacked at the input to L2 cache request priority in the request source for the processor stores. A vector element fetch bit is added to the store queue to identify the request type to the L2 cache priority. In the IBM System 370 vector instruction environment there is no requirement to handle mixed vector fetch and store requests within the store queue for a given System 370 instruction. Element fetches can be serviced from the store queue at a maximum rate of one every two cycles.

Vector store requests operate in three modes; element stores, partial-line stores and full line stores. Element stores are handled in a manner identical to processor non-sequential stores and end-of-operation in the storage subsystem. The only difference exists at the L1 cache level. As the data for the central processor store request comes from the vector processor, it enters the L1 store queue after the command and address. Once the data is received, the request can be transferred to the L2 store queue for servicing at the common level of storage. Each element store with L2 cache hit requires two L2 cache write cycles. The first cycle is required to allow the selected cache set information to manipulate the cache write command controls to write the correct two-byte to eight-byte element in the second cycle.

Partial-line stores are handled in a manner identical to processor sequential store requests in the storage subsystem, with two exceptions. First, processor sequential store requests modify all bytes within the storage field. Partial-line stores allow gaps in the bytes stored to accommodate storing the results with a stride of two. Within the L1 store queue, the request is handled as if it were a true sequential store. The difference is handled within the L2 store write buffers as the results are removed from the store queue. The appropriate data bytes and store byte flags are loaded into the L2 sequential store write buffers. When the L2 cache is updated, the 128-byte cache line write occurs under control of the store byte flags, only modifying the desired bytes within the L2 cache line.

The second difference involves the timing of the L2 cache updates. An IBM System 370 vector instruction may also modify far more than the 256 bytes within storage. The L2 sequential store write buffers are 256 bytes in length. Therefore, the hardware forces an internal sequential store end-of-operation each time a 256 byte boundary in the vector store field is crossed, causing the L2 cache lines built in the L2 sequential store write buffers to be written into L2 cache. This effectively prevents store queue overflow for the vector instruction.

Full-line stores are handled as partial line stores except that they are used only for stride equals on store operations which modify all bytes within the accessed L2 cache lines. As full-line stores ultimately update the entire L2 cache line, there is no need to inpage the old data only to overwrite it later. This allows bypassing the L3 fetch access normally required for an L2 cache miss associated with the sequential store processing in L2 cache, thereby reducing L3 busy time and providing a correspondingly improved vector store response time. This operation makes use of the not-in-here bit associated with the line-hold register.

Microcode determines the type of store request to use based on the requirements of the IBM System 370 vector instruction. Element stores are used for vector instructions requiring strides greater than two. Such operations may involve storing results of vector instructions under control of a mask register where stores are only executed for elements which have their mask bit set active. Partial-line stores are used for vectors whose elements are separated by a stride of 2, as for complex numbers. Partial-line stores are also used in cases where the stride equals one, but the entire L2 cache line is not updated. Full-line stores are used only for cases where the stride equals one where completed L2 cache lines are modified.

Where an L2 cache hit occurs, the use of element stores allows a maximum store rate of one element every two cycles, assuming, of course, that the processor wins priority every available cycle. In the worst case, the processor is assured of winning one of every three priority cycles, which results in a store rate of one element every six cycles. For sequential stores, both partial-line and full-line, the store rate is one element per cycle. This is essentially independent of the other processor's activity in L2 cache as most of the store requests do not require access to the L2 cache. For each 128 bytes stored to L2 cache, only five L2 cache cycles are required, two for the initial L2 cache line check and three for the actual line write to L2 cache.

To support vector element stores, a specific bit is placed in the store queue to indicate that it is a vector store non-sequential store request. In the L1 store queue, the transfer pointer is not updated, preventing this request from being transferred to L2 cache until the data has been received from the vector processor. In the L2 cache request priority, the vector non-sequential store appears as a processor non-sequential store with end-of-operation, making it a serviceable store upon L2 store que enqueue.

The vector line stores require the addition of store queue entry control bits to indicate that the store requests are vector stores that are sequential, partial-line store requests, or sequential, full-line store requests. Also the L2 store queue sequential store processing hardware generates an internal end-of-operation at each 256-byte storage boundary crossing. The not-in-here bit is utilized during full-line processing to reduce penalties associated with L2 cache misses.

The timing diagram for the vector processor element fetch with an L2 cache hit is shown in FIG. 9. The timing and signal sequence is shown for the various signals previously described.

We claim:

1. A method for detecting and correcting an error in data in a cache location due to a hardware failure in said cache location, said data having a parity bit, said method comprising the steps of:

detecting a parity error in said data in said cache location;

writing said data to an outpage buffer;

inverting said data from said outpage buffer and writing the inverted data to an inpage buffer;

writing said inverted data from said inpage buffer to said cache location;

reading said inverted data from said cache location; and after said reading, inverting said inverted data to yield corrected data, and writing said corrected data into said outpage buffer, whereby said corrected data in said outpage buffer is corrected for a single bit hardware failure in said cache location.

2. A system according to claim 1 wherein a parity checker detects said error in said data and is disabled during all the subsequent recited steps.

* * * * *